(12) United States Patent
Pomeroy et al.

(10) Patent No.: US 11,354,649 B2
(45) Date of Patent: Jun. 7, 2022

(54) METHOD AND SYSTEM FOR RELOADING PREPAID CARD

(71) Applicant: Blackhawk Network, Inc., Pleasanton, CA (US)

(72) Inventors: Jeff Pomeroy, Danville, CA (US); Tomas A. Campos, Berkeley, CA (US); Jonathan Lister, Toronto (CA)

(73) Assignee: Blackhawk Network, Inc., Pleasanton, CA (US)

( * ) Notice: Subject to any disclaimer, the term of this patent is extended or adjusted under 35 U.S.C. 154(b) by 1059 days.

(21) Appl. No.: 14/941,063

(22) Filed: Nov. 13, 2015

(65) Prior Publication Data

US 2016/0086166 A1 Mar. 24, 2016

Related U.S. Application Data

(63) Continuation-in-part of application No. 14/147,330, filed on Jan. 3, 2014, which is a continuation-in-part of application No. 13/483,711, filed on May 30, 2012, application No. 14/941,063, filed on Nov. 13, 2015, which is a continuation-in-part of application No.
(Continued)

(51) Int. Cl.
| | |
|---|---|
| *G06Q 40/00* | (2012.01) |
| *G06Q 20/34* | (2012.01) |
| *G06Q 20/10* | (2012.01) |
| *G06Q 20/40* | (2012.01) |
| *G06Q 20/36* | (2012.01) |

(52) U.S. Cl.
CPC ......... *G06Q 20/349* (2013.01); *G06Q 20/102* (2013.01); *G06Q 20/36* (2013.01); *G06Q 20/3674* (2013.01); *G06Q 20/4018* (2013.01)

(58) Field of Classification Search
None
See application file for complete search history.

(56) References Cited

U.S. PATENT DOCUMENTS

| | | | |
|---|---|---|---|
| 2005/0015331 A1* | 1/2005 | Kunugi | G06Q 20/10 |
| | | | 705/39 |
| 2006/0138215 A1* | 6/2006 | Pallares | G06Q 20/04 |
| | | | 235/380 |

(Continued)

OTHER PUBLICATIONS

Filing receipt and specification for provisional patent application entitled "Method and System for Reloading Prepaid Card," by Jeff Pomeroy, filed Nov. 13, 2014 as U.S. Appl. No. 62/079,507.
(Continued)

*Primary Examiner* — Olabode Akintola
(74) *Attorney, Agent, or Firm* — Barnes & Thornburg LLP; Jerry C. Harris, Jr.

(57) ABSTRACT

System and methods for managing value products such as stored value cards are provided. A computer-implemented system comprising: a first value product, wherein a first value product package identifier requires that all of the first value product's digital funds be redeemed in a single transaction; a second value product; and a specially programmed computer server, the methods and system allowing a user to use a portion of the first value product's digital funds in a first transaction and a remainder of the first value product's digital funds in one or more subsequent transactions.

13 Claims, 20 Drawing Sheets

Related U.S. Application Data

14/205,065, filed on Mar. 11, 2014, which is a continuation-in-part of application No. 13/483,711, filed on May 30, 2012, application No. 14/941,063, filed on Nov. 13, 2015, which is a continuation-in-part of application No. 14/452,829, filed on Aug. 6, 2014, now Pat. No. 10,037,526, which is a continuation of application No. 13/483,711, filed on May 30, 2012, and a continuation-in-part of application No. PCT/US2011/040055, filed on Jun. 10, 2011, said application No. 13/483,711 is a continuation-in-part of application No. PCT/US2011/020570, filed on Jan. 7, 2011, said application No. 13/483,711 is a continuation-in-part of application No. PCT/US2011/049338, filed on Aug. 26, 2011, application No. 14/941,063, filed on Nov. 13, 2015, which is a continuation-in-part of application No. 14/379,210, filed as application No. PCT/US2013/026501 on Feb. 15, 2013.

(60) Provisional application No. 62/079,507, filed on Nov. 13, 2014, provisional application No. 62/082,011, filed on Nov. 19, 2014, provisional application No. 61/491,791, filed on May 31, 2011, provisional application No. 61/491,813, filed on May 31, 2011, provisional application No. 61/496,397, filed on Jun. 13, 2011, provisional application No. 61/496,404, filed on Jun. 13, 2011, provisional application No. 61/354,469, filed on Jun. 14, 2010, provisional application No. 61/354,470, filed on Jun. 14, 2010, provisional application No. 61/360,327, filed on Jun. 30, 2010, provisional application No. 61/293,413, filed on Jan. 8, 2010, provisional application No. 61/377,800, filed on Aug. 27, 2010, provisional application No. 61/599,249, filed on Feb. 15, 2012, provisional application No. 61/601,911, filed on Feb. 22, 2012.

(56) References Cited

U.S. PATENT DOCUMENTS

| | | | |
|---|---|---|---|
| 2007/0023504 A1* | 2/2007 | Blankenship | G06Q 20/40 235/380 |
| 2008/0228637 A1* | 9/2008 | Scipioni | G06Q 20/04 705/39 |

OTHER PUBLICATIONS

Filing receipt and specification for provisional patent application entitled "Method and System for Reloading Prepaid Card," by Jeff Pomeroy, filed Nov. 19, 2014 as U.S. Appl. No. 62/082,011.

* cited by examiner

Your Email Address: [_____] ⇨ [Please use a valid email address]

Confirm Email Address: [_____] ⇨ [Email does not match]

Mobile Phone Number:
Why do I need to provide this? [_____] ⇨ [Please enter a valid phone number]

Password: [_____] [Password error messages]

Confirm Password: [_____] [Password does not match]

☐ I want to receive email offers from MyWallet.com

☐ Yes, I agree to the MyWallet Terms and Conditions and Privacy Policies

[ Create Wallet ]

METHOD AND SYSTEM FOR RELOADING PREPAID CARD

CROSS-REFERENCE TO RELATED APPLICATIONS

This application claims priority to U.S. Provisional Patent Application Nos. 62/079,507 filed on Nov. 13, 2014 and 62/082,011 filed on Nov. 19, 2014, which applications are incorporated by reference herein in their entirety. This application is also continuation-in-part of and claims priority to U.S. patent application Ser. No. 14/147,330 filed on Jan. 3, 2014, Ser. No. 14/205,065 filed on Mar. 11, 2014, and Ser. No. 14/452,829 filed on Aug. 6, 2014 which claims priority to U.S. patent application Ser. No. 13/483,711 filed on May 30, 2012 which claims priority to: U.S. Provisional Patent Application Ser. Nos. 61/491,791 and 61/491,813, both filed on May 31, 2011 and entitled "A System for Payment via Electronic Wallet;" U.S. Provisional Patent Application Ser. Nos. 61/496,397 and 61/496,404, both filed on Jun. 13, 2011 and entitled "System, Method, and Apparatus for Creating and Distributing a Transaction Credit;" Ser. No. 13/483,711 filed on May 30, 2012 is a continuation-in-part of International Application Serial No. PCT/US11/40055, filed Jun. 10, 2011 and entitled, "Efficient Stored-Value Card Transactions" which claims priority to U.S. Provisional Patent Application Ser. Nos. 61/354,469 and 61/354,470 both filed on Jun. 14, 2010, and 61/360,327 filed on Jun. 30, 2010; Ser. No. 13/483,711 filed on May 30, 2012 is a continuation-in-part of International Application Serial No. PCT/US11/20570, filed on Jan. 7, 2011 and entitled "A System for Processing, Activating and Redeeming Value Added Prepaid Cards," which claims priority to U.S. Provisional Patent Application Ser. No. 61/293,413, filed on Jan. 8, 2010; Ser. No. 13/483,711 filed on May 30, 2012 is a continuation-in-part of International Application Serial No. PCT/US11/49338, filed on Aug. 26, 2011 and entitled "Prepaid Card with Savings Feature," which claims priority to U.S. Provisional Patent Application Ser. No. 61/377,800, filed on Aug. 27, 2010 each of which is incorporated by reference herein in its entirety. This application is also a continuation-in-part application of and claims priority to U.S. patent application Ser. No. 14/379,210 filed on Aug. 15, 2014 which is a filing under 35 U.S.C. 371 of International Application No. PCT/US2013/026501 filed Feb. 15, 2013, entitled "System and Method of Registering Stored-Value Cards into Electronic Wallets" which claims priority to U.S. Provisional Patent Application Nos. 61/599,249 filed on Feb. 15, 2012 and 61/601,911 filed on Feb. 22, 2012, which applications are incorporated by reference herein in their entirety.

This application also incorporates by reference the entirety of the disclosure, the subject matter, and concepts of: U.S. patent application Ser. No. 12/538,083, filed Aug. 7, 2009, and entitled "Transaction Processing Platform for Facilitating Electronic Distribution of Plural Prepaid Services" which is a continuation of U.S. patent application Ser. No. 12/338,854, filed Dec. 18, 2008, which is a continuation of U.S. patent application Ser. No. 11/851,337, filed Sep. 6, 2007 (now U.S. Pat. No. 7,477,731), which is a continuation of U.S. patent application Ser. No. 11/007,662, filed Dec. 7, 2004 (now U.S. Pat. No. 7,280,644); U.S. patent application Ser. No. 13/040,074 filed Mar. 3, 2011 and entitled "System and Method for Electronic Prepaid Account Replenishment;" U.S. patent application Ser. No. 10/821,815, filed Apr. 9, 2004 and entitled "System and Method for Distributing Person Identification Numbers Over a Computer Network;" U.S. patent application Ser. No. 12/786,403, filed May 24, 2010, and entitled "System and Method for Distributing Person Identification Numbers Over a Computer Network;" U.S. patent application Ser. No. 12/711,211, filed Feb. 23, 2010, and entitled "System and Method for Distributing Person Identification Numbers Over a Computer Network;" and U.S. patent application Ser. No. 12/719,741, filed Mar. 8, 2010, and entitled "Systems and Methods for Personal Identification Number Distribution and Delivery."

FIELD OF THE INVENTION

The disclosure generally relates to stored-value cards and the use thereof in electronic transactions. More particularly, the disclosure relates to managing stored-value cards.

BACKGROUND

The electronic transaction market is currently filled with many types of stored-value cards such as credit cards, debit cards, discount card, gift cards, and loyalty cards, all of which may be offered by different issuers, vendors, and providers and may or may not be reloadable. Some of the cards are tailored to be redeemed from a retailer, others may be redeemed by financial institutions, while others, e.g., stored-value cards comprising funds for transfer to another stored-value card ("reload cards"), prior to the disclosed systems and processes herein, were previously only redeemable by an approved processing system for transfer of funds to another stored-value card account. Other cards have promotions attached to them, e.g., loyalty cards.

Consumers have realized that prepaid financial service products offer value, convenience and flexibility with desirable features, such as direct deposit and online or phone bill pay. As such, there is a need for a convenient and user-friendly approach by which consumers can manage funds access across a plurality of stored-value cards, e.g., reloadable stored-value cards, and via a plurality of reload cards.

SUMMARY

A computer-implemented method for the secure management of digital funds comprising: establishing a user account in a database, for a user, via a computer-implemented server executing specific programming instructions to create the user account in an account database, wherein the user account is enabled by source code for the secure storage of value; associating the user account with a unique user account identifier; providing the user with an ability to associate a plurality of value products with the user account, wherein each of the plurality of value products are associated with digital funds; providing the user with an ability to use a first portion of a first value product's digital funds in a plurality of transactions; and providing the user with an ability to use a second portion of the first value product's digital funds and a portion of one or more additional value product's digital funds in a single transaction, wherein the first portion of a first value product's digital funds and the second portion of a first value product's digital funds can be the same or different amounts.

A computer-implemented system for the secure management of digital funds comprising: a first value product, wherein the first value product is associated with a first value product digital funds and a first value product package identifier, wherein the first value product package identifier, when interpreted in a redemption transaction, requires that all of the first value product digital funds be redeemed in a single transaction; a second value product, wherein the second value product is associated with a second value product digital funds, wherein the second value product digital funds are redeemable in one or more transactions; and a specially programmed computer server, wherein the computer server functions to establish a user account in a database, for a user, via executing specific programming instructions to create the user account in an account database, wherein the user account is enabled by source code for the secure storage of value, wherein the specially programmed computer server can associate the first value product and the second value product with the user account, and wherein the association of the first value product with the user account allows the user to use a portion of the first value product digital funds in a first transaction and a remainder of the first value product digital funds in one or more subsequent transactions.

A computer implemented method for conducting a transaction from a user account, wherein a server receives a transaction request; said server conducts a computer routine according to preprogrammed source code to determine whether the user account exists; upon determination according to special programming to conduct said determination that such an account exists and is valid, determining whether the transaction request is a valid transaction according to special programming, determining whether the user requesting the transaction is validly associated with the account according to special programming, determining whether a user device used to initiate the transaction is validly associated with the account according to special programming, and determining whether the amount in the account is sufficient to conduct the requested transaction according to special programming; wherein upon determining that the transaction request is valid, the account exists and is valid, the user is validly associated, the user device is validly associated, conducting the requested transaction from said account.

BRIEF DESCRIPTION OF THE DRAWINGS

For a more complete understanding of the present disclosure and the advantages thereof, reference is now made to the following brief description, taken in connection with the accompanying drawings and detailed description.

FIGS. 6A, 6B, 6C, 6D illustrate an embodiment of a series of user screens and prompts in accordance with the disclosure.

DETAILED DESCRIPTION

Figure 1:
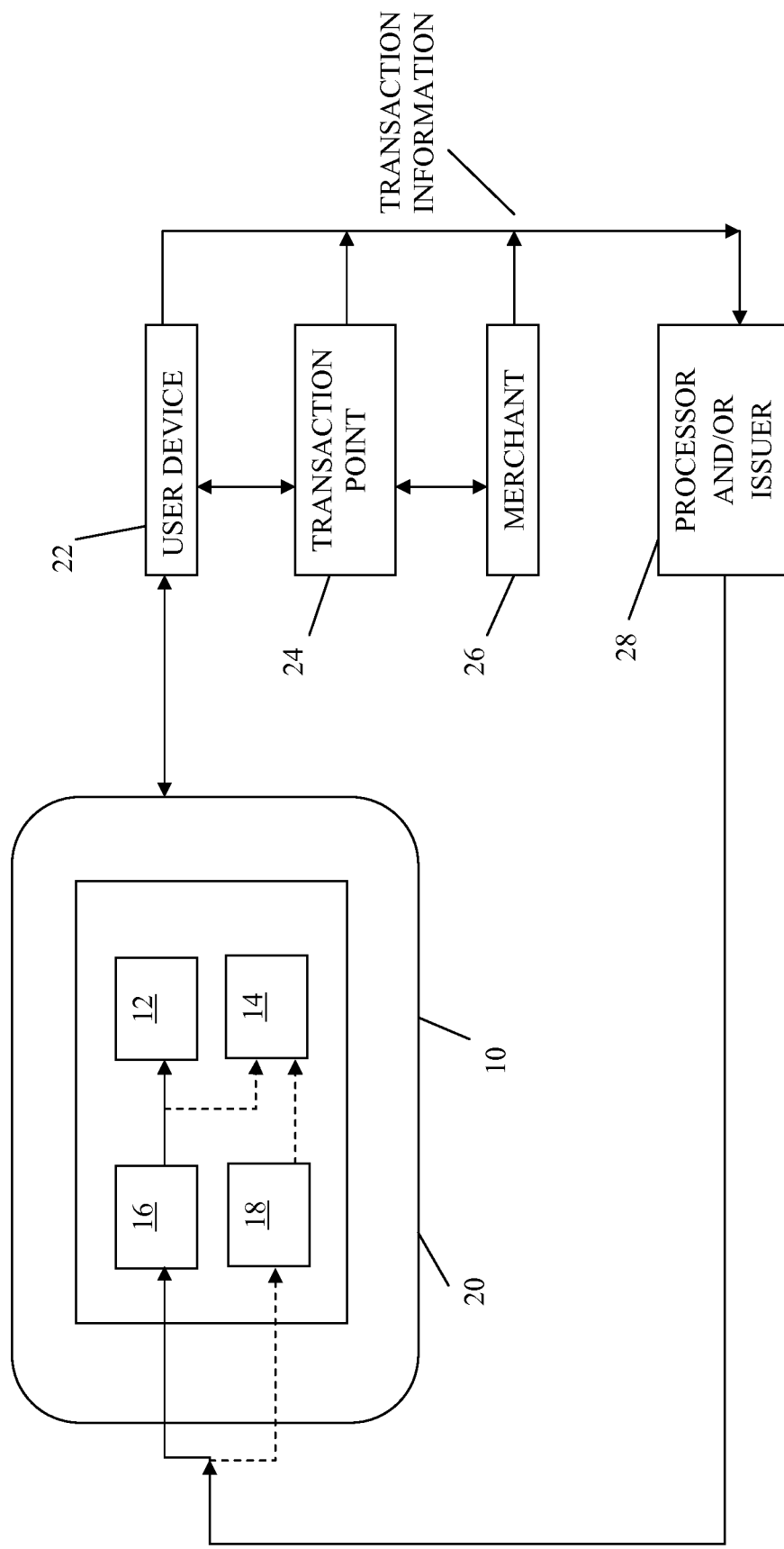
FIG. 1 is a schematic illustration of an embodiment of the disclosed system for tracking an electronic stored-value card.

Disclosed herein are systems and methods for using, managing, and reloading stored-value cards, such as electronic stored-value cards. The systems and methods disclosed herein may additionally provide use, management, and reload processes for stored-value cards which are convenient, familiar, and reliable across a broad spectrum of computing devices, operating systems, web browsers, mobile phone applications, and the like. Particularly, the disclosed systems and methods may provide electronic stored-value card holders a guided process for using, managing, and reloading stored-value cards, for example, by providing a novel, dedicated account ("SAFE account") to users for storing, managing, and allocating prepaid funds associated with particular stored-value cards which are directed to providing funds for reloading, replenishing, and/or "topping off" other stored-value cards (physical or electronic cards) which are capable of having their respective funds balances supplemented, increased, and/or topped off. In an embodiment, the SAFE account is assigned an identifier that may be used by a consumer to access the SAFE account and/or initiate transactions involving the SAFE account.

In an embodiment, the stored-value cards are registered with one or more electronic wallets hosted by one or more electronic wallet service providers. The disclosed systems and methods may provide electronic stored-value card holders a guided process for registering electronic stored-value cards (hereinafter "eSVC" or "eSVCs") into existing and new electronic wallets, for example, by providing improved integration of processes for the issuance of eSVCs, for the registration of eSVCs into electronic wallets, and for the redemption of the eSVCs.

Acquisition and/or purchase of a stored-value card (e.g., an eSVC) may involve an account vendor, a redeeming merchant, and an account issuer. In various embodiments, the account vendor, redeeming merchant and account issuer may be the same, different, or related entities. The point of sale where the electronic stored-value card is purchased and/or acquired is referred to herein as the account vendor or simply vendor. An entity that will accept value contained in the electronic stored-value card for business transactions, for example, as tender for a purchase, is referred to as a redeeming merchant. An entity that provides the financial backing and/or payment processing accessed via use of the electronic stored-value card is referred to as the account issuer, or simply, issuer. Account issuers may include direct issuers of electronic stored-value cards such as store-branded cards (e.g., Macy's, Target), and in some embodiments the account vendor may also be the account issuer and/or the redeeming merchant. Account issuers also may include banks, financial institutions, and processors such as VISA, Mastercard, American Express, etc., and electronic stored-value cards issued by such institutions may be readily accepted by a number of redeeming merchants to conduct transactions such as purchases. Account issuers may be in various industries, such as the entertainment, health, medical, pharmaceutical industries. For example, the account issuer may be a pharmaceutical company utilizing promotional electronic stored-value cards for pharmaceutical products. In some instances, an electronic stored-value card may be sold and/or issued at the same or different account vendor (e.g., account vendor is Store X or a different or unrelated Store Z). In such instances, the Store X branded electronic stored-value card may be issued by Store X, by Store Z, or by a third party such as bank or financial institution.

The eSVC may be obtained (e.g., sent, received, delivered, fetched, acquired, presented, or combinations thereof) via various communication means, including SMS, email, video (e.g., YouTube, Vimeo, Skype, video message, or combinations thereof), instant message, a website, an online storage medium, a cloud storage system, other means for electronically obtaining the eSVC, or combinations thereof.

As used herein, "electronic-stored value card" refers to an electronic embodiment of an account that may be used to transact business with a merchant willing to accept a value (e.g., points, miles, dollars, or any other measure of value), for example as tender for a purchase or discount for a purchase. As used herein, "electronic stored-value card" may additionally or alternatively refer to an electronic embodiment of an account used for promotional and/or marketing purposes. The accounts may comprise credit accounts, debit accounts, gift accounts, telephone accounts, loyalty accounts, membership accounts, ticket accounts, entertainment accounts, sports accounts, prepaid accounts, discount accounts, healthcare accounts, the like, or combinations thereof. Such accounts may be associated with corresponding physical card products, including credit cards, debit cards, gift cards, telephone cards, loyalty cards, membership cards, ticket cards, entertainment cards, sports cards, prepaid cards, discount cards, healthcare cards, the like, or combinations thereof. Such accounts may additionally or alternatively comprise electronic accounts, such as electronic credit accounts, electronic debit accounts, electronic gift accounts, electronic telephone accounts, electronic loyalty accounts, electronic membership accounts, electronic ticket accounts, electronic entertainment accounts, electronic sports accounts, electronic prepaid accounts, electronic discount accounts, electronic healthcare accounts, the like, or combinations thereof.

As used herein, "SAFE" or "SAFE account" refers to a stored-value card funds account which allows users to associate (e.g., maintain, place, store, and/or deposit) stored-value cards comprising funds intended for transfer to another stored-value card (a/k/a "reload cards" or "packs") in database. The SAFE account allows users to decide when they want to load funds onto other general purpose reloadable ("GPR") cards associated with the Safe account. The SAFE account also allows users to decide what percentage of funds associated with reload cards they want to use to reload other GPR cards, e.g., use any amount from about 1% to about 100% of a reload card's associated funds to replenish, reload, and/or top off one or more GPR cards. The SAFE account allows users to direct funds associated with stored-value cards, i.e., reload cards, maintained, placed, stored, and/or deposited in the SAFE account to pay, settle, offset, or otherwise meet obligations of the user owed to user-approved entities. The SAFE account also enables mitigation of fraud through a variety of tools. The SAFE account requires users to provide an email address and/or other identifying information (e.g., name, address, Social Security number, and date of birth) upon set-up, as well as a self-assigned PIN (the self-assigned PIN should be different than a scratch-off PIN associated with a reload card). The self-assigned PIN must be used at time of a reload (not the different scratch-off PIN). In an embodiment, the SAFE account requires the user to provide the full GPR card number to the SAFE account's data receiver prior to transferring funds. In an embodiment, when a user who does not have the physical GPR card they want to transfer funds to with them (such as when a child or grandchild has the physical GPR card at college), the user can safely load funds to that physical GPR card remotely.

As used herein, "transaction information" refers to information associated with an electronic stored-value card, a digital sticker, or both. The transaction information is used for a transaction with a merchant using the electronic stored-value card. In embodiments, transaction information may comprise a transaction value (e.g., monetary, rewards, discount), a transaction location (e.g., GPS coordinates, store name, IP address, device name), a transaction type (e.g., credit, debit, discount, reward, purchase, exchange, redemption, swap), a merchant identifier (e.g., merchant name, merchant code), an issuer identifier (e.g., an account issuer identification number), a processor identifier (e.g., processor name, processor code), an identifier for the electronic stored-value card (e.g., card name, card nickname, an account number, UPS, a card security code (CSC), a card verification value (CVV or CVV2), a card verification value code (CVVC), card verification code (CVC or CVC2), verification code (V-code or V code), card code verification (CCV), credit card ID (CCID), or combinations thereof), a phone number, an identification number (e.g., PIN, driver's license number, passport number, visa number, social security number, IP address), an expiration date, a billing address, or combinations thereof. As will also be more fully described herein, there are certain basic concepts and functions employed by stored-value card transaction enabled systems. These concepts include the utilization of e-wallets to facilitate stored-value card transactions and stored-value card management. These concepts also include the creation of SAFE account, accessing the SAFE account, and establishing rules for the SAFE account's use.

Embodiments of electronic wallets (e.g., electronic wallet 10) for use in the disclosed system of FIG. 1 and methods are described hereinbelow.

Figure 2:
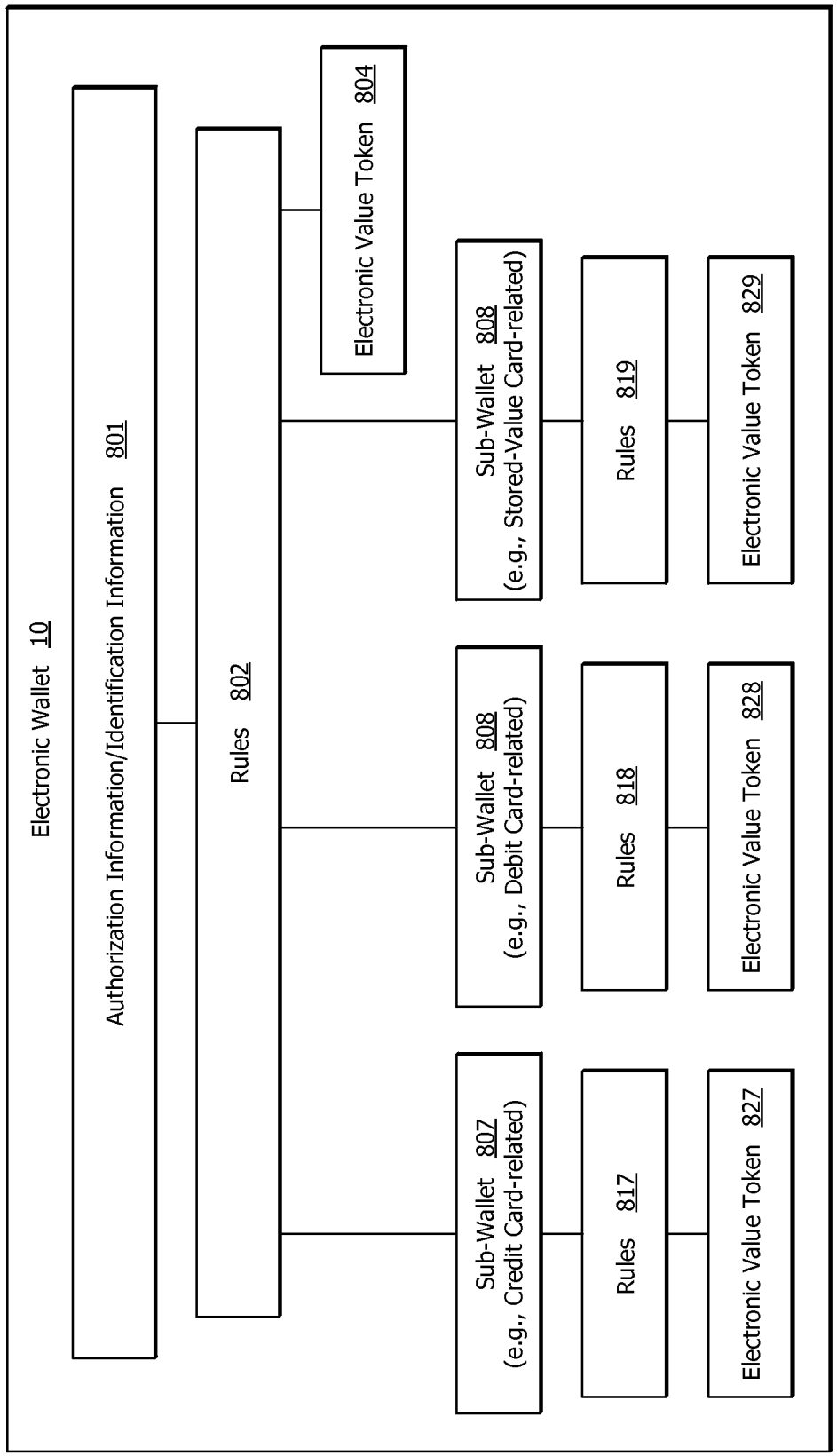
FIG. 2 is a schematic illustration of an embodiment of an electronic wallet utilized in the system and methods described herein.

As shown in FIG. 2, an electronic wallet (also referred to herein as "e-wallet") is an electronically maintained data file which may comprise authentication information, rules for use, sub-wallets (e.g., for separately maintaining credit-card related information, debit card-related information, and stored-value card-related information, electronic stored-value card-related information), electronic value tokens (e.g., electronic representations of the monetary and/or other value associated with the credit-card related information, debit card-related information, and stored-value card-related information contained in the e-wallet/sub-wallet), or combinations thereof. In certain embodiments (e.g., in FIGS. 6A-D described in detail below), a user may create an e-wallet, establish rules for the e-wallet, provision the e-wallet, and access the e-wallet to facilitate electronic transactions.

Also disclosed herein, as shown in FIGS. 3A-D, and 5A-C, an electronic value token transaction processing system provides users, merchants, vendors, issuers, providers, and other interested parties an efficient, secure, and effective system for facilitating the organization, management, transportation, storage, and use of the aforementioned e-wallets, SAFE accounts, and electronic value tokens in financial transactions.

As will be more fully described herein, there are certain basic concepts and functions employed by e-wallets and e-wallet enabled systems. These concepts include the creation of an e-wallet, provisioning the e-wallet (e.g., converting tangible cards into electronic value tokens and associating the electronic value tokens to an e-wallet or requesting an electronic value token be associated with the e-wallet), accessing the e-wallet, and establishing rules for the e-wallet's use.

Moreover, as will be more fully detailed herein, the e-wallet may be used in a system wherein the e-wallet provider manages the entirety of the e-wallet's contents (e.g., the primary e-wallet, any sub-wallets or secondary wallets, and associated electronic value tokens therein). Alternatively, the e-wallet may be used in a system wherein the e-wallet provider manages only a portion of the e-wallet's contents (e.g. the primary e-wallet and electronic value tokens therein) and delegates the management of one or more (or all) sub-wallets or secondary wallets to a third-party's electronic value token transaction processing system.

As will be further detailed herein, either of the two described management systems may be configured to allow the systems' user to fully manage the functionalities of the user's e-wallet; participate in value added/bonus programs offered by issuers, vendors, and/or other electronic value token-related parties; participate in card exchange activities (e.g., wherein a user exchanges an electronic value token maintained in its e-wallet for an electronic value token not in the e-wallet); and participate in savings programs offered by issuers, vendors, and/or other electronic value token-related parties. FIG. 2 illustrates an electronic wallet 10 in accordance with one embodiment, and it is to be understood that the details of e-wallet 10 may be employed in any of the various embodiments disclosed herein (e.g., as e-wallet 10 of FIGS. 1A, 2A, and 2B) and the maintenance of said e-wallet 10 may be wholly performed by a single e-wallet system (e.g., 100) or may distributed across multiple e-wallet systems (e.g., electronic value token transaction processing systems 1100 and 1200 and E-Wallet Aggregator System 1000). Specifically, FIG. 2 illustrates an electronic wallet 10 comprising authentication information 801, rules 802, electronic value tokens 804, sub-wallet 807 for credit card electronic value tokens, sub-wallet (with corresponding rules 817 and electronic value tokens 827), sub-wallet 808 for debit card electronic value tokens (with corresponding rules 818 and electronic value tokens 828), and sub-wallet 809 for stored-value card electronic value tokens (with corresponding rules 819 and electronic value tokens 829).

Figure 3A:
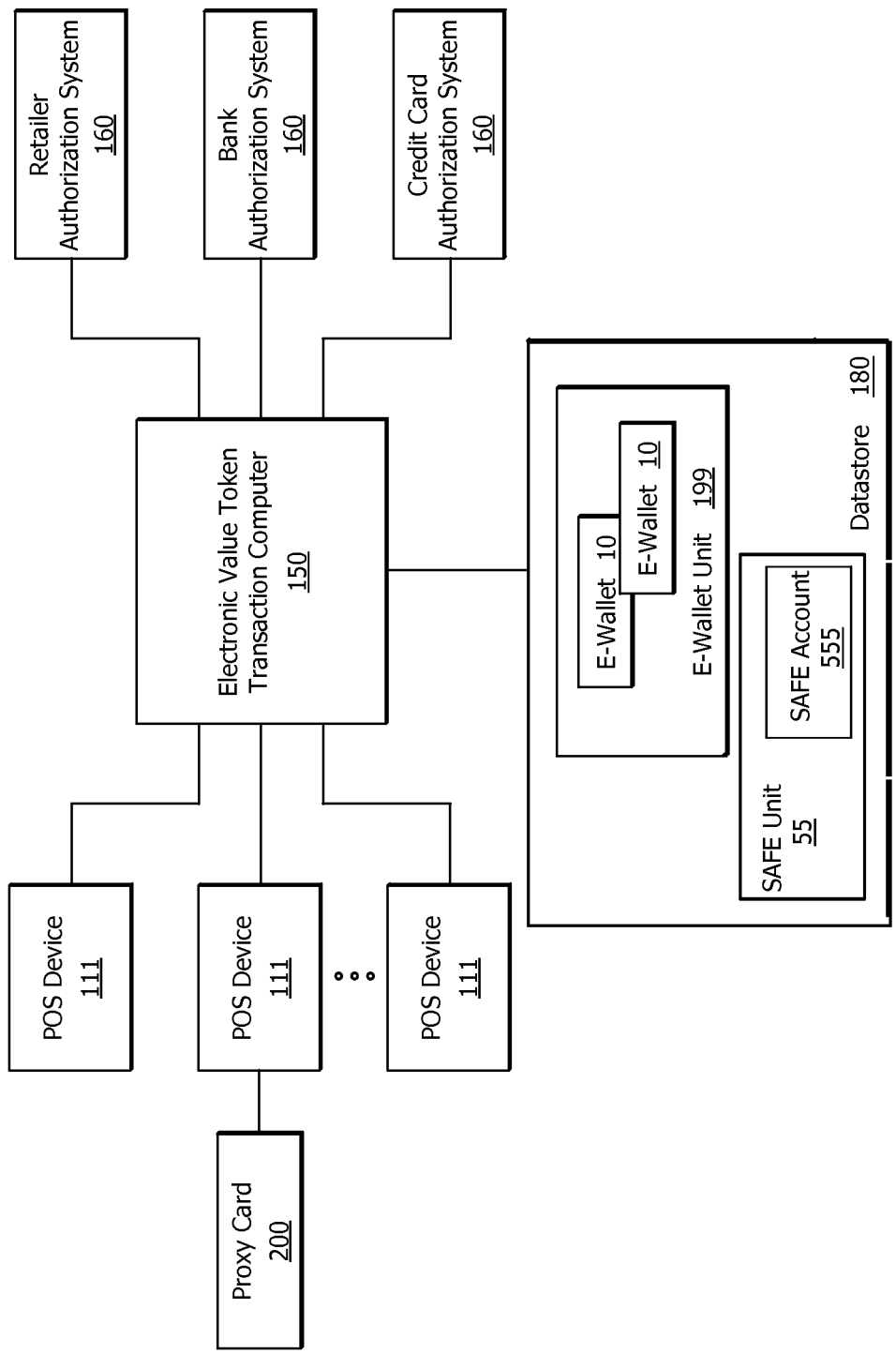
FIGS. 3A, 3B, 3C and 3D are schematic illustrations of embodiments of electronic value token transaction techniques.

FIG. 3A illustrates an exemplary electronic value token transaction processing system 100. Specifically, FIG. 3A illustrates an electronic value token transaction computer 150 configured for communication with point of sale devices 111, one or more authorization systems 160 (e.g., retailer, bank, and credit card), and datastore 180. Moreover, FIG. 3A illustrates that the point of sale devices 111 are in communication with a proxy card 200 (which will be shown below to represent an embodiment of a means for a user to access an e-wallet or SAFE account) and that the datastore 180 comprises an e-wallet unit 199, which in turn comprises e-wallets 10, and a SAFE unit 55, which in turn comprises SAFE account 555.

In order to eliminate the increasing complexity in organization, transport, security, and redemption, transaction cards are stored electronically as value tokens in electronic wallets. As used herein, a value token refers to an electronic identifier that may be used to transact business with a party willing to accept the electronic value token, for example as tender for a purchase. Examples of such value tokens include electronic representations of, or associated with, stored value cards (also referred to as prepaid cards) and other physical representations of value of a variety of types such as credit cards, debit cards, gift cards, prepaid telephone cards, loyalty cards, membership cards, tickets or ticket cards, entertainment cards, sports cards, prepaid cards, coupons, admission passes, prepaid or pre-purchased goods or services, and the like. In an embodiment, a value token includes cash or currency. In an embodiment, the electronic value token includes a credit or debit card or account. In an embodiment, a value token includes a preexisting account such as a merchant account, bank account, etc. In an embodiment, a value token includes a merchant-issued and/or accepted credit, points, coupon or promotional value. In an embodiment, a value token is associated with a prepaid card or account, and unless otherwise indicated it is to be understood that the various embodiments described herein may be carried out in the context of a prepaid card or account such as a merchant gift card.

A physical credit card, debit card, stored-value card, or other physical representations of value may be converted into a value token. In an embodiment the value token may be added to an electronic wallet. For example, physical gift cards or other physical representations of value may be transformed into value tokens in a user's electronic wallet via a point-of-sale device, cellular phone, a computer, short messaging service ("SMS"), and the like. Once so transformed, the electronic value tokens may be redeemed by the user, after authentication, without possession of the physical representation such as gift cards by accessing the user's electronic wallet during purchase. In this way, the use of the term value token herein refers to electronic representations and physical representations that can be transformed into electronic representations. In at least one embodiment, the physical gift card is inoperative after transformation. In an alternative embodiment, the physical gift card is inoperative after redemption of the electronic value token using the electronic wallet or the physical gift card Consumer use of value tokens typically involves a vendor, a redeeming merchant or retailer, and an issuer. In various embodiments, the vendor, redeeming merchant, and issuer may be the same, different, or related entities. The point of sale where value tokens are purchased or otherwise made available for inclusion in an electronic wallet may be referred to as the vendor. Thus, the vendor sells the electronic value tokens themselves although the electronic value tokens may be redeemed at another place of business. An entity that will accept a value token for business transactions, for example as tender for a purchase, may be referred to as a redeeming merchant (or simply, merchant) or retailer. For example, a grocery store may sell the electronic value token of an apparel store. The grocery store is the vendor and the apparel store is the redeeming merchant or retailer. An entity that provides the financial backing and/or payment processing for a given value token such as a prepaid card or account may be referred to as the issuer. Issuers include direct issuers of value tokens such as store-branded value tokens (e.g., store branded prepaid cards or tokens issued directly by the merchant, sometimes referred to as closed-loop prepaid cards), and in some embodiments the vendor may also be the issuer and/or the redeeming merchant (e.g., a prepaid card or token issued, sold, and redeemed by the same merchant). Issuers also include financial institutions such as banks, VISA, MasterCard, American Express, etc., and value tokens issued by such institutions may be readily accepted by a number of redeeming merchants to conduct transactions such as purchases (sometimes referred to as open loop prepaid cards or tokens since they may be redeemed at a number of different merchants). Issuers may also be the providers of branded electronic wallets such as Google, Facebook, Twitter, and the like, and in some embodiments such branded wallet contains value tokens associated with the issuer (e.g., Google "cash" or credits, Pay Pal currency, Facebook electronic currency, etc.) and may contain or be associated with a sub-wallet containing gift card-related value tokens, a sub-wallet containing credit card-related value tokens, a sub-wallet containing debit card-related value tokens, or a combination thereof.

Generally, an electronic value token transaction computer 150 credits or debits (or takes other actions of the type described herein) the accounts associated with the electronic value tokens contained within an electronic wallet or sub-wallet. The electronic value token transaction computer 150 may generate or forward messages to authorization systems 160 so that the authorization systems 160 can credit or debit (or take other action of the type described herein) the accounts associated with the electronic value tokens. Confirmation messages are returned to the electronic value token transaction computer 150 and POS device 111, and the electronic wallet 10 or a sub-wallet is updated as necessary.

In at least one embodiment, transaction information is separate from authentication information. For example, information about a purchase item, purchase price, purchase location, etc. is considered transaction information and is separate from authentication information such as an authentication token, PIN, account number, etc. Among other things, keeping the information separate allows for separate processing and routing, allowing for greater efficiency and privacy. For example, in applying the electronic value tokens according to the configurable rule, the priority may be based on a transaction information variables such as physical location of a retailer originating the electronic wallet request; transaction amount; type of retailer; time of day; day of week; week of month; month of year; department of retailer originating the electronic wallet request; lane of retailer originating the electronic wallet request; identification of checker; parent company of a retailer originating the electronic wallet request; value of value tokens; and type of the electronic wallet request in various embodiments. Such transaction and/or authentication information may be used by the systems described herein in conjunction with rules based decision making (e.g., checking such transaction data to validate and apply a promotion associated with the transaction), for security purposes (e.g., checking such transaction data against pre-determined profiles to assist with fraud detection), and the like.

In at least one embodiment, the wallet provider stands in for the purchaser, and redemption of the electronic value token occurs after the purchase. However, this time mismatch creates a discrepancy in the retailer's records. Specifically, the retailer records a transaction between the retailer and the wallet provider. The retailer records a later redemption via value token, seemingly for no purchase. In these instances, a third party administrator is required that can connect the redemption with the transaction.

There can be many ways to provision or add value tokens to an electronic wallet. For example, a user may pay the vendor for a value token, and the vendor may insert the electronic value token into the user's wallet. Alternatively, the user may obtain a physical representation of the electronic value token from the vendor (e.g., a card, chit, printed receipt, etc.) and may subsequently add the value to the electronic wallet (for example, via a phone or internet accessed user interface). The user may have a choice of many different retailers affiliated with the vendor. In other words, a given vendor may offer a plurality of tokens associated with different retailers. For example, a retailer may offer promotions to compete for the user's business when purchasing a value token such as a prepaid account.

Each retailer may mandate a specific format for value tokens. For example, one retailer may require a 16 digit card number plus a 4 digit month/year expiration date. Other retailers may require pin numbers, access numbers, card verification value numbers, card security code numbers, and the like. Each piece of information for different retailers may have a different format as well as a different name. As such, an electronic wallet provider or host (for example, a primary e-wallet provider) would benefit by allowing third party administration for electronic representations of value tokens have a variety of formats such as stored value cards, credit cards, debit cards, loyalty and promotion cards, and other subsets of value tokens for which administration by the primary e-wallet provider would be more expensive.

In an embodiment, value tokens associated with prepaid cards or accounts may be associated with a sub-wallet within the electronic wallet (for example, a sub-wallet of a primary, branded electronic wallet such as a Google electronic wallet), and a third party may administer the sub-wallet on behalf of the primary/principal electronic wallet host or provider. For example, during a transaction involving value tokens associated with prepaid cards or accounts (e.g., electronic or virtual stored value cards), the provider of the electronic wallet allows a sub-wallet associated with such value tokens to take control of a portion of the transaction, sometimes referred to as a sub-transaction. In an embodiment, a sub-transaction comprises a transaction associated with an electronic prepaid card or account such as redemption, value addition (e.g., topping up), activation, closure, fraud detection, etc. Specifically, the third party administrator can quickly and cheaply administer the transaction, including but not limited to determining and/or providing the proper formatting for the sub-transaction, and further execute the sub-transaction independently and/or in cooperation with the primary electronic wallet host or provider. Such formatting may relate to the particulars of information/data contained upon or associated with a given value token (e.g., type of card number, security code, etc.) and/or the formatting of information or data associated with a particular transaction (e.g., the characteristics, organization, packaging, etc. of data such as card type, transaction type, security code, etc. into messaging fields or other data formats for receipt/transmission while processing a transaction). For example, the third party administration can pass the proper transaction formatting template to the primary wallet provider. In at least one embodiment, the third party administrator determines from the request, or requests from the user, the identity of the retailer associated with the transaction. Preferably, the third party administrator maintains a database of a plurality of transaction formats associated with a plurality of retailers. After determining the identity of the retailer associated with the transaction, the third party administrator identifies the associated transaction format for the identified retailer using the format database and all subsequent processing is performed using the retailer-specific transaction format and vocabulary. In an embodiment, a user may wish to add a value token to an electronic wallet using a physical stored value card. The user is requested to identify the retailer associated with the stored value card, for example via a user interface located at a point of sale (including, in an embodiment, a point of sale associated with a personal computer such as on-line shopping via websites). In another embodiment, the user provides information associated with the stored value token via a web-based or personal digital assistant interface (e.g., a mobile phone app). Accordingly, based upon the user provided data, the appropriate format may be referenced from the database and the user may be shown a pictorial representation or other mockup representation of the physical stored value card with the specific input information highlighted on the mockup. As such, the user knows exactly which inputs are required to add the electronic value token to the electronic wallet. The user inputted information derived from the mockup will be in the proper format and/or may be further modified, packaged, etc. by the third party administrator to meet further formatting requirements. While the example described is simple, more complex transactions are also possible. As will be described more fully herein, transactions relating to (i) using value tokens in primary and/or sub-wallets for portions of transactions is similarly handled as is (ii) exchanging value tokens in primary and/or sub-wallets for other types of value tokens or value tokens associated with other retailers. For example, a user may wish to exchange a value token associated with a retailer the user does not frequent for a value token associated with a retailer that the user does frequent. Moreover, the third party administrator may use the transaction format associated with the identified retailer for financial reconciliation of the transaction or sub-transaction (e.g., debiting and crediting a prepaid account). In this instance, use of the proper transaction format is not only convenient but often required.

As indicated above, an electronic sub-wallet is a specifically defined portion of an e-wallet located in or associated with a specific e-wallet (e.g., a primary or principal wallet). A sub-wallet may be administered/maintained by the primary or principal e-wallet's administrator, processor, and/or provider or may be administered by another party, system, processor, subroutine, or server. The separate administration of the electronic sub-wallet allows the primary e-wallet provider and user to take advantage of economies of scale. For example, all electronic value tokens may be stored in one sub-wallet while credit and debit cards are stored in the primary e-wallet or a separate electronic sub-wallet. As such, the provider of the primary e-wallet may administrate/perform transactions concerning value tokens associated with credit and debit cards residing in the primary e-wallet while allowing a third party to administrate/perform transactions concerning value tokens associated with electronic value tokens residing in an electronic sub-wallet, freeing the third party from costly banking and credit regulations. Moreover, the third party administrator may use the economies of scale to receive payment for its services via arbitrage, commission, pay per transaction, or the like.

Via the separate administration of a sub-wallet, the third party administrator (e.g., administrator of an electronic sub-wallet associated with electronic prepaid accounts) provides convenience to both the user and the primary electronic wallet provider. Often, the third party administrator is the only entity with the knowledge and expertise (e.g., a database of required transaction formats) to process financial reconciliations or other transactions associated with an electronic prepaid account associated with a given issuer. For example, a third party administrator may be the only entity capable of matching a particular transaction on the retailer's book to a particular use of a value token or electronic wallet.

As discussed in more detail herein, in some embodiments, the third party administrator carries out, implements, and/or is responsible for all or a portion of the functionality described in conjunction with the electronic value token transaction computer 150, for example in the context of administering one or more electronic sub-wallets (e.g., an electronic sub-wallet associated with electronic prepaid accounts such as closed loop accounts issued on behalf of one or more merchants) for the primary host or provider of an electronic wallet such as a branded electronic wallet.

Access to an electronic wallet or SAFE account may be gated or protected by an authentication token or other means for secure access, examples of which include a proxy card or a personal digital assistant or mobile device such as a smart phone. Other embodiments for secure access to an electronic wallet or SAFE account include cardless access such as a number/password combination, a number without a password, and the like. Biometric information may also be used for authentication and access purposes, e.g. a fingerprint or iris print. Near field communication technology may also be used to implement authentication tokens. Near field communication technology may be implemented at a physical point of sale or in association with an online transaction. In either context, the near field communication technology may be implemented by a user via a proxy card (e.g., 200, 201, or 203), personal computer, personal digital assistant, smart phone 204, or other online transaction-related device. Thus, the authentication token may be tangible, intangible, or a combination thereof. In an embodiment, the authentication token may be generated, created, and/or formed at the initiation of an electronic transaction to uniquely identify the electronic transaction. In an embodiment, the uniquely generated authentication token may comprise elements of an electronic wallet identifier, a SAFE account identifier, a merchant identifier, a point of sale identifier, an electronic value token identifier, an electronic value token issuer identifier, an electronic value token transaction processor identifier, or combinations thereof. In another embodiment, the uniquely generated authentication token may be wholly unique and not comprise any portion of any previous identifier.

Figure 4A:
FIGS. 4A, 4B, and 4C are front perspective views of embodiments of proxy cards.
Figure 4B:
Figure 4C:
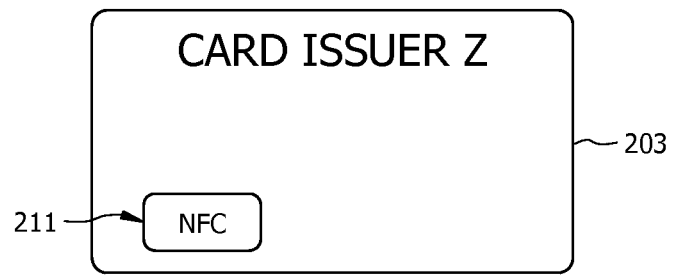

Examples of proxy cards are depicted in FIGS. 4A, 4B, and 4C. FIG. 4A depicts a proxy card 200 in which the authentication information 211 is encoded on the card 200 by means of a bar code capable of being read by an optical scanner. FIG. 4B depicts a proxy card 201 in which the authentication information 211 is encoded on a magnetic strip located on the card 201. FIG. 4B depicts a proxy card 203 in which the authentication information 211 is encoded on a computer chip on the card 201, such as a near field communications chip. In some embodiments, the proxy card may have a magnetic strip and a bar code (or a plurality of magnetic strips and/or bar codes), and one or more of such may contain the authentication information 211. The proxy cards 200, 201, and 203 are fabricated from a suitable first material, such as plastic, paper, a plastic-coated paper, laminates, or combinations thereof. The proxy cards 200, 201, and 203 are typically made in a thickness range of from about 0.005 to about 0.040 inch. The proxy cards 200, 201, and 203 each bear authentication information 211, for example an account number, serial number, authorization code, digital signature, electronic key or key code, RFID chip/data, etc. corresponding to an e-wallet. The proxy card authentication information 211 is unique to the proxy card and associates the proxy card to an electronic wallet, and in an embodiment such association is stored in a database accessible by an administrator of the e-wallet. The authentication information 211 may be encoded in a bar code as depicted in FIG. 4A on proxy card 200, a magnetic strip as depicted in FIG. 4B on proxy card 201, a near field communication chip, or other computer chip, as depicted in FIG. 4C on proxy card 203, a series of numerals, a series of letters, or a combination thereof. The proxy cards 200, 201, and 203 may also be fashioned with personal identification numbers, or PINS, to be entered during the course of the transaction, that correspond to the authentication information 211 and allows access and/or use of the electronic wallet. In an embodiment, the PIN may be encoded in a bar code, a magnetic strip, a series of numeral, a series of letters, or a combination thereof. In an embodiment, the PIN may be obscured from view by packaging, by an obscuring material such as a scratch-off strip or peel-off label, or combinations thereof. In some embodiments, the proxy card may comprise a card security code (CSC), a card verification value (CVV or CV2), a card verification value code (CVVC), card verification code (CVC), verification code (V-code or V code), card code verification (CCV), credit card ID (CCID), or combinations thereof, and such codes (along with any other authentication data or token described herein) may be employed in an authorization or authentication transaction, for example initiated at a point of sale in conjunction with an e-wallet payment for a purchase transaction or a SAFE account transfer of funds.

FIG. 4B depicts a proxy card 201 in which the authentication information 211 is encoded on a magnetic strip located on the card 201. The magnetic strip may be made conventional construction, such as one deposited from a slurry, positioned on the card 201 so that it can be scanned in magnetic strip reading equipment such as a Tranz terminal made by Verifone. For additional security, the authentication information 211 may also be subjected to an encryption algorithm prior to encoding on the magnetic strip.

In at least one embodiment, the proxy card 200 comprises a bar code, such as a UPC code (e.g., a GS1-128 or UCC/EAN-128), positioned on the proxy card 201 so that it can be scanned by well-known bar code reading equipment. Encoded in the bar code on the proxy card is a representation of the authentication information 211.

In other embodiments, series of numerals, series of letters, or combinations thereof, may be placed on the proxy cards 200 and 201 to be read or interpreted by a human or a device, i.e. optical character recognition device, configured to interpret a series of shapes corresponding to the package identifier. Any suitable authentication token as described herein such as virtual or cardless authentication tokens, mobile phones, etc. may be employed in the various embodiments described herein.

Figure 4D:
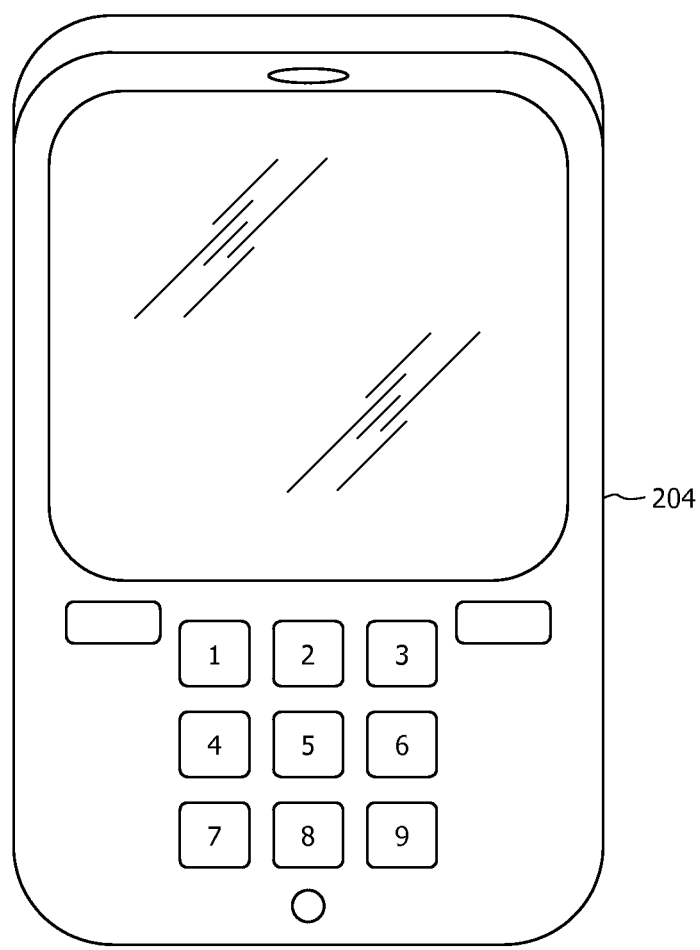
FIG. 4D is a front perspective view of an embodiment of a user device.

In further embodiments, e.g., proxy card 203, near field communication technology, radio frequency identification (RFID) tags, microprocessors, and/or microchips may be placed on the proxy card to be interpreted by specifically configured devices. The RFID tags, microprocessors, and/or microchips may be used in addition to or in place of the bar code 255 on proxy card 200 and magnetic strip 256 on proxy card 201, or may be used in combination with these or other means of encoding the authentication information on the proxy card. Alternatively, such RFID or other means such as near field, Bluetooth, etc. may be employed by a user operated device (e.g., a personal digital assistant such as a smart phone) to provide electronic wallet access and/or authorization functionality. In an embodiment, the authentication token is associated with user device (e.g., user device 22 of FIG. 1) such as a smart phone 204, as depicted in FIG. 4D. For example, an electronic wallet stored in and/or accessed via a phone or a SAFE account associated with a phone may include an authentication token, or the phone itself may contain hardware and/or unique electronic data (e.g., authentication data such as serial number, MAC address, SIM card, digital signature, electronic key, user ID, phone number, passcode, etc.) that serves as the authentication token. Such a phone may use near field communication to communicate data associated with the authentication token for authentication and transaction purposes. For example, the phone may be passed near the point of sale device and transfer user and/or wallet information and authentication information to the point of sale device using near field communication protocol. The phone may transfer all or a portion of the wallet and/or authentication information, leaving the point of sale device to determine which portions are applicable to the current transaction, or the phone may transfer only presently applicable portions of information, i.e. information to be used during the current transaction, to the point of sale device. That is, logic as to the transfer of wallet and/or authentication information to/from the authentication token (e.g., phone) and the point of sale device may reside on the authentication device, on the point of sale device, or both. In an embodiment, the phone may provide hardware and/or software for authenticating a user, for example a camera or scanner and associated application for confirming biometric data associated with the user, and upon authenticating the user, the phone would convey the successful authentication to the point of sale device. The point of sale device may communicate with the wallet host or provider (e.g., a primary e-wallet host), any sub-wallet hosts or providers, and SAFE account hosts, e.g., third party administrators. In another example, the point of sale device may communicate with only the wallet host or provider (e.g., a primary e-wallet host), and the wallet host or provider may communicate with third party administrators, for example a sub-wallet host or administrator and/or SAFE account host. Despite multiple configurations to enable communication, the transaction may still occur in real time with no delay to the customer because the parties use scalable architecture.

In an embodiment, the authentication device is a proxy card. The proxy card's similar appearance to a credit card, debit card, and/or stored-value card will help adoption of and access to electronic wallets and SAFE accounts because consumers know how to use a credit card, a debit card, and/or a stored-value card. As such, consumers may come to think of proxy cards as multiple cards or accounts rolled into one or simply think of a proxy card as an electronic wallet itself, despite being a physical representation. Authentication tokens may take and/or be associated with tangible or intangible embodiments such as a mobile device, a personal identification number, a phone number plus a personal identification number, a password, a username plus password, biometric identifier, and the like. Authentication tokens contain, provide and/or are associated with authentication information (e.g., electronic authentication data or information), which associates a user with an electronic wallet. As such, multiple value tokens contained in the electronic wallet (or a sub-wallet thereof) are associated with the user.

Returning to FIG. 3A, an electronic value token transaction computer 150 accesses electronic wallets 10 and SAFE accounts 555 from datastore 180. The prepaid or stored value card electronic value tokens may include electronic representations of gift cards, loyalty cards, promotions, and the like. In a point of sale purchase transaction, the POS device 111 obtains authentication information from an e-wallet user via an authentication token such as a smart phone or the proxy card 200 and sends the authentication information (and is some instances, rules for allocating the contents of the e-wallet for the requested transaction) to the electronic value token transaction computer 150 along with purchase information and/or value token information as part of a transaction request. The electronic value token transaction computer 150 uses the authentication information to locate the correct electronic wallet 10 or sub-wallet in the datastore 180 and acts upon the electronic value token (e.g., adds a value token to a primary wallet or sub-wallet, activates a value token, debits a value token, tops-off a value token, checks the balance of a value token, etc.) or examines rules (received with the request, associated with the e-wallet by the electronic value token transaction processing system 100, 1100, 1200, or a combination thereof) in light of the request's information. For example, for a purchase transaction the electronic value token transaction computer 150 selects the electronic value tokens that cover the purchase based on the rules, for example rules associated with the order or priority in which to apply or redeem value tokens to cover the purchase price.

Figure 3B:
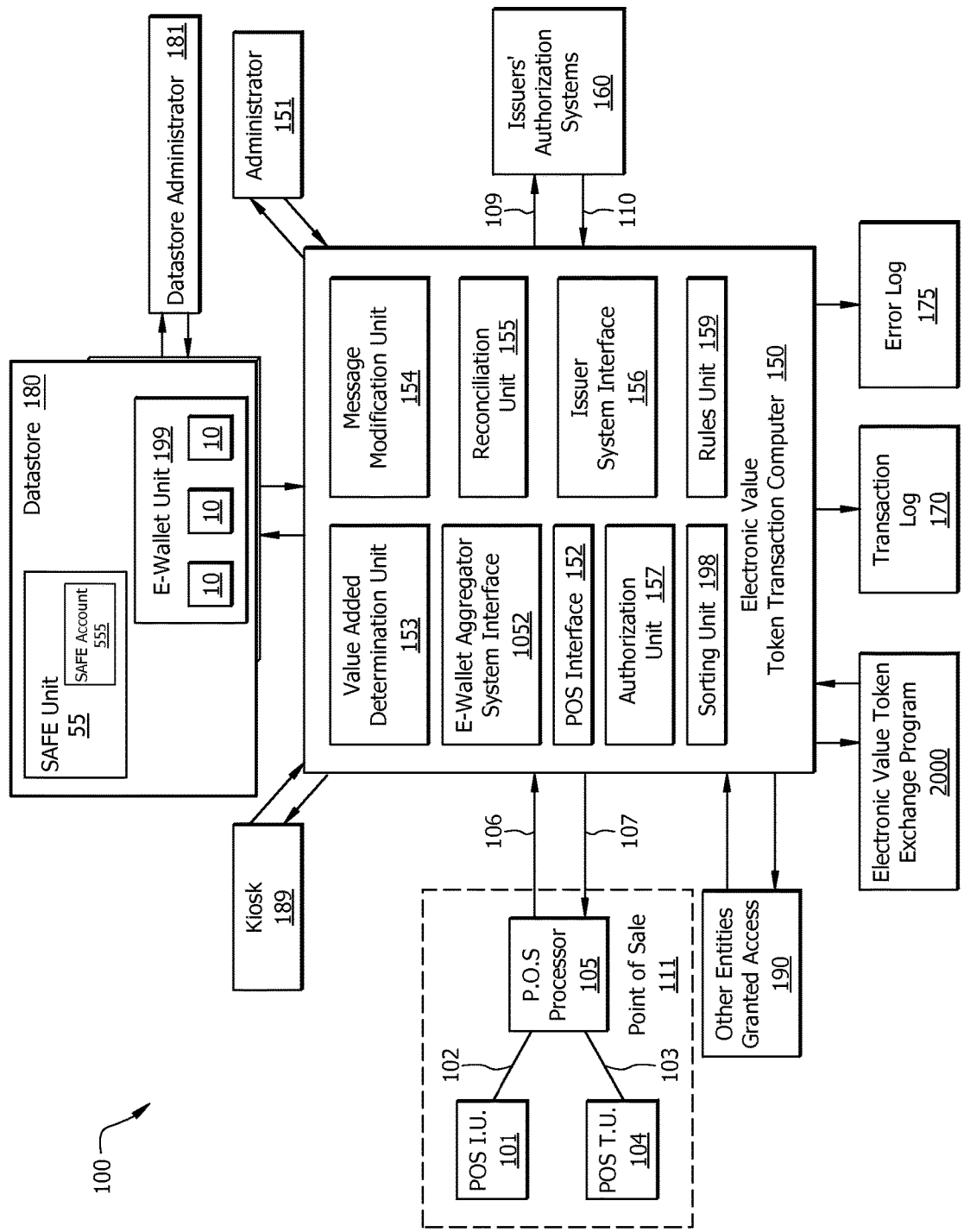
Figure 3C:
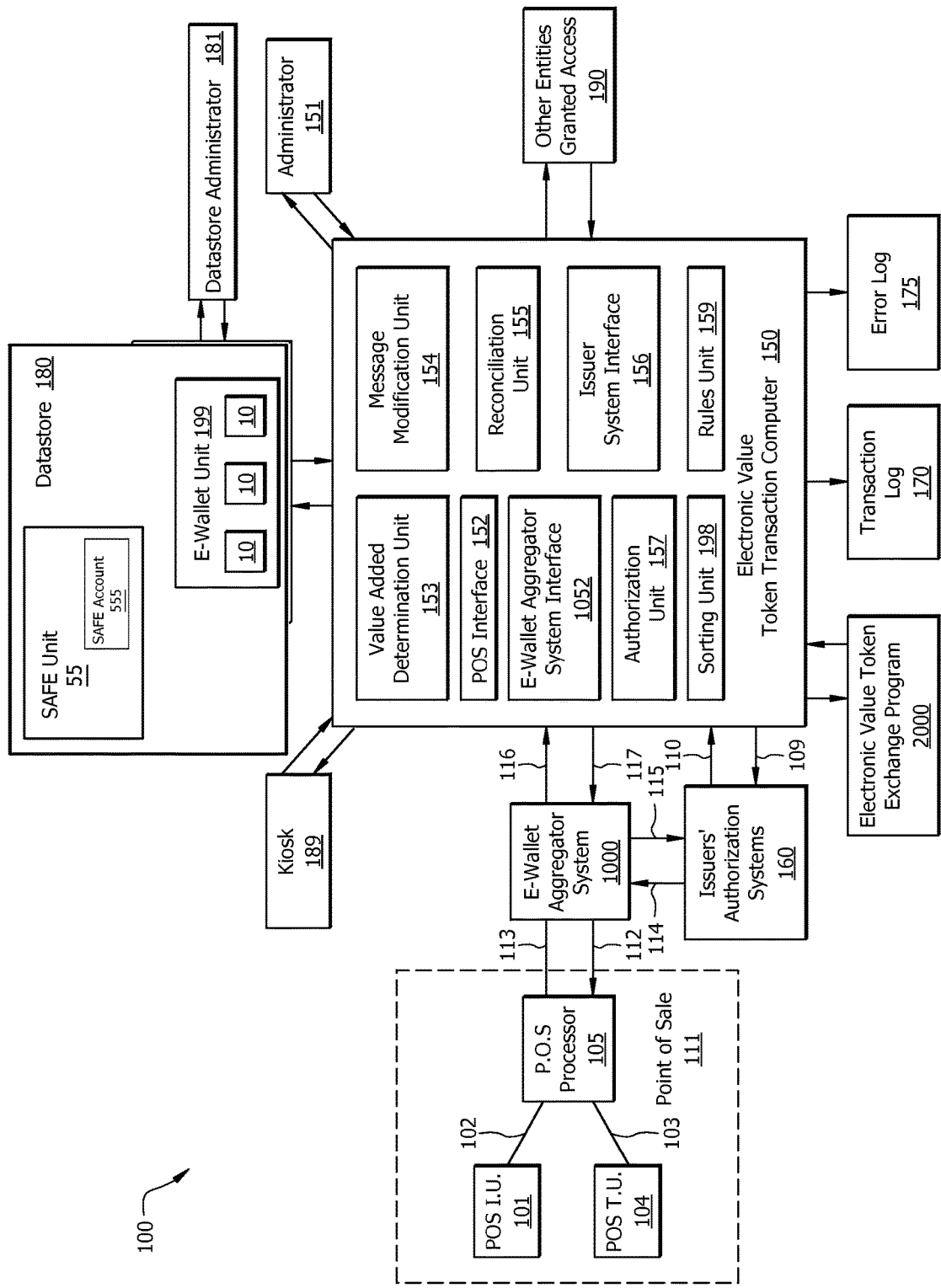

As shown in FIGS. 3B and 3C, the electronic value token transaction computer 150 comprises a rules unit 159. The rules unit 159 provides processing, management, associating, and implementing functionalities for e-wallet (and sub-wallet) and SAFE account rules as provided, selected, and/or required by e-wallet users, e-wallet providers, e-wallet accepting merchants, electronic value token issuers, e-wallet transaction system administrators, SAFE account users, and combinations thereof. The rules unit 159 may function to associate provided, selected, and/or required rules with e-wallets, sub-wallets, and SAFE accounts maintained in the database 180 and/or e-wallet unit 199. The rules unit 159 may comprise a rules engine for deriving rules to be applied to a transaction in the absence of (or in place of) any particular rule provided or selected by any other rule assigning entity. The rules unit 159 may provide for rules data to be populated via (i) user input (e.g., via kiosk, smart phone, personal digital assistant, and internet accessible user interface); provider input; (iii) system administrator's input; (iv) or any combination thereof. For example, an e-wallet user may, via kiosk 189 interfacing, provide the electronic value token transaction computer 150 with specific, customized rules detailing the manner in which electronic value tokens contained in the e-wallet should be prioritized for use in satisfying transactions. Alternatively, the same e-wallet user could simply select the types of rules applicable to the e-wallet from a list of options provided by the kiosk's 189 display. In addition, there may be instances, e.g., in a savings context, wherein certain laws, regulations, and/or policies require that an e-wallet be limited to a given number of selected transactions per period (e.g., transfers from a savings-dedicated e-wallet). In another embodiment, a user may establish rules detailing the manner in which a user's bills may be paid via funds directly transferred from the user's SAFE account to an approved recipient.

In an embodiment, the rules can be created and configured by the user as a flowchart for selection of value tokens based on purchase information. For example, a rule may comprise selection of a closed loop-related (Store X branded) value token for a Store X purchase of any amount, with any remaining purchase balance to result in selection of an open loop-related (Credit Card Y) value token to fund such remainder. Alternatively, the user may invoke a rule that prescribes that open loop-related electronic value tokens should not be used to satisfy balances for closed loop-related electronic value token purchase, but rather debit card-related electronic value tokens residing in the e-wallet should be utilized to satisfy the balance instead. As such, a user may access and apply multiple value tokens with the efficiency of using one authentication token (e.g., one proxy card or smart phone). For example, the user may use an electronic gift card, an electronic coupon, and two electronic credit cards from an electronic wallet or sub-wallet all in the time it takes to use only one physical card such as a prepaid, debit, or credit card. The user, the retailer, issuers, vendors, merchants, advertisers, and other parties benefit from the time saved, the ready access to multiple sources of value (e.g., multiple accounts associated with the various value tokens), promotional opportunities, transaction tracking and data mining regarding customer purchasing behavior, promotional and advertising efficacy, real-time/point of product selection or purchase promotional opportunities, etc.

In another embodiment, the rules may be established by the e-wallet system provider (e.g., a primary and/or secondary e-wallet provider or host). The e-wallet system provider may establish a rule concerning e-wallet allocations when there is no user established rule available (or if under the terms of a user's e-wallet use agreement the system's rules take precedent in designated transaction activities). For example, the e-wallet system may put a rule in place that directs the electronic value token transaction computer 150 to first apply an e-wallet system provider's own branded electronic value token residing in the user's e-wallet to satisfy the requested transaction when the transaction concerns, relates, or involves an affiliate and/or contractually-related entity of the e-wallet system provider. As such, this type of rule could allow for the e-wallet system provider and its affiliates and/or contractually-related entities to maximize revenues or other business objectives based on use of the e-wallet system and other synergistic effects.

In a further embodiment, the e-wallet's rules may be fashioned to automatically direct electronic value token exchange activities (electronic value token exchange will be discussed in more complete detail herein). For example, the e-wallet user may manage the e-wallet (as will be described in more detail herein, e.g., in relation to FIGS. 6A-6D) so that upon the occasion when the user presents the e-wallet to satisfy a transaction at retail establishment, e.g., Retailer Q, and the e-wallet contains no Retailer Q branded electronic value tokens, the e-wallet will automatically, and in real time, initiates an electronic value token exchange process wherein the e-wallet communicates a request for electronic value token exchange to the electronic value token transaction computer 150. Additionally or alternatively, the user may be presented in real-time with a promotion to obtain a retailer-specific value token (e.g., a real-time offer for a store branded value token such as a credit account) and may be identified in a store, for example, by use of a beacon. In this example, the e-wallet user may mange the e-wallet so that all electronic value tokens associated with prepaid services (gift card-type electronic value tokens) are located in a designated sub-wallet and each of said electronic value tokens may be placed/ordered/designated in the sub-wallet via a preferential ranking system, e.g., most preferred electronic value token or token type (e.g., #1) to least preferred electronic value token or token type (e.g., #22, if there are 22 types of electronic value tokens in the sub-wallet). For example, Retailer M branded electronic value tokens may be designated as most preferred and Retailer L branded electronic value tokens may be designated as least preferred. Further in the example, the e-wallet also has been provided with rules by the user that directs the e-wallet, in circumstances wherein the e-wallet has been presented to facilitate a transaction at a retailer in which the e-wallet contains none of said retailer's electronic value tokens (the e-wallet will recognize the retailer based on information exchanged between the e-wallet and the retailer's communication devices at the onset of the original transaction), such as the Retailer Q scenario described above, the e-wallet rules direct the e-wallet to initiate an electronic value token exchange request and to include in said request the exchange of the least preferred electronic value token residing in the e-wallet, i.e., the Retailer L branded electronic value token (#22) and if necessary preferred electronic value token #21, #20, etc., for a Retailer Q electronic value token in an amount sufficient to meet the original transaction's amount. The electronic value token transaction computer 150, upon receipt of the electronic value token exchange request, communicates with an electronic value token exchange program 2000 (which is part of the overall electronic value token transaction processing system 100, 1100, or 1200) to effectuate the requested electronic value token exchange. The requested electronic value token exchange is performed, the e-wallet receives the requested Retailer Q branded electronic value token, which is coincidentally used in conducting the original transaction, and the e-wallet surrenders (or makes unavailable for use and only available for modification) the Retailer L branded electronic value token to the electronic value token transaction computer 150, which in this case was actually valued in excess of the requested Retailer Q branded electronic value token. As such, the electronic value token transaction computer 150, modifies the value of the Retailer L branded electronic value token (either internally or via communication with the Retailer L branded electronic value token's issuing system) to reflect the value reduction based on the provided Retailer Q branded electronic value token, extracts the exchange rate for the exchange of the Retailer Q branded electronic value token for the Retailer L branded electronic value token (as will be discussed more fully herein), communicates the transactional information to all interested parties, and returns (or makes available again) the value-modified Retailer L branded value token to the user's e-wallet. In an alternate embodiment, the e-wallet's electronic value token exchange rules could have provided that the e-wallet query the electronic value token transaction computer 150 regarding the best available exchange rate for the electronic value tokens residing in the e-wallet and make the exchange based on the best exchange rate rather than the ranking of the electronic value tokens.

FIG. 3B illustrates an exemplary electronic value token transaction processing system 100 in accordance with one embodiment. As shown, the electronic value token transaction processing system comprises: (a) at least one point of sale device 111; (b) an electronic wallet processing system, e.g., electronic value token transaction computer 150; (c) a datastore 180 containing an (i) electronic wallet unit 199 storing electronic value tokens, e.g., 804, 827, 828, and 829, such as account numbers, electronic wallet account information, value added award conditions (herein "value added award" is synonymous with "value added bonus," "value added bonus award," "value added award bonus," and "value differentiation"), (ii) a SAFE unit 55 storing SAFE accounts 555 which contain information relating to reload cards associated with the SAFE account, stored-value cards associated with the SAFE account, access code(s) for the SAFE account, PINS for the proxy card associated with the SAFE account, reload cards, and stored value cards, devices associated with the SAFE account; user identification associated with the SAFE account (e.g., email address, physical address, date of birth, biometrics, etc.); and (iii) other information related to adding, redeeming, and managing the electronic value tokens; (d) at least one individual issuers' authorization system 160; and (e) any other unit included in the system by the electronic value token transaction computer administrator 151. In one embodiment, the electronic value token transaction computer 150 comprises a value added determination unit 153, a point-of-sale ("POS") interface 152, a message modification unit 154, a reconciliation unit 155, an issuer system interface 156, an authorization unit 157, and a sorting unit 198. In an embodiment, the electronic value token transaction computer 150 (or a unit thereof such as sorting unit 189) further comprises token exchange interface, which may communicate with electronic value token exchange program 2000. The POS Interface 152 provides a means for the electronic value token transaction computer 150 to communicate with the point of sale device 111 via, for example, the Internet, a Public Switched Telephone Network ("PSTN"), or an independent dedicated network. Likewise, the electronic value token transaction computer 150 may communicate via issuer system interface 156 with the issuers' authorization system 160 via, for example, the Internet, a Public Switched Telephone Network (PSTN), or an independent dedicated network. Communications 106, 107 between the POS interface 152 and the point of sale device 111 and communications 109, 110 between the issuer system interface 156 and the issuers' authorization systems 160 may be encrypted for added security and/or may utilize a virtual private network ("VPN"). The sorting unit 198 may sort the communications into various types for routing in various ways. For example, the sorting unit 198 may identify and sort electronic wallet and/or sub-wallet requests (e.g., upon receipt of authorization information with a transaction request, the sorting unit 198 can route the requested transaction to a specific electronic wallet maintained by the system and/or to a specific sub-wallet or sub-wallets associated with an electronic wallet), balance inquiry requests, registration requests, activation requests, redemption requests, and management requests for routing to the various units of FIG. 3B. The electronic value token transaction computer 150 or sorting unit 198 may also generate messages based on the requests for similar routing.

As can be seen in FIG. 3B, at the point of sale device 111 (typically located at a vendor and/or redeeming merchant or retailer, but alternatively located at a kiosk 189 or at a user's home or office where a personal computer is configured to act as a point of sale, for example during an on-line transaction), the authentication token is interpreted by a point of sale interpretation unit 101 (e.g., a card reader). The point of sale interpretation unit 101 can comprise a human, a bar code scanner, magnetic strip reader, optical character recognition device, biometric device, numerical keyboard (e.g., for entering a token identification number) or other device configured to interrogate, interpret, capture, or input the data encoded in or on the authentication token.

About contemporaneously with (or, alternatively, prior or subsequent to) the interpretation of the authentication token, a request for an electronic wallet transaction by a point of sale transaction unit 104 is made. The point of sale transaction unit 104 can comprise a human, an electronic input device, a register or terminal, a computer processing unit ("CPU"), a personal computer, a personal digital assistant (e.g., smart phone) or other means of requesting or messaging interpreted by the point of sale interpretation unit 101 and/or point of sale processing unit 105. In some embodiments, the actions performed by the point of sale interpretation unit 101 and the point of sale transaction unit 104 may be performed by one unit capable of performing both actions that would be performed by the individual units, for example a point of sale register/terminal or a personal computer during an on-line, web-based transaction.

The point of sale interpretation unit 101 and the point of sale transaction unit 104 communicate with the point of sale processing unit 105. The point of sale processing unit 105 can comprise a CPU or other type of processing device accepted for use in the industry. The point of sale interpretation unit 101 communicates authentication information 102 to the point of sale processing unit 105. The point of sale transaction unit 104 communicates the request 103 for an electronic wallet transaction to the point of sale processing unit 105. The point of sale processing unit 105 may combine this information to communicate with the electronic value token transaction computer 150 (e.g., transmits a message requesting an electronic wallet transaction along with the associated transaction and/or authentication data). In an embodiment, the point of sale processing unit 105 stores and/or receives from the electronic value token transaction computer 150 (or a sub-administrator or unit associated therewith, such as a sub-wallet administrator) a transaction format associated with the POS retailer and/or associated with a given transaction type and/or value token, and such transaction format may be used to format the transaction request or message, to prompt the user for further information, or for other data gathering or transmit/receive features at the point of sale. For example, a user making a purchase at a retailer operates a card reader. A card reader may a display with an input device and a barcode reader or magnetic strip scanner. The card reader may be touch sensitive and may have various buttons used for input. Following the card reader prompts, the user sees the options "Debit," "Credit," and "E-Wallet." The user selects "E-Wallet." The user then sees the options "Purchase," "Add Token," and "Delete Token." The user selects "Purchase." Following additional prompts (which in an embodiment relate to a transaction format specific to the particular retailer of the point of sale), the user enters a PIN number. In some embodiments, the actions performed by the point of sale interpretation unit 101, the point of sale transaction unit 104, and the point of sale processing unit 105 may all be performed by one unit (e.g., an integrated POS device such as a computerized register) capable of performing all the actions that would be performed by the individual units.

The point of sale processing unit 105 is connectable to the electronic value token transaction computer 150 via a suitable network, such as the Internet, the public switched telephone network (PSTN), or an independent dedicated network. Each point of sale processing unit 105 has an associated identifier (e.g., a terminal identifier or serial number) that may be transmitted to the electronic value token transaction computer 150 during the course of connecting the point of sale processing unit 105 to the electronic value token transaction computer 150. Each point of sale processing unit 105 may include multiple point of sale transaction units corresponding to individual terminals each with its own terminal identification, for example present within a given store location.

As depicted in FIG. 3B, the electronic value token transaction computer 150 is configured to: (a) form a secure connection with the retailer/merchant and/or vendor (e.g., via the point of sale device 111, customer internet access, or kiosk 189), the issuers' authorization systems 160, and any other entities 190 (e.g., a user accessing its SAFE account via a personal or professional computer, a smart phone, a tablet PC, kiosk, website, or the like) authorized to access the electronic value token transaction computer 150 by the electronic value token transaction computer administrator 151; (b) to communicate with issuers' authorization systems 160 to request and receive redemption or addition of value tokens into electronic wallets; (c) to communicate with issuers' authorization systems 160 to redeem all or a portion of the electronic value tokens associated with the electronic wallet; (d) generate and maintain a transaction log 170 of all activities performed; (e) generate and maintain an error log 175 of all activities unsuccessfully completed and reasons therefore; (f) communicate to the retailer/merchant and/or vendor (e.g., via the POS unit 111) the redemption or addition of value tokens into electronic wallets and any information concomitant with the redemption or addition of value tokens into electronic wallets; and (g) communicate to the retailer/merchant and/or vendor (e.g., via the POS unit 111) any reasons why transactions cannot not be completed.

The electronic value token transaction computer 150 may comprise a singular processing unit (e.g., a centralized server), a plurality of processing units (e.g., a distributed computing system with various units distributed and in communication with each other), or combinations thereof, with concomitant storage capabilities, each capable of or designated for: accessing the datastore 180; creating a transaction log 170; creating and maintaining an error log 175; communicating with retailers/merchants and/or vendors, e.g., at a point of sale, including via the internet for on-line transactions; communicating with the individual issuers' authorization systems 160; processing individual value token and electronic wallet requests; processing redemption requests; processing value added functions to add additional cash value or add an electronic redemption coupon for a specific product(s) or service(s); processing redemption request for electronic redemption coupons for specific product(s) and/or service(s); and communicating with other systems 190 capable of and authorized to communicate with the electronic value token transaction computer 150.

Datastore 180 maintains records of accounts associated with each electronic wallet indicating: (a) whether each individual value token has been added or redeemed, (b) whether the authentication token has been registered, (c) records and details of each individual redemption request, (d) the amount remaining on the electronic value tokens, (e) rules required for redeeming the electronic value tokens, (f) identity of the issuers of the electronic value tokens, (f) value added bonus awards, (g) rules for redeeming value added bonus awards, and (h) any combination thereof. The datastore may also maintain records of rules required for granting a value added bonus award to an electronic wallet or value token.

Datastore 180 also maintains records associated with each electronic wallet and/or sub-wallet indicating: (a) timing of, and other information related to, registration activities; (b) timing of, and other information related to, management activities; (c) timing of, and other information related to, transaction activities; (e) rules applicable; (f) identity of the issuers electronic value tokens therein; (f) identity of sub-wallets associated therewith; (h) any other records requested by issuers, merchants, vendors, advertisers, users, or other interested parties; and (i) any combination thereof. While a single datastore 180 is shown, it should be understood that a plurality of datastores may be employed, and relevant data divided among the datastores in any suitable manner to meet the various processes and objectives described herein. Also, the various data may be associated with one or more datastores closely coupled to and/or located in proximity to one or more sub-units, sub-processors, third party processors, and the like associated with the electronic value token transaction computer 150, and such datastores preferably have data used by such sub-units, sub-processors, and third party processors.

Datastore 180 also maintains records associated with each SAFE account indicating: (a) timing of, and other information related to, SAFE account creation; (b) timing of, and other information related to, SAFE account management activities (e.g., information and use requests); (c) timing of, and other information related to, SAFE account transaction activities; (e) rules applicable; (f) identity of the stored value cards associated with the SAFE account (e.g., reload cards and GPR cards); (f) identity of devices associated with SAFE account; (h) any other records requested by issuers, merchants, vendors, advertisers, users, or other interested parties; and (i) any combination thereof. While a single datastore 180 is shown, it should be understood that a plurality of datastores may be employed, and relevant data divided among the datastores in any suitable manner to meet the various processes and objectives described herein. Also, the various data may be associated with one or more datastores closely coupled to and/or located in proximity to one or more sub-units, sub-processors, third party processors, and the like associated with the electronic value token transaction computer 150, and such datastores preferably have data used by such sub-units, sub-processors, and third party processors.

The electronic value token transaction computer 150 is also configured to generate and maintain a transaction log 170 of all activity involving the electronic value token transaction computer 150. The transaction log may comprise a detailed summary of transaction types such as: (a) requested value token additions; (b) requested value token sales; (c) requested value token redemptions; (d) requested value token exchanges; (e) the monetary amount ascribed to value token additions; (f) the monetary amount ascribed to value token redemptions; (g) the monetary value ascribed to value token exchanges; (h) the value added amounts, products, or services additions; (i) the value added amounts, products, or services redemptions; (j) the time the electronic value tokens were added; (k) the time the electronic value tokens were redeemed; (l) the transaction or communication performed with the issuer for adding value tokens; (m) the transaction or communication performed with the issuer for redeeming value tokens; (n) the PIN communicated to the vendor in response to a request to add a value token requiring the input of a PIN for use; (o) e-wallet registration; (p) e-wallet set-up activities; (q) e-wallet transaction activities; (r) e-wallet savings activities; (s) e-wallet management activities; (t) any other information the electronic value token transaction computer administrator 151 directs the electronic value token transaction computer 150 to maintain as a log entry; and (u) any combination thereof.

The information contained in the transaction log 170 may be used for data mining purposes, e.g., to generate reconciliation reports, settlement reports, payment reports, audit reports, e-wallet registration reports, e-wallet management reports, e-wallet usage reports, e-wallet savings reports, electronic value token purchase reports, electronic value token redemption reports, electronic value token exchange reports, electronic value token sale reports, or other forms of information aggregation for the benefit of, use by, or for provision to, the electronic value token transaction administrator 151, the datastore administrator 181, vendors, issuers, issuers' authorization systems 160, redeeming merchants, or other interested parties. For example, the transaction log 170 contains information about each transaction performed by electronic value token transaction computer 150 (and any sub-components thereof) and may be utilized by the reconciliation unit 155 when reconciling accounts belonging to various vendors, merchants, issuers and the electronic value token transaction processing system administrator(s). Additional data mining considerations that may be recorded, analyzed, and/or provided interested parties (e.g., vendors, merchants, issuers, advertisers, etc.) include data about: (i) the purchase habits of e-wallet users; (ii) electronic value token purchases, sales, redemptions, and exchanges; (iii), special offer and/or value added activities; (iv) loyalty-related activities; and (v) savings-related activities, all of which can be used for marketing, inventory, and other purposes.

Oversight and maintenance of the electronic value token transaction computer is performed by the electronic value token transaction computer administrator 151. Although not required, in an alternative embodiment, the electronic value token transaction computer administrator 151 may also function as the datastore administrator 181. The electronic value token transaction computer 150 is configured to generate and maintain an error log of all transactions that were not completed and reasons therefore. In some embodiments, the error log is administered by the electronic value token transaction computer administrator 151.

The electronic value token transaction computer 150 is also configured to communicate with other entities 190 authorized to access the electronic value token transaction processing system and specifically authorized to access the electronic value token transaction computer 150. These other entities may granted full, limited, or restricted access and may comprise third party payment management systems, third party audit systems, issuer affiliated entities, vendor affiliated entities, redeeming merchants or redeeming merchant affiliated entities, financial institutions such as banks, credit card agencies, or credit unions, e-wallet and/or SAFE account users, or any other entity provided access by the electronic value token transaction computer administrator 151 or other entity having authority to grant access.

The transaction request from the point of sale device 111, or other access point, associated with an e-wallet may contain one or more of the following pieces of information: (a) authentication information, (b) point of sale terminal identification, (c) amount to be credited or debited, (d) the time of the request, (e) the date of the request, (f) identification of the issuer, (g) identification of the vendor, (h) location of vendor, (i) identification of the product(s) and/or service(s) being purchased, (j) an activation or deactivation request, (k) a wallet management function such as addition of a value token, deletion of a value token, exchange of a value token, changing management or processing rules associated with one or more value tokens, partitioning a wallet into sub-wallets or vice-versa, etc., (l) and any combination thereof. However, the information contained within the request is not limited to the enumerated list but may comprise other items in addition to the items enumerated or in place of the items enumerated above.

Upon receipt of the electronic wallet transaction request from the point of sale, and identification and sorting as such by the sorting unit 198, the electronic value token transaction computer 150 accesses the electronic wallet unit of datastore 180. The electronic value token transaction computer 150 processes the information contained in the datastore 180 and communicates 109, 110 with the individual issuers' authorization systems 160 to effectuate management of the electronic value tokens and corresponding accounts. The message modification unit may adjust the messages and requests so that multiple units, sub-components/processors, or third-party administrators can recognize and correctly interpret the messages. For example, after the electronic value token transaction computer 150 determines the individual issuers' authorization systems 160 associated with the request, the message modification unit 154 accesses the database 180 to determine the appropriate transaction messaging formats for each individual issuers' authorization systems 160 and then formats the subsequent communications to said individual issuers' authorization systems 160 using the individual issuers' authorization systems 160 specified/preferred transaction format and vocabulary. The electronic value token transaction computer's 150 communication with the individual issuers' authorization systems 160 may occur simultaneously or independently. The electronic value token transaction computer 150 is connectable to the individual issuers' authorization systems as via a suitable network, such as the PSTN, the Internet, or an independent dedicated network. The electronic value token transaction computer 150 is configured to send and/or receive communication 110 from the issuers' authorization systems 160 concerning the status of the electronic value tokens.

The reconciliation unit 155 reconciles the accounts of various issuers, selling vendors, and/or redeeming merchants, to credit and debit appropriate merchants, vendors, the electronic value token transaction processing system administrator, and issuers with the value of various transactions to reflect which entities received value from which other entities. For example, if a vendor A sells a value token issued by issuer B for a specified amount and receives payment from a user who adds the electronic value token to the user's electronic wallet, the selling vendor receives a percentage (e.g., retains a percentage) of the purchase amount and/or a predetermined amount, the electronic value token system administrator receives a percentage of the purchase amount and/or predetermined amount for processing the transaction, and the issuer receives the remainder. If a value token issued by issuer Y is redeemed at merchant X to purchase items, then the amount redeemed is debited to the issuer Y and credited to the merchant X, sometimes minus a transaction fee collected by the issuer and/or a transaction or processing fee collected by the electronic value token transaction processing system administrator.

Authorization unit 157 is utilized when the electronic value token transaction computer 150 is also the authorizing system such that the electronic value token transaction computer 150 authorizes electronic wallet requests rather than transmitting the request to the issuers' authorization systems 160 for authorization. The authorization unit 157 may perform the same and/or different functions as described for authorization systems 160 and vice-versa.

The authorization unit 157 will validate the formatting of the e-wallet transaction request (e.g., primary or sub-wallet) received from the POS processor 105 (or other transaction originating device/component/processor). In other words, the authorization unit 157 will check the data fields in the request to confirm that the fields are populated with data and that the data is in the correct format (e.g., length, alphanumeric format). If the request is improperly formatted, the authorization unit 157 will reject the request, or in some embodiments may retrieve the proper format (e.g., from a format database) and modify the transaction request to comply with the proper format. The authorization unit 157 also performs various validation checks on the request. The authorization unit 157 verifies card-related transaction information based on an analysis of several criteria, such as: 1) determining that the UPC code for the product is present in the datastore 180 (or other database such as an issuer's database) for the electronic value token transaction processing system 100; 2) determining that the value amount of the requested transaction corresponds to the customer's payment for the subject transaction request, e.g., whether the UPC information identifies the card as a $25.00 card and that the corresponding transaction request includes a $25.00 payment by the customer; 3) determining that the UPC information identifies the card as being a type of card available for processing by the requesting merchant; and 4) determining that the Bank Identification Number ("BIN") of the card (i.e., the first six digits of the card's identification number), which identifies the card issuer, corresponds to the UPC information identifying the card issuer.

The authorization unit 157 may also verify transactions based on other criteria such as transaction velocity (number/amount per unit time). For example, if a card processor is concerned that multiple void transactions are indicative of fraudulent activity, the card processor could ask that the electronic value token transaction processing system 100 monitor the number of void transactions requested and reject transactions from terminals that exceed a pre-selected amount of void transactions per unit time. Lastly, the authorization unit 157 may be configured to reject transaction requests in the event that the information received by the authorization unit 157 is unintelligible.

If the request is properly formatted and is validated as described above, the electronic value token transaction computer 150 may transmit details of transactions to the issuers' authorization systems rather than authorization requests. Also, in some embodiments, the issuer, the authorizing system (e.g., authorization unit 157), and the transaction computer are part of the same entity and, in such an embodiment, there would be no issuers' authorization systems 160 or the issuers' authorization systems 160 would be under common control with the other units of the electronic value token transaction computer 150 (for example, a commonly owned and operated computing system, that may be centralized (e.g., part of a centralized data center) and/or distributed within a commonly owned or controlled system or network). Furthermore, it should be noted that although units associated with the electronic value token transaction computer 150 (e.g., units 152-157) are depicted as various units within a single data processing system for illustration and conceptual purposes, one or more of units 152-157 could be implemented on separate computers, systems, or servers in a distributed data processing environment.

Figure 5A:
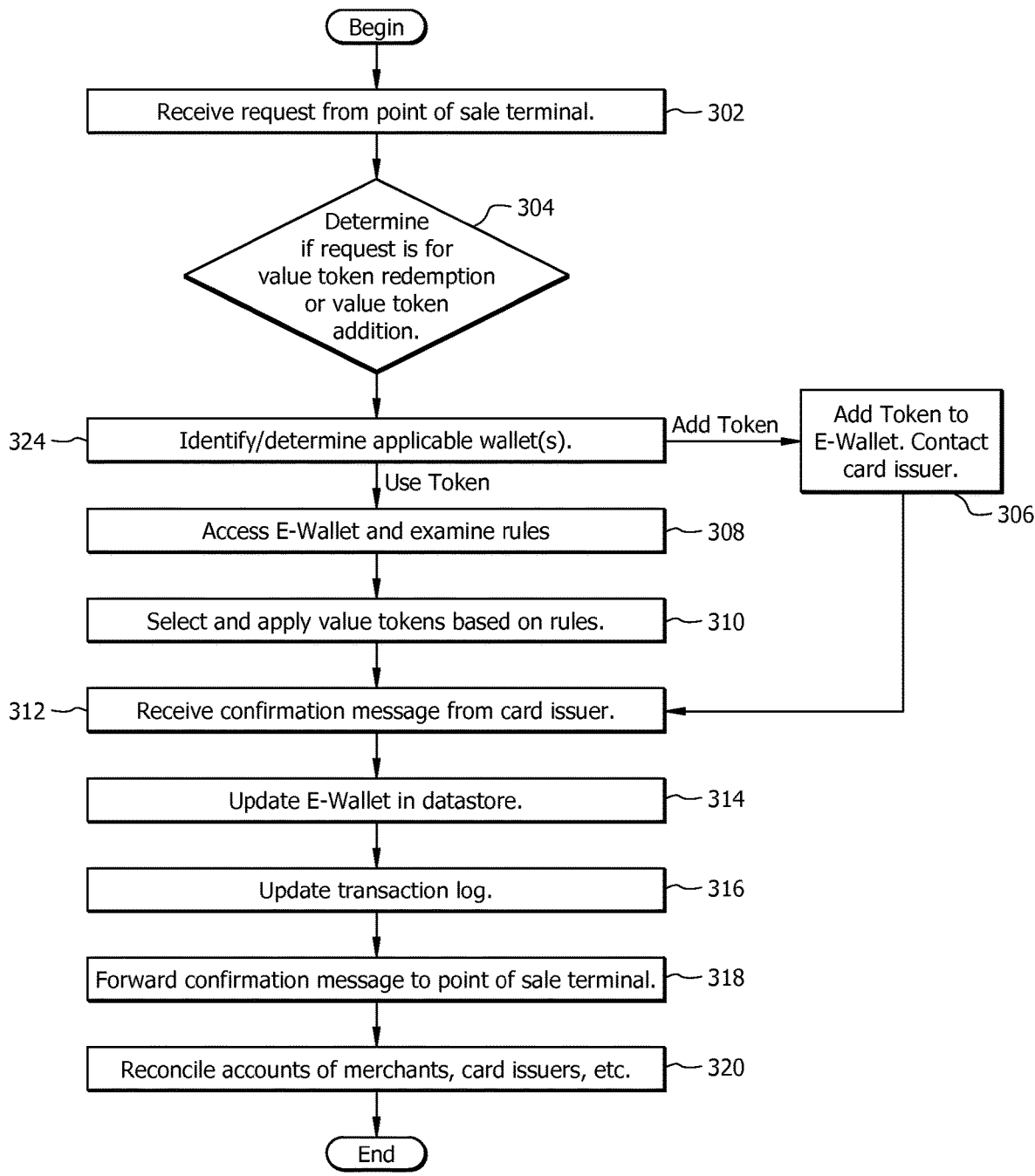
FIG. 5A is a flowchart of an embodiment of a process for creating an electronic wallet or adding/redeeming value to/from the electronic wallet.

An exemplary process utilized by an electronic value token transaction computer 150 for facilitating a purchase using an electronic wallet in accordance with a primary e-wallet transaction processing embodiment is depicted in FIG. 5A. Such an embodiment may be exemplified by the e-wallet transaction processing request being both initially received by and subsequently performed by the electronic value token transaction processing system 100. The actions depicted can be performed in the order shown or in a different order, and two or more of the actions can be performed in parallel.

In block 302, the electronic value token transaction computer 150 receives a request or multiple requests from a point of sale terminal. In at least one embodiment the requests may comprise an electronic wallet transaction request, a balance inquiry request, a registration request, an activation request, or a redemption request, a wallet management request, and contains one or more of the following: (a) identity of the terminal, (b) authentication information, (c) the amount of the purchase, (d) the identity of the electronic value token issuer, (e) the identity of the vendor, (f) the identity of the location, (g) the time of the request, (h) the date of the request, (i) information expressly identifying the request as an e-wallet transaction request (e.g., transaction type data); (j) information identifying a primary e-wallet, sub-wallet(s), or a combination thereof; (k) any other transaction and/or authentication data described herein; and (l) any combination thereof. The request at block 302 may comprise other information, requests or functions, for example of the types described herein, in addition to or in place of the above enumerated items. In at least one embodiment, the authentication information is based on an authentication token selected from the group consisting of proxy card and cellular phone. Using the identity of the electronic value token issuer, transactions may be correctly formatted for communication with the electronic value token issuer.

Using information contained within the electronic wallet transaction received from the point of sale device 111 and/or from information obtained from datastore 180, in block 304, the electronic value token transaction computer 150 determines whether the request is an electronic wallet request containing valid authentication information and whether the request is for redemption of a value token(s), addition of a value token(s), deletion of a value token(s), balance inquiries, transaction history, or management of the electronic wallet. The electronic wallet request may comprise a bank identification number ("BIN") located on the proxy card as part of the authentication information. The sorting unit may decode the BIN number or otherwise verify that the request is an electronic wallet request.

Using information contained within the electronic wallet transaction received from the point of sale device 111 and/or from information obtained from datastore 180, in block 324, the electronic value token transaction computer 150 identifies/determines the primary e-wallet, sub-wallet(s), and/or locations of said e-wallet or sub-wallet(s) indicated/necessary to effectuate the received e-wallet transaction request. If the authorization information received indicates the requested e-wallet transaction involves a primary e-wallet, sub-wallet, or combinations thereof maintained by the electronic value token transaction computer 150, the electronic value token transaction computer 150 may (i) apply its own logic to the request; (ii) apply rules stored in a primary wallet (e.g., rules established by the electronic value token transaction processing system administrator, the primary e-wallet user, or a combination thereof); (iii) apply rules stored in a sub-wallet (e.g., rules established by the electronic value token transaction processing system administrator, the sub-wallet user, or a combination thereof) (iv) apply rules received with the request from the point of sale 111 (e.g., contemporaneous rules submitted with the request by the user of the primary e-wallet/sub-wallet); (v) or any combination thereof.

For example, an embodiment may include the electronic value token transaction computer 150 determining that the entire request is related to value tokens contained in a primary e-wallet. Upon receipt of the request, the electronic value token transaction computer 150 will query its authorization unit 157 (as described more fully herein), its datastore 180, the E-Wallet unit 199, and any other necessary unit to determine whether the primary e-wallet comprises value tokens capable of meeting the subject request (e.g., whether the primary e-wallet contains value tokens associated with vendors, merchants, and/or issuers related to the requested transaction). Such determination may be performed by comparing electronic value token identifications, user IDs, requested transaction types. The electronic value token transaction computer 150 will subsequently evaluate the manner in which the electronic value tokens available in the primary e-wallet corresponding to the request will be applied under the primary e-wallet's rules and/or rules received with the request, and perform or refuse to perform the requested transaction and/or transactions.

Another embodiment may include the electronic value token transaction computer 150 determining that the entire request is related to value tokens contained in a sub-wallet. Upon receipt of the request, the electronic value token transaction computer 150 will query its authorization unit 157 (as described more fully herein), its datastore 180, the E-Wallet unit 199, and any other necessary unit to determine whether the sub-wallet comprises value tokens capable of meeting the subject request (e.g., whether the sub-wallet contains value tokens associated with vendors, merchants, and/or issuers related to the requested transaction). Such determination may be performed by comparing electronic value token identifications, user IDs, requested transaction types. The electronic value token transaction computer 150 will subsequently evaluate the manner in which the electronic value tokens available in the sub-wallet corresponding to the request will be applied under the sub-wallet's rules and/or rules received with the request, and perform or refuse to perform the requested transaction and/or transactions.

In another example, an embodiment may include the electronic value token transaction computer 150 determining that a portion of the entire transaction request is related to electronic value tokens residing in a primary e-wallet while a portion of the transaction request is related to electronic value tokens residing in a sub-wallet(s). Such determination may be made by evaluating the requested transaction type, the electronic value token identification, or any other methods for determining transaction allocation. The electronic value token transaction computer 150 will evaluate the manner in which the electronic value tokens available in the primary e-wallet corresponding to the request will be applied under the primary e-wallet's rules (as those rule may affect payment methods to be employed which are located in the primary e-wallet), the electronic value token transaction computer 150 will evaluate the manner in which the electronic value tokens available in any applicable sub-wallet corresponding to the request will be applied under such sub-wallet's rules and/or rules received with the request, and perform or refuse to perform the requested transaction and/or transactions.

In an exemplary embodiment, at block 324, the electronic value token transaction computer 150 may identify, in response to a received transaction request, one or more value tokens in a primary e-wallet and one or more electronic value tokens in a sub-wallet that, when used together, will cover the entirety of the requested e-wallet transaction. Moreover, one of the electronic value tokens located in the primary e-wallet or sub-wallet may be an electronic representation of a loyalty card and another electronic value token located in either the same or different location of said loyalty card value token may be an electronic representation of a retailer's gift card. In such an example, the electronic value token transaction computer 150 can effectuate the coincidental use of the "loyalty card" token and the "retailer's gift card" token, regardless of the tokens' locations in the primary e-wallet and/or sub-wallet(s) to allow for an enhanced user benefit as opposed to not coincidentally applying the value of the "retailer's gift card" token and the "loyalty card" token for the transaction, e.g., a 5% increase in the value of the "retailer's gift card" token or loyalty point bonus applied to the "loyalty card" token for the use of the "retailer's gift card" token.

A value token may be associated with a closed loop account or open loop account. A closed loop account typically expires after the funds in the account have been depleted, e.g. a gift card account. An open loop account does not typically expire. Rather, there is typically an ongoing obligation for various entities to credit and debit the account, e.g. a branded credit card account or debit card account such as Visa or Mastercard. Closed loop accounts are often associated directly with retailers while open loop accounts are often associated with financial institutions (e.g., Chase or Citi issued Visa). In at least one embodiment, the electronic value tokens comprise closed loop account numbers and open loop account numbers. The closed loop account numbers are associated with retailers able to debit or credit closed loop accounts associated with the closed loop account number. The open loop account numbers are associated with financial institutions able to debit or credit open loop accounts associated with the open loop account numbers. The electronic value token may have an expiration date or specified dates of use that are different from any other value tokens. Furthermore, the electronic value tokens may identify specific merchants, locations, and/or products with which the electronic value tokens may be utilized.

If the request is for value token addition, then in block 306, the electronic wallet is created (if not already created) and the electronic value token is added to the electronic wallet. The following Tables include elements, parameters, and information included in e-wallet transaction communications and used by the electronic value token transaction processing system 100 to facilitate and effectuate e-wallet transactions.

Table 1A illustrates request parameters requested to create a wallet in at least one embodiment. Table 1 illustrates response parameters requested to create a wallet in at least one embodiment.

TABLE 1A

Request Parameters

| Element | Data Type | Suggested Length | Description |
|---|---|---|---|
| accounttype | String | 200 | Account Type |
| loadamt | decimal | N/A | Amount to be loaded into the wallet account |
| loadamtcurrency | string | 3 | Denomination Type. |
| txn-uniqueidentifier | string | 12 | Unique transaction id. |

TABLE 1

Response Parameters

| Element | Data Type | Description |
|---|---|---|
| accountid | string | Unique identifier for an account |
| accounttype | string | Type of the account. |
| currency | string | Denomination Type. |
| balance | decimal | Balance available in the account |
| uniqueidentifier | string (numeric) | The unique identifier identifies a transaction. |
| code | string | The Status of the requested transaction. |
| description | string | The Status description of the requested transaction. |

The electronic value token transaction computer 150 preferably allocates memory for the electronic wallet and value token(s) and associates the account number with the electronic wallet and/or authentication information stored in the electronic wallet unit 199 by storing the pieces of information in a data structure on the datastore 180. Table 2 illustrates the parameters for a gift card value token in at least one embodiment.

TABLE 2

| Element and Description | Data Type | Suggested Length |
|---|---|---|
| statusinfo.status.code | String | 7 |
| statusinfo.status.description | String | 500 |
| card.retailer.id | Integer String | 11 |
| card.retailer.name | String | 100 |
| card.number | String | 50 |
| card.securitycode | String | 50 |
| card.expirydate | Integer String | 6 |
| card.activationdate | Date String | 20 |
| card.initialbalance | Decimal String | 10 |
| card.currentbalance | Decimal String | 10 |
| card.currentbalanceasof | Date String | 20 |
| card.customerservice.phone | String | 20 |
| card.customerservice.website | String | 256 |
| card.currency | String | 3 |

Table 3 illustrates more detailed parameters for a gift card electronic value token in an alternative embodiment, including the designation of associated wallet(s) and/or sub-wallet(s).

TABLE 3

| Element and Description | Data Type | Suggested Length |
|---|---|---|
| card.retailer.id | Integer String | 11 |
| card.retailer.name | String | 100 |
| card.number | String | 50 |
| card.securitycode | String | 50 |
| card.expirydate | Integer String | 6 |
| card.registeredto | String | 10 |
| card.activationdate | Date String | 20 |
| card.initialbalance | Decimal String | 10 |
| card.islookedupinitialbalance | String | 1 |
| card.currentbalance | Decimal String | 10 |
| card.islookedupcurrentbalance | String | 1 |
| card.customerservice.phone | String | 20 |
| card.customerservice.website | String | 256 |
| card.notes | String | 500 |
| card.nickname | String | 100 |
| card.currency | String | 3 |
| card.user.firstname | String | 50 |
| card.user.lastname | String | 50 |
| card.user.address.line1 | String | 50 |
| card.user.address.line2 | String | 50 |
| card.user.address.city | String | 50 |
| card.user.address.state | String | 50 |
| card.user.address.zip | String | 5 |
| card.user.phone.number | String | 10 |
| card.user.email.address | String | 128 |
| card.additionalinfo1 | String | 300 |
| card.additionalinfo2 | String | 300 |
| card.additionalinfo3 | String | 300 |
| wallet.id | Integer String | 10 |
| Collection of folders | | |
| wallet.folder.1.id | Integer String | 10 |
| wallet.folder.1.name | String | 100 |
| wallet.folder.2.id | Integer String | 10 |
| wallet.folder.2.name | String | 100 |
| [ . . . More folders] | | |

The request, however, may be modified for other reasons unrelated to the add token decision and forwarded to the appropriate one of the issuers' authorization systems 160 as part of the reconciliation process, for example the request could concern redemption, deletion, reloading value, added value, balance inquiry, or a combination thereof, each of which would be communicated to the issuers' authorization systems 160 for reconciliation.

Table 4 illustrates formatting for authentication communication.

TABLE 4

| Element and Description | Data Type |
|---|---|
| client_ref_id | String |
| signature | String |
| timestamp | String(in the format yyMMddHHmmssSSSz) |
| nonce | String |
| encryption_type | String |
| usertoken | String |
| uuid | String |
| user_ip | String |
| channel | String |

Each request is authenticated using the signature, a user is authenticated with username/password or open id, the session is validated using the user token. A client may send client_ref_id, timestamp, nonce, encryption_type, channel, user_ip, signature, optionally usertoken with each request to be able to validate each message.

Table 5 illustrates the parameters used to retrieve a user's wallet.

TABLE 5

| Element | Data Type | Description |
|---|---|---|
| accountid | string | Unique identifier for an account |
| accounttype | string | Type of the account. |
| currency | string | Denomination Type. |
| balance | decimal | Balance available in the account |
| code | string | The Status of the requested transaction. |
| description | string | The Status description of the requested transaction. |

Table 6A illustrates the request parameters used to redeem value from a token in the wallet.

TABLE 6A

Request Parameters

| Element | Data Type | Suggested Length | Description |
|---|---|---|---|
| accountid | String | 100 | Unique identifier for the account |
| redamt | decimal | N/A | Amount to redeem from the account |
| redamtcurrency | string | 3 | Amount Type. |
| txn-uniqueidentifier | string | 12 | Unique transaction id. |
| txn-istimeoutreversal | bool | N/A | 0, if it is not a reversal of any transaction type 1, if it is a reversal transaction. |

Table 6B illustrates the response parameters used to redeem value from a token in the wallet.

TABLE 6B

Response Parameters

| Element | Data Type | Suggested Length | Description |
|---|---|---|---|
| accountid | string | 100 | Unique identifier for an account |
| accounttype | string | 50 | Type of the account. |
| currency | string | 3 | Denomination Type. |
| balance | decimal | N/A | Balance available in the account |
| uniqueidentifier | string | 12 | Unique identifier for the transaction. |
| code | string | 7 | The Status of the requested transaction. |
| description | string | 500 | The Status description of the requested transaction. |

Table 7A illustrates the request parameters used to load a value token into the wallet.

TABLE 7A

Request Parameters

| Element | Data Type | Suggested Length | Description |
|---|---|---|---|
| accountid | string | 100 | Unique identifier for an account |
| amount | decimal | N/A | Amount to load on the account |
| amountcurrency | string | 3 | Amount Type. |
| txn-istimeoutreversal | bool | N/A | 0, if it is not a reversal of any transaction type 1, if it is a reversal transaction. |
| txn-uniqueidentifier | string | 12 | Unique transaction id. |

Table 7B illustrates the response parameters used to load a value token into the wallet.

TABLE 7B

Response Parameters

| Element | Data Type | Suggested Length | Description |
|---|---|---|---|
| accountid | string | 100 | Unique identifier for an account |
| accounttype | string | 50 | Type of the account. |
| balance | decimal | N/A | Balance available in the account |
| uniqueidentifier | string (numeric values [0-9] only) | 12 | Unique identifier for the transaction. |
| code | string | 7 | The Status of the requested transaction. |
| description | string | 500 | The Status description of the requested transaction. |
| currency | string | 3 | Denomination Type. |

If the request is for value token redemption, then in block 308, the electronic value token transaction computer 150 accesses the electronic wallet previously determined to be associated with the authentication information and examines the rules associated with the electronic wallet. In at least one embodiment, examining the rules comprises examining priorities of value tokens configurable by the user. For example, the user may prefer to use any closed loop value tokens corresponding to the retailer originating the purchase request. If none is found or if the token will not cover the purchase, then the user may prefer to use an open loop value token for the remainder. As a result of these preferences, the closed loop value tokens may all have higher priority than the open loop value tokens. Among the open loop value tokens, one may have priority over another. For example, the user prefers to pay for any remainder with a credit card rather than a debit card. In at least one embodiment, the user may configure these rules via the Internet or mobile application and save the priorities as default preferences. In an alternative embodiment, the user selects the electronic value tokens to apply to the electronic wallet request at the POS device, for example at a vendor or retailer location such as a check-out lane, customer service counter, or kiosk. As such, selecting the electronic value tokens comprises selecting value tokens with the highest priority that, when used together, will cover the purchase amount. As can be seen in the example, one purchase transaction has been split into two redemptions without compromising efficiency of the purchase. Similarly, one or more electronic wallet transactions can be split into two or more transactions without compromising efficiency. In an embodiment, at least one of the electronic value tokens is associated with a closed loop prepaid account (e.g., an electronic prepaid, gift, or stored value card) and the rules associated with a primary wallet invoke a sub-transaction processed by a third party administrator associated with a sub-wallet.

In at least one embodiment, examining the rules comprises examining percentages of the electronic wallet request to which different value tokens should be applied and wherein applying the electronic value tokens comprises applying the electronic value tokens to the electronic wallet request in according to the percentages. In block 310, the electronic value token transaction computer 150 then selects, based on the rules, value tokens in the electronic wallet that, when used together, will cover the electronic wallet request. For example, the user may configure the rules such that each purchase is split evenly between two credit cards. As such, selecting the electronic value tokens comprises selecting two open loop tokens between which to split the purchase amount. Similar to the above example, efficiency is preserved because where a single authorization token (e.g., only the proxy card or a mobile device) was used at the point of sale, not the two credit cards corresponding to the electronic value tokens. Other rules can be implemented, and the rules can be used in various combinations and permutations with each other. The electronic value token transaction processing system can also implement "if-then" rules based on the information transmitted in the electronic wallet request. For example, a purchase at a gas station can result in a gas credit card value token selection, and the like. In such am embodiment, the electronic value token computer 150 may query the rule(s) 802, 817, 818, and 819 of the subject e-wallet 10 and/or sub-wallets 807 (e.g., for credit card-type electronic value tokens), 808 (e.g., for debit card-type electronic value tokens), and 809 (e.g., for stored value-type electronic value tokens) and determine, based on transaction request information which includes a transaction type, e.g., purchase at a gas station, that rule(s) established for the subject e-wallet 10 and/or sub-wallets 807, 808, and 809 require that the transaction type request be first satisfied with a first electronic value token type, e.g. a gas card-related electronic value token 829, and upon the occasion that the subject e-wallet 10 and/or sub-wallet(s) 807, 808, and 809 do not comprise a sufficient amount of the first value token type to satisfy the entire transaction request, the electronic value token computer 150 may satisfy the remainder of the transaction request with a second electronic value token type, e.g., a debit card-related electronic value token 828.

The electronic value token transaction computer 150 also applies the electronic value tokens to the electronic wallet request. In applying the electronic value tokens to the request, the electronic value token transaction computer 150 can generate and send debit and credit messages to be performed on the accounts administered by the retailers and financial institutions using the appropriate account numbers, or the electronic value token transaction computer 150 can credit or debit the accounts directly if the electronic value token transaction computer has such administrative authority.

In at least one embodiment, the electronic value token transaction computer 150 modifies the request (e.g., applies a required format) and forwards the modified request to the appropriate one of the issuers' authorization systems 160, which receives the modified request and acts upon same, for example authorizing and/or processing the request to redeem the electronic value token and updating a datastore accordingly. The authorization system 160 is not at the same location from where the electronic wallet request was received in at least one embodiment. For example, if the electronic wallet request was received from a retail store, the authorization system may be owned and operated by the retailer, but will not be at the retail store. Rather, the authorization system may be located at a data center for example. As such, neither the retail store nor the retailer in general need be aware of some or all the contents of the wallet. In at least one embodiment, the retail store is unaware of even the presence of the electronic wallet, as it merely recognizes that some transaction authorizing action has been communicated to its point of sale (e.g., swipe of a proxy card, digital personal assistant interaction with point of sale device, entry of a PIN at a keypad at point of sale, or other authorizing activity). In other words, access and use of the e-wallet at the point of sale is seamless and does not require any special or custom actions in order to process the transaction in comparison to traditional physical tender. The issuers' authorization systems 160 sends a response message back to the electronic value token transaction computer 150. In an alternative embodiment where the electronic value token transaction computer 150 performs the functions of the issuers' authorization systems 160, the method may proceed directly from block 306 or 310 to block 314.

The electronic value token transaction computer 150 receives the confirmation message from the appropriate one of the issuers' authorization systems 160 in block 312. At block 314, the electronic value token transaction computer 150 updates electronic wallet in the electronic wallet unit 199 and datastore 180 to reflect that the electronic wallet is activated and to reflect any debit, credit, addition, or deletion to/of the electronic value token(s).

FIGS. 6A-D illustrate a series of user interface screens and prompts in at least one embodiment. For example, the user may see the illustrated prompts when managing the user's electronic wallet via a computer connected to the Internet, and/or kiosk 189.

A transaction log 170 may be updated by the electronic value token transaction computer 150 in block 316 to record the details about the transaction. The details recorded in the transaction log may include (a) the type, time and date of the transaction, (b) whether the electronic wallet was activated, (c) the reason electronic wallet was not activated if the request was denied, (d) the credit, debit, addition, or deletion to/of the electronic value token(s), (e) a change in rules associated with the electronic value token(s), (f) the identity of the vendor, (g) the identity of the issuer, (h) the location of the vendor, (i) the identity of the terminal adding the electronic value token, (j) the identity of the entity granting the electronic value token, and (k) any combination thereof. The transaction log may include other information (e.g., transaction and/or authentication data) in addition to or in place of the items enumerated above.

The electronic value token transaction computer 150, in block 318, then forwards the confirmation message to the point of sale device 111. The electronic value token transaction computer 150, prior to forwarding the confirmation message to the point of sale device 111, may modify the confirmation message, for example as necessary to include information that may be printed on a receipt for the customer and/or presented on a display to the store clerk operating the point of sale device 111. At block 320, the electronic value token transaction computer 150 reconciles the accounts of the various vendors, merchants, issuers, the electronic value token transaction processing system administrator, and other entities involved with issuing, selling, redeeming, and marketing the electronic value tokens to debit and credit appropriate accounts and, in some embodiments, initiates funds transfers between appropriate bank accounts belonging to the various entities. Alternatively, reconciliation of accounts may be performed periodically (e.g., daily, weekly, monthly, etc.) rather than after each transaction. In such an embodiment, the information from the transaction log 170 may be utilized to reconcile the various entities involved with the sale or redemption of various value tokens thus requiring fewer funds transfers to be initiated. In an embodiment, information in transaction log 170 is used to match transactions and the like. For example, grouping all transactions from a given location or a given merchant, or grouping transaction types (e.g., credit, debit, etc.). In various embodiments, the sequence of events depicted in may be varied, and thus may be carried out in any desired order, sequentially or simultaneously.

FIG. 3C illustrates an exemplary electronic value token transaction processing system 1100 in accordance with an embodiment wherein the electronic wallet processing system comprises the electronic value token transaction computer 150, functioning as an electronic sub-wallet transaction processor, integrated with a primary electronic wallet transaction processor such as depicted by E-Wallet Aggregator System 1000. E-Wallet Aggregator System 1000 may be further understood to have the same functionalities, capabilities, database access, networked connections, and operative components as the herein described electronic value token transaction computer 150, and in some embodiments an electronic value token transaction computer 150 and its associated components (e.g., electronic value token transaction processing system 100) may serve as, or be substituted for, the E-Wallet Aggregator System 1000. In an embodiment, the E-Wallet Aggregator System 1000 may be controlled, maintained, operated, owned, and/or otherwise managed by a common entity or entities which control, maintain, operate, own, and/or otherwise manage the electronic value token transaction computer 150. i.e., the primary electronic wallet transaction processor and the electronic sub-wallet transaction processor share a common controller, maintainer, operator, owner, and/or manager. In an embodiment, the E-Wallet Aggregator System 1000 may be controlled, maintained, operated, owned, and/or otherwise managed by an entity or entities that are separate, distinct, and/or unrelated to the entity and/or entities which control, maintain, operate, own, and/or otherwise manage the electronic value token transaction computer 150, i.e., the primary electronic transaction processor and the electronic sub-wallet transaction processor do not share a common controller, maintainer, operator, owner, and/or manager. As shown, when functioning in an electronic sub-wallet transaction processing capacity, the electronic value token transaction processing system 1100 comprises: (a) an electronic value token transaction computer 150; (b) an E-Wallet Aggregator System interface 1052; (c) a datastore 180 containing an electronic wallet unit 199 storing electronic value tokens, e.g., 804, 827, 828, and 829, such as account numbers, electronic wallet account information, value added award conditions (herein "value added award" is synonymous with "value added bonus," "value added bonus award," "value added award bonus," and "value differentiation"), and other information related to adding, redeeming, and managing the electronic value tokens, as described in detail herein; (d) at least one individual issuers' authorization system 160; and (e) any other unit included in the system by the electronic value token transaction computer administrator 151. In one embodiment, the electronic value token transaction computer 150 comprises a value added determination unit 153, an E-Wallet Aggregator System interface 1052, a message modification unit 154, a reconciliation unit 155, an issuer system interface 156, an authorization unit 157, and a sorting unit 198. The E-Wallet Aggregator System interface 1052 provides a means for the electronic value token transaction computer 150 to communicate with the E-Wallet Aggregator System 1000 via, for example, the Internet, a Public Switched Telephone Network ("PSTN"), or an independent dedicated network. Likewise, the electronic value token transaction computer 150 may communicate via issuer system interface 156 with the issuers' authorization system 160 via, for example, the Internet, a Public Switched Telephone Network (PSTN), or an independent dedicated network. Communications 116, 117 between the E-Wallet Aggregator System interface 1052 and the E-Wallet Aggregator System 1000 and communications 109, 110 between the issuer system interface 156 and the issuers' authorization systems 160 may be encrypted for added security and/or may utilize a virtual private network ("VPN"). The sorting unit 198 may sort the communications into various types for routing in various ways. For example, the sorting unit 198 may identify and sort sub-wallet requests (e.g., upon receipt of authorization information with a transaction request, the sorting unit 198 can route the requested transaction to a specific electronic sub-wallet maintained by the system and/or to a specific section or sections maintained within the electronic sub-wallet), balance inquiry requests, registration requests, activation requests, redemption requests, and management requests for routing to the various units of FIG. 3C. The electronic value token transaction computer 150 or sorting unit 198 may also generate messages based on the requests for similar routing.

As can be seen in FIG. 3C, at the point of sale device 111 (typically located at a vendor and/or redeeming merchant or retailer, but alternatively located at a kiosk 189 or at a user's home or office where a personal computer is configured to act as a point of sale, for example during an on-line transaction), the authentication token is interpreted by a point of sale interpretation unit 101 (e.g., a card reader). The point of sale interpretation unit 101 can comprise a human, a bar code scanner, magnetic strip reader, optical character recognition device, biometric device, numerical keyboard (e.g., for entering a token identification number) or other device configured to interrogate, interpret, capture, or input the data encoded in or on the authentication token.

About contemporaneously with (or, alternatively, prior or subsequent to) the interpretation of the authentication token, a request for an electronic wallet transaction by a point of sale transaction unit 104 is made. The point of sale transaction unit 104 can comprise a human, an electronic input device, a register or terminal, a computer processing unit ("CPU"), a personal computer, a personal digital assistant, smart phone, or other means of requesting or messaging interpreted by the point of sale interpretation unit 101 and/or point of sale processing unit 105. In some embodiments, the actions performed by the point of sale interpretation unit 101 and the point of sale transaction unit 104 may be performed by one unit capable of performing both actions that would be performed by the individual units, for example a point of sale register/terminal or a personal computer during an on-line, web-based transaction.

The point of sale interpretation unit 101 and the point of sale transaction unit 104 communicate with the point of sale processing unit 105. The point of sale processing unit 105 can comprise a CPU or other type of processing device accepted for use in the industry. The point of sale interpretation unit 101 communicates authentication information 102 to the point of sale processing unit 105. The point of sale transaction unit 104 communicates the request 103 for an electronic wallet transaction to the point of sale processing unit 105. The point of sale processing unit 105 may combine this information to communicate with the E-Wallet Aggregator System 1000 (e.g., transmits a message requesting an electronic wallet transaction along with the associated transaction and/or authentication data). In an embodiment, the point of sale processing unit 105 stores and/or receives from the E-Wallet Aggregator System 1000 (or a sub-administrator or unit associated therewith, such as a sub-wallet administrator, e.g., electronic value token transaction computer 150) a transaction format associated with the POS retailer and/or associated with a given transaction type and/or value token, and such transaction format may be used to format the transaction request or message, to prompt the user for further information, or for other data gathering or transmit/receive features at the point of sale. For example, a user making a purchase at a retailer operates a card reader. A card reader may a display with an input device and a barcode reader or magnetic strip scanner. The card reader may be touch sensitive and may have various buttons used for input. Following the card reader prompts, the user sees the options "Debit," "Credit," and "E-Wallet." The user selects "E-Wallet." The user then sees the options "Purchase," "Add Token," and "Delete Token." The user selects "Purchase." Following additional prompts (which in an embodiment relate to a transaction format specific to the particular retailer of the point of sale), the user enters a PIN number. In some embodiments, the actions performed by the point of sale interpretation unit 101, the point of sale transaction unit 104, and the point of sale processing unit 105 may all be performed by one unit (e.g., an integrated POS device such as a computerized register) capable of performing all the actions that would be performed by the individual units.

The point of sale processing unit 105 is connectable to the E-Wallet Aggregator System 1000 via a suitable network, such as the Internet, the public switched telephone network (PSTN), or an independent dedicated network. Each point of sale processing unit 105 has an associated identifier (e.g., a terminal identifier or serial number) that may be transmitted to the E-Wallet Aggregator System 1000 during the course of connecting the point of sale processing unit 105 to the E-Wallet Aggregator System 1000. Each point of sale processing unit 105 may include multiple point of sale transaction units corresponding to individual terminals each with its own terminal identification, for example present within a given store location.

As depicted in FIG. 3C, the E-Wallet Aggregator System 1000 is configured to: (a) form a secure connection with the retailer/merchant and/or vendor (e.g., via the point of sale device 111), the electronic value token transaction computer 150, and the issuers' authorization systems 160; (b) to communicate with issuers' authorization systems 160 to request and receive redemption or addition of value tokens into electronic wallets; (c) to communicate with issuers' authorization systems 160 to redeem all or a portion of the electronic value tokens associated with the electronic wallet; (d) communicate with the electronic value token transaction computer 150 to facilitate transactions concerning value tokens residing in an electronic sub-wallet maintained by the electronic value token transaction processing system 1100; (e) communicate to the retailer/merchant and/or vendor (e.g., via the POS unit 111) the redemption or addition of value tokens into electronic wallets and any information concomitant with the redemption or addition of value tokens into electronic wallets and/or sub-wallets; and (f) communicate to the retailer/merchant and/or vendor (e.g., via the POS unit 111) any reasons why transactions cannot not be completed.

The electronic value token transaction computer 150 may comprise a singular processing unit (e.g., a centralized server), a plurality of processing units (e.g., a distributed computing system with various units distributed and in communication with each other), or combinations thereof, with concomitant storage capabilities, each capable of or designated for: accessing the datastore 180; creating a transaction log 170; creating and maintaining an error log 175; communicating with the E-Wallet Aggregator System 1000; communicating with the individual issuers' authorization systems 160; processing individual value token and electronic wallet requests; processing redemption requests, processing value added functions to add additional cash value or add an electronic redemption coupon for a specific product(s) or service(s), processing redemption request for electronic redemption coupons for specific product(s) and/or service(s), and communicating with other systems 190 capable of and authorized to communicate with the electronic value token transaction computer 150.

Datastore 180 maintains records of accounts associated with each electronic sub-wallet indicating: (a) whether each individual value token has been added or redeemed, (b) whether an authentication token for an individual value token has been registered, (c) records and details of each individual redemption request, (d) the amount remaining on the electronic value tokens, (e) rules required for redeeming the electronic value tokens, (f) identity of the issuers of the electronic value tokens, (g) value added bonus awards, (h) rules for redeeming value added bonus awards, and (i) any combination thereof. The datastore may also maintain records of rules required for granting a value added bonus award to an electronic wallet or value token.

Datastore 180 also maintains records associated with each electronic wallet and/or sub-wallet indicating: (a) timing of, and other information related to, registration activities; (b) timing of, and other information related to, management activities; (c) timing of, and other information related to, transaction activities; (d) rules applicable; (e) identity of the issuers electronic value tokens therein; (f) identity of sub-wallets associated therewith; (g) any other records requested by issuers, merchants, vendors, advertisers, users, or other interested parties; and (h) any combination thereof. While a single datastore 180 is shown, it should be understood that a plurality of datastores may be employed, and relevant data divided among the datastores in any suitable manner to meet the various processes and objectives described herein. Also, the various data may be associated with one or more datastores closely coupled to and/or located in proximity to one or more sub-units, sub-processors, third party processors, and the like associated with the electronic value token transaction computer 150, and such datastores preferably have data used by such sub-units, sub-processors, and third party processors.

Datastore 180 also maintains records associated with each SAFE account indicating: (a) timing of, and other information related to, SAFE account creation; (b) timing of, and other information related to, SAFE account management activities (e.g., information and use requests); (c) timing of, and other information related to, SAFE account transaction activities; (e) rules applicable; (f) identity of the stored value cards associated with the SAFE account (e.g., reload cards and GPR cards); (f) identity of devices associated with SAFE account; (h) any other records requested by issuers, merchants, vendors, advertisers, users, or other interested parties; and (i) any combination thereof. While a single datastore 180 is shown, it should be understood that a plurality of datastores may be employed, and relevant data divided among the datastores in any suitable manner to meet the various processes and objectives described herein. Also, the various data may be associated with one or more datastores closely coupled to and/or located in proximity to one or more sub-units, sub-processors, third party processors, and the like associated with the electronic value token transaction computer 150, and such datastores preferably have data used by such sub-units, sub-processors, and third party processors.

The electronic value token transaction computer 150 is also configured to generate and maintain a transaction log 170 of all activity involving the electronic value token transaction computer 150. The transaction log may comprise a detailed summary of transaction types such as: (a) requested value token additions; (b) requested value token sales; (c) requested value token redemptions; (d) requested value token exchanges; (e) the monetary amount ascribed to value token additions; (f) the monetary amount ascribed to value token redemptions; (g) the monetary value ascribed to value token exchanges; (h) the value added amounts, products, or services additions; (i) the value added amounts, products, or services redemptions; (j) the time the electronic value tokens were added; (k) the time the electronic value tokens were redeemed; (l) the transaction or communication performed with the issuer for adding value tokens; (m) the transaction or communication performed with the issuer for redeeming value tokens; (n) the PIN communicated to the vendor in response to a request to add a value token requiring the input of a PIN for use; (o) e-wallet registration; (p) e-wallet set-up activities; (q) e-wallet transaction activities; (r) e-wallet savings activities; (s) e-wallet management activities; (t) any other information the electronic value token transaction computer administrator 151 directs the electronic value token transaction computer 150 to maintain as a log entry; and (u) any combination thereof.

The information contained in the transaction log 170 may be used for data mining purposes, e.g., to generate reconciliation reports, settlement reports, payment reports, audit reports, e-wallet registration reports, e-wallet management reports, e-wallet usage reports, e-wallet savings reports, electronic value token purchase reports, electronic value token redemption reports, electronic value token exchange reports, electronic value token sale reports, or other forms of information aggregation for the benefit of, use by, or for provision to, the electronic value token transaction administrator 151, the datastore administrator 181, the E-Wallet Aggregator System 1000 (e.g., for communication to vendors or other purposes), vendors, issuers, issuers' authorization systems 160, redeeming merchants, or other interested parties. For example, the transaction log 170 contains information about each transaction performed by electronic value token transaction computer 150 (and any sub-components thereof) and may be utilized by the reconciliation unit 155 when reconciling accounts belonging to various E-Wallet Aggregator System 1000 associated vendors, merchants, issuers, as well as vendors, merchants, and issuers not associated with the E-Wallet Aggregator System 1000, and also the electronic value token transaction processing system administrator 151. Additional data mining considerations that may be recorded, analyzed, and/or provided interested parties (e.g., vendors, merchants, issuers, advertisers, etc.) include data about: (i) the purchase habits of e-wallet users; (ii) electronic value token purchases, sales, redemptions, and exchanges; (iii), special offer and/or value added activities; (iv) loyalty-related activities; and (v) savings-related activities, all of which can be used for marketing, inventory, and other purposes.

Oversight and maintenance of the electronic value token transaction computer is performed by the electronic value token transaction computer administrator 151. Although not required, in an alternative embodiment, the electronic value token transaction computer administrator 151 may also function as the datastore administrator 181. The electronic value token transaction computer 150 is configured to generate and maintain an error log of all transactions that were not completed and reasons therefore. In some embodiments, the error log is administered by the electronic value token transaction computer administrator 151.

The electronic value token transaction computer 150 is also configured to communicate with other entities 190 authorized to access the electronic value token transaction processing system and specifically authorized to access the electronic value token transaction computer 150. These other entities may comprise E-Wallet Aggregator System 1000, third party payment management systems, third party audit systems, issuer affiliated entities, vendor affiliated entities, redeeming merchants or redeeming merchant affiliated entities, financial institutions such as banks, credit card agencies, or credit unions, or any other entity provided access by the electronic value token transaction computer administrator 151 or other entity having authority to grant access.

In an embodiment, the transaction request from the E-Wallet Aggregator System 1000 may contain one or more of the following pieces of information: (a) authentication information, (b) point of sale terminal identification, (c) amount to be credited or debited, (d) the time of the request, (e) the date of the request, (f) identification of the issuer, (g) identification of the vendor, (h) location of vendor, (i) identification of the product(s) and/or service(s) being purchased, (j) an activation or deactivation request, (k) a wallet management function such as addition of a value token, deletion of a value token, exchange of a value token, changing management or processing rules associated with one or more value tokens, partitioning a wallet into sub-wallets or vice-versa, etc., (l) and any combination thereof. However, the information contained within the request is not limited to the enumerated list but may comprise other items in addition to the items enumerated or in place of the items enumerated above.

Upon receipt of the electronic wallet transaction request from the E-Wallet Aggregator System 1000, and identification and sorting as such by the sorting unit 198, the electronic value token transaction computer 150 accesses the electronic wallet unit of datastore 180. The electronic value token transaction computer 150 processes the information contained in the datastore 180 and communicates 109, 110 with the individual issuers' authorization systems 160 to effectuate management of the electronic value tokens and corresponding accounts. The message modification unit may adjust the messages and requests so that multiple units, sub-components/processors, or third party administrators can recognize and correctly interpret the messages. For example, after the electronic value token transaction computer 150 determines the individual issuers' authorization systems 160 associated with the request, the message modification unit 154 accesses the database 180 to determine the appropriate transaction messaging formats for each individual issuers' authorization systems 160 and then formats the subsequent communications to said individual issuers' authorization systems 160 using the individual issuers' authorization systems 160 specified/preferred transaction format and vocabulary. The electronic value token transaction computer 150 can also provide the appropriate messaging formatting information, e.g., a template, to the E-Wallet Aggregator System 1000 to facilitate that system's processing of information related to the request. The electronic value token transaction computer's 150 communication with the individual issuers' authorization systems 160 may occur simultaneously or independently. The electronic value token transaction computer 150 is connectable to the individual issuers' authorization systems as via a suitable network, such as the PSTN, the Internet, or an independent dedicated network. The electronic value token transaction computer 150 is configured to send and/or receive communication 110 from the issuers' authorization systems 160 concerning the status of the electronic value tokens.

The reconciliation unit 155 reconciles the accounts of various issuers, selling vendors, and/or redeeming merchants, to credit and debit appropriate merchants, vendors, the electronic value token transaction processing system administrator, and issuers with the value of various transactions to reflect which entities received value from which other entities. For example, if a vendor A sells a value token issued by issuer B for a specified amount and receives payment from a user who adds the electronic value token to the user's electronic wallet, the selling vendor receives a percentage (e.g., retains a percentage) of the purchase amount and/or a predetermined amount, the E-Wallet Aggregator System 1000 and/or the electronic value token system administrator receives a percentage of the purchase amount and/or predetermined amount for processing the transaction, and the issuer receives the remainder. If a value token issued by issuer Y is redeemed at merchant X to purchase items, then the amount redeemed is debited to the issuer Y and credited to the merchant X, sometimes minus a transaction fee collected by the issuer and/or a transaction or processing fee collected by the electronic value token transaction processing system administrator.

Authorization unit 157 is utilized when the electronic value token transaction computer 150 is also the authorizing system such that the electronic value token transaction computer 150 authorizes electronic sub-wallet requests rather than transmitting the request to the issuers' authorization systems 160 for authorization. The authorization unit 157 may perform the same and/or different functions as described for authorization systems 160 and vice-versa.

The authorization unit 157 will validate the formatting of the wallet (e.g., primary or sub-wallet) transaction request received from the E-Wallet Aggregator System 1000. In other words, the authorization unit 157 will check the data fields in the request to confirm that the fields are populated with data and that the data is in the correct format (e.g., length, alphanumeric format). If the request is improperly formatted, the authorization unit 157 will reject the request, or in some embodiments may retrieve the proper format (e.g., from a format database) and modify the transaction request to comply with the proper format. The authorization unit 157 also performs various validation checks on the transaction request. The authorization unit 157 verifies card-related transaction information based on an analysis of several criteria, such as: 1) determining that the UPC code for the product is present in the datastore 180 (or other datastore such as an issuer's database) for the electronic value token transaction processing system 1100; 2) determining that the value amount of the requested transaction corresponds to the customer's payment for the subject transaction request, e.g., whether the UPC information identifies the card as a $25.00 card and that the corresponding transaction request includes a $25.00 payment by the customer; 3) determining that the UPC information identifies the card as being a type of card available for processing by the requesting merchant; and 4) determining that the Bank Identification Number ("BIN") of the card (i.e., the first six digits of the card's identification number), which identifies the card issuer, corresponds to the UPC information identifying the card issuer.

The authorization unit 157 may also verify transactions based on other criteria such as transaction velocity (number/amount per unit time). For example, if a card processor is concerned that multiple void transactions are indicative of fraudulent activity, the card processor could ask that the electronic value token transaction processing system 1100 monitor the number of void transactions requested and reject transactions from terminals that exceed a pre-selected amount of void transactions per unit time. Lastly, the authorization unit 157 may be configured to reject transaction requests in the event that the information received by the authorization unit 157 is unintelligible.

If the request is properly formatted and is validated as described above, the electronic value token transaction computer 150 may transmit details of transactions to the issuers' authorization systems rather than authorization requests. Also, in some embodiments, the issuer, the authorizing system 9 e.g., authorization unit 157), and the transaction computer are part of the same entity and, in such an embodiment, there would be no issuers' authorization systems 160 or the issuers' authorization systems 160 would be under common control with the other units of the electronic value token transaction computer 150 (for example, a commonly owned and operated computing system, that may be centralized (e.g., part of a centralized data center) and/or distributed within a commonly owned or controlled system or network). Furthermore, it should be noted that although units associated with the electronic value token transaction computer 150 (e.g., units 152-157) are depicted as various units within a single data processing system for illustration and conceptual purposes, one or more of units 152-157 could be implemented on separate computers, systems, or servers in a distributed data processing environment.

Figure 5B:
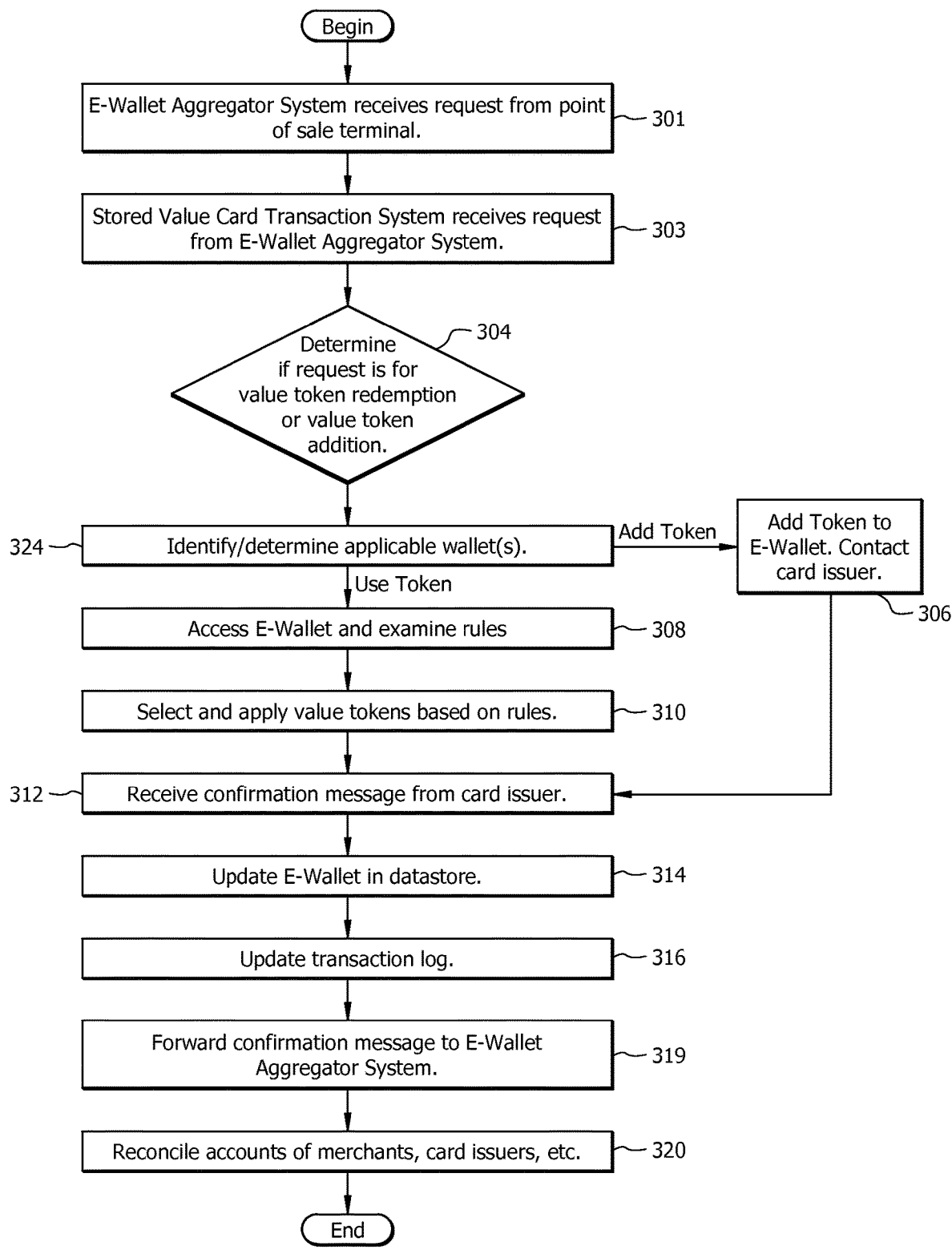
FIG. 5B is a flowchart of an embodiment of a process for creating an electronic sub-wallet or adding/redeeming value to/from the electronic sub-wallet.

An exemplary process utilized by an electronic value token transaction computer 150 for facilitating a purchase using an electronic wallet in accordance with an e-wallet transaction comprising an electronic sub-wallet maintained by a third party electronic value token transaction computer which maintains the sub-wallet as part of a relationship with a primary e-wallet system provider, e.g., the E-Wallet Aggregator System 1000, embodiment is depicted in FIG. 5B. Such an embodiment may be exemplified by the e-wallet transaction processing request being initially received by the E-Wallet Aggregator System 1000 and performed in part by the electronic value token computer 150. The actions depicted can be performed in the order shown or in a different order, and two or more of the actions can be performed in parallel.

In block 301, the E-Wallet Aggregator System 1000 receives a request or multiple requests from the point of sale 111. In at least one embodiment the requests may comprise an electronic wallet transaction request, a balance inquiry request, a registration request, an activation request, or a redemption request, a wallet management request, and contains one or more of the following: (a) identity of the terminal, (b) authentication information, (c) the amount of the purchase, (d) the identity of the electronic value token issuer, (e) the identity of the vendor, (f) the identity of the location, (g) the time of the request, (h) the date of the request, (i) information expressly identifying the request as an e-wallet transaction request (e.g., transaction type data); (j) information identifying a primary e-wallet, sub-wallet(s), or a combination thereof; (k) any other transaction and/or authentication data described herein; and (l) any combination thereof. The request at block 301 may comprise other information, requests or functions, for example of the types described herein, in addition to or in place of the above enumerated items. In at least one embodiment, the authentication information is based on an authentication token selected from the group consisting of proxy card and cellular phone.

Continuing with the process of block 301, the E-Wallet Aggregator System 1000 may determine that a portion of the requested e-wallet transaction may be processed via the E-Wallet Aggregator System 1000 while another portion of the requested e-wallet transaction implicates a sub-wallet which is maintained by a third party administrator, e.g., electronic value token transaction computer 150. If the electronic wallet transaction request information received by the E-Wallet Aggregator System 1000 indicates that the transaction request will require/involve a sub-wallet maintained by a third party administrator's system to fully effectuate a response to the transaction request, and the rules applicable to the associated primary e-wallet maintained by the E-Wallet Aggregator System 1000 so dictate, the E-Wallet Aggregator System 1000 processes the original request, generates a new request, generates a sub-request, or modifies the original request, to send to the sub-wallet which is maintained in association with the primary electronic wallet, e.g., the primary electronic wallet sends the original request, the new request, the sub-request, or the modified original request to the electronic value token transaction computer 150, which maintains the indicated sub-wallet. In processing the original request, generating the new request, generating the sub-request, or modifying the original request to send to the sub-wallet, the E-Wallet Aggregator System 1000 may (i) apply its own logic to the e-wallet transaction request; (ii) apply rules stored in the primary wallet (e.g., rules formulated by the primary e-wallet provider, the primary e-wallet user, or a combination thereof); (iii) apply rules received with the transaction request from the point of sale 111 (e.g., contemporaneous rules submitted with the request by the user of the primary electronic wallet and/or electronic sub-wallet); (iv) or any combination thereof.

In block 303, the electronic value token transaction computer 150 receives a request or multiple requests from the E-Wallet Aggregator System 1000. In at least one embodiment the requests may comprise an electronic sub-wallet request, a balance inquiry request, a registration request, an activation request, or a redemption request, a sub-wallet management request, and contains one or more of the following: (a) identity of the terminal, (b) authentication information, (c) the amount of the purchase, (d) the identity of the electronic value token issuer, (e) the identity of the vendor, (f) the identity of the location, (g) the time of the request, (h) the date of the request, (i) information expressly identifying the request as an e-wallet transaction request (e.g., transaction type data); (j) information identifying a primary e-wallet, sub-wallet(s), or a combination thereof; (k) any other transaction and/or authentication data described herein; and (l) any combination thereof. The request at block 303 may comprise other information, requests or functions, for example of the types described herein, in addition to or in place of the above enumerated items. In at least one embodiment, the authentication information is based on an authentication token selected from the group consisting of proxy card and cellular phone. Using the identity of the proxy card and/or cellular phone, embedded transactions may be correctly formatted for communication with the pertinent electronic value token issuers of the subject transaction request.

Using information received from the E-Wallet Aggregator System 1000 pursuant to the transaction request and from information obtained from datastore 180, in block 304, the electronic value token transaction computer 150 determines whether the request is an electronic sub-wallet request containing valid authentication information and whether the request is for redemption of a value token(s), addition of a value token(s), deletion of a value token(s), balance inquiries, transaction history, or other management of the electronic sub-wallet. The electronic sub-wallet request may comprise a bank identification number ("BIN") as part of the authentication information. The sorting unit may decode the BIN number or otherwise verify that the request is an electronic sub-wallet request concerning an electronic value token residing in the indicated sub-wallet.

Using information contained within the electronic wallet transaction received from the E-wallet Aggregator System 1000, and/or from information obtained from datastore 180, in block 324, the electronic value token transaction computer 150 identifies/determines the sub-wallet(s), and/or locations of said sub-wallet(s) indicated/necessary to effectuate the received e-wallet transaction request. If the authorization information received indicates the requested e-wallet transaction involves a sub-wallet maintained by the electronic value token transaction computer 150, the electronic value token transaction computer 150 may (i) apply its own logic to the request; (ii) apply rules stored in a sub-wallet (e.g., rules established by the electronic value token transaction processing system administrator, the sub-wallet user, or a combination thereof); (iii) apply rules stored in a sub-sub-wallet (e.g., rules established by the electronic value token transaction processing system administrator, the sub-sub-wallet user, or a combination thereof) (iv) apply rules received with the request from the point of sale 111 (e.g., contemporaneous rules submitted with the request by the user of the primary e-wallet/sub-wallet); (v) or any combination thereof.

For example, an embodiment may include the electronic value token transaction computer 150 determining that the entire request received from the E-Wallet Aggregator System 1000 is related to value tokens contained in a singular sub-wallet. Upon receipt of the request, the electronic value token transaction computer 150 will query its authorization unit 157 (as described more fully herein), its datastore 180, the E-Wallet unit 199, and any other necessary unit to determine whether the sub-wallet comprises value tokens capable of meeting the subject request (e.g., whether the sub-wallet contains value tokens associated with vendors, merchants, and/or issuers related to the requested transaction). Such determination may be performed by comparing electronic value token identifications, user IDs, requested transaction types. The electronic value token transaction computer 150 will subsequently evaluate the manner in which the electronic value tokens available in the sub-wallet corresponding to the request will be applied under the sub-wallet's rules and/or rules received with the request, and perform or refuse to perform the requested transaction and/or transactions.

Another embodiment may include the electronic value token transaction computer 150 determining that the entire request received from the E-Wallet Aggregator System 1000 is related to value tokens contained in a sub-sub-wallet. Upon receipt of the request, the electronic value token transaction computer 150 will query its authorization unit 157 (as described more fully herein), its datastore 180, the E-Wallet unit 199, and any other necessary unit to determine whether the sub-sub-wallet comprises value tokens capable of meeting the subject request (e.g., whether the sub-sub-wallet contains value tokens associated with vendors, merchants, and/or issuers related to the requested transaction). Such determination may be performed by comparing electronic value token identifications, user IDs, requested transaction types. The electronic value token transaction computer 150 will subsequently evaluate the manner in which the electronic value tokens available in the sub-sub-wallet corresponding to the request will be applied under the sub-sub-wallet's rules and/or rules received with the request, and perform or refuse to perform the requested transaction and/or transactions.

In another example, an embodiment may include the electronic value token transaction computer 150 determining that a portion of the request received from the E-Wallet Aggregator System 1000 is related to electronic value tokens residing in a sub-wallet while another portion of the request is related to electronic value tokens residing in a sub-sub-wallet. Such determination may be made by evaluating the requested transaction type, the electronic value token identification, or any other methods for determining transaction allocation. The electronic value token transaction computer 150 will evaluate the manner in which the electronic value tokens available in the sub-wallet corresponding to the request will be applied under the sub-wallet's rules (as those rule may affect payment methods to be employed which are located in the sub-wallet), the electronic value token transaction computer 150 will evaluate the manner in which the electronic value tokens available in any applicable sub-sub-wallet corresponding to the request will be applied under such sub-sub-wallet's rules and/or rules received with the request, and perform or refuse to perform the requested transaction and/or transactions.

In an exemplary embodiment, at block 324, the electronic value token transaction computer 150 may identify, in response to a received transaction request, one or more value tokens in a sub-wallet and one or more electronic value tokens in a sub-sub-wallet that, when used together, will cover the entirety of the requested e-wallet transaction. Moreover, one of the electronic value tokens located in the sub-wallet or sub-wallet may be an electronic representation of a loyalty card and another electronic value token located in either the same or different location of said loyalty card value token may be an electronic representation of a retailer's gift card. In such an example, the electronic value token transaction computer 150 can effectuate the coincidental use of the "loyalty card" token and the "retailer's gift card" token, regardless of the tokens' locations in the sub-wallet and/or sub-sub-wallet(s) to allow for an enhanced user benefit as opposed to not coincidentally applying the value of the "retailer's gift card" token and the "loyalty card" token for the transaction, e.g., a 5% increase in the value of the "retailer's gift card" token or loyalty point bonus applied to the "loyalty card" token for the use of the "retailer's gift card" token.

An electronic value token may be associated with a closed loop account or open loop account. A closed loop account typically expires after the funds in the account have been depleted, e.g. a gift card account. An open loop account does not typically expire. Rather, there is may be an ongoing obligation for various entities to credit and debit the account, e.g. a branded credit card account or debit card account such as Visa or Mastercard. Closed loop accounts are often associated directly with retailers while open loop accounts are often associated with financial institutions (e.g., Chase or Citi issued Visa). In at least one embodiment, the electronic value tokens comprise closed loop account numbers and open loop account numbers. The closed loop account numbers are associated with retailers able to debit or credit closed loop accounts associated with the closed loop account number. The open loop account numbers are associated with financial institutions able to debit or credit open loop accounts associated with the open loop account numbers. The electronic value token may have an expiration date or specified dates of use that are different from any other value tokens. Furthermore, the electronic value tokens may identify specific merchants, locations, and/or products with which the electronic value tokens may be utilized.

If the request is for electronic value token addition, then in block 306, the electronic sub-wallet is created (if not already created) and the electronic value token is added to the electronic sub-wallet. The following Tables include elements, parameters, and information included in e-wallet transaction communications and used by the electronic value token transaction computer 150 to facilitate and effectuate electronic sub-wallet transactions as part of an coincidental primary e-wallet transaction being processed by a primary e-wallet transaction processing system, e.g. the E-Wallet Aggregator System 1000.

Table 8A illustrates request parameters requested to create a sub-wallet in at least one embodiment. Table 8B illustrates response parameters requested to create a sub-wallet in at least one embodiment.

TABLE 8A

Request Parameters

| Element | Data Type | Suggested Length | Description |
|---|---|---|---|
| primaryewalletauth | string | variable | Authorization/ID of primary e-wallet provider (e.g., Google or PayPal) |
| accounttype | String | 200 | Account Type |
| loadamt | decimal | N/A | Amount to be loaded into the wallet account |
| loadamtcurrency | string | 3 | Denomination Type. |
| txn-uniqueidentifier | string | 12 | Unique transaction id. |

TABLE 8B

Response Parameters

| Element | Data Type | Description |
|---|---|---|
| accountid | string | Unique identifier for an account |
| accounttype | string | Type of the account. |
| currency | string | Denomination Type. |
| balance | decimal | Balance available in the account |
| uniqueidentifier | string (numeric) | The unique identifier identifies a transaction. |
| code | string | The Status of the requested transaction. |
| description | string | The Status description of the requested transaction. |

The electronic value token transaction computer 150 preferably allocates memory for the electronic sub-wallet and value token(s) and associates the account number with the electronic sub-wallet and/or authentication information stored in the electronic wallet unit 199 by storing the pieces of information in a data structure on the datastore 180. Table 9 illustrates the parameters for a gift card value token in at least one embodiment.

TABLE 9

| Element and Description | Data Type | Suggested Length |
|---|---|---|
| statusinfo.status.code | String | 7 |
| statusinfo.status.description | String | 500 |
| card.retailer.id | Integer String | 11 |
| card.retailer.name | String | 100 |
| card.number | String | 50 |
| card.securitycode | String | 50 |
| card.expirydate | Integer String | 6 |
| card.activationdate | Date String | 20 |
| card.initialbalance | Decimal String | 10 |
| card.currentbalance | Decimal String | 10 |
| card.currentbalanceasof | Date String | 20 |
| card.customerservice.phone | String | 20 |
| card.customerservice.website | String | 256 |
| card.currency | String | 3 |

Table 10 illustrates more detailed parameters for a gift card electronic value token in an alternative embodiment, including the designation of associated sub-wallet(s) and/or sub-sub-wallet(s).

TABLE 10

| Element and Description | Data Type | Suggested Length |
|---|---|---|
| card.retailer.id | Integer String | 11 |
| card.retailer.name | String | 100 |
| card.number | String | 50 |
| card.securitycode | String | 50 |
| card.expirydate | Integer String | 6 |
| card.registeredto | String | 10 |
| card.activationdate | Date String | 20 |
| card.initialbalance | Decimal String | 10 |
| card.islookedupinitialbalance | String | 1 |
| card.currentbalance | Decimal String | 10 |
| card.islookedupcurrentbalance | String | 1 |
| card.customerservice.phone | String | 20 |
| card.customerservice.website | String | 256 |
| card.notes | String | 500 |
| card.nickname | String | 100 |
| card.currency | String | 3 |
| card.user.firstname | String | 50 |
| card.user.lastname | String | 50 |
| card.user.address.line1 | String | 50 |
| card.user.address.line2 | String | 50 |

TABLE 10-continued

| Element and Description | Data Type | Suggested Length |
|---|---|---|
| card.user.address.city | String | 50 |
| card.user.address.state | String | 50 |
| card.user.address.zip | String | 5 |
| card.user.phone.number | String | 10 |
| card.user.email.address | String | 128 |
| card.additionalinfo1 | String | 300 |
| card.additionalinfo2 | String | 300 |
| card.additionalinfo3 | String | 300 |
| wallet.id | Integer String | 10 |
| Collection of folders | | |
| wallet.folder.1.id | Integer String | 10 |
| wallet.folder.1.name | String | 100 |
| wallet.folder.2.id | Integer String | 10 |
| wallet.folder.2.name | String | 100 |
| [ . . . More folders] | | |

The request, however, may be modified for other reasons unrelated to the add token decision and forwarded to the appropriate one of the issuers' authorization systems 160 as part of the reconciliation process, for example the request could concern redemption, deletion, reloading value, added value, balance inquiry, or a combination thereof, each of which would be communicated to the issuers' authorization systems 160 for reconciliation.

Table 11 illustrates formatting for authentication communication.

TABLE 11

| Element and Description | Data Type |
|---|---|
| client_ref_id | String |
| signature | String |
| timestamp | String(in the format yyMMddHHmmssSSSz) |
| nonce | String |
| encryption_type | String |
| usertoken | String |
| uuid | String |
| user_ip | String |
| channel | String |

Each request is authenticated using the signature, a user is authenticated with username/password or open id, the session is validated using the user token. A client may send client_ref_id, timestamp, nonce, encryption_type, channel, user_ip, signature, optionally usertoken with each request to be able to validate each message.

Table 12 illustrates the parameters used to retrieve a user's wallet.

TABLE 12

| Element | Data Type | Description |
|---|---|---|
| accountid | string | Unique identifier for a account |
| accounttype | string | Type of the account. |
| currency | string | Denomination Type. |
| balance | decimal | Balance available in the account |
| code | string | The Status of the requested transaction. |
| description | string | The Status description of the requested transaction. |

Table 13A illustrates the request parameters used to redeem value from a token in the sub-wallet.

TABLE 13A

| | | | |
|---|---|---|---|
| | | Request Parameters | |
| Element | Data Type | Suggested Length | Description |
| accountid | String | 100 | Unique identifier for the account |
| redamt | decimal | N/A | Amount to redeem from the account |
| redamtcurrency | string | 3 | Amount Type. |
| txn-uniqueidentifier | string | 12 | Unique transaction id. |
| txn-istimeoutreversal | bool | N/A | 0, if it is not a reversal of any transaction type 1, if it is a reversal transaction. |

Table 13B illustrates the response parameters used to redeem value from a token in the sub-wallet.

TABLE 13B

| | | | |
|---|---|---|---|
| | | Response Parameters | |
| Element | Data Type | Suggested Length | Description |
| accountid | string | 100 | Unique identifier for a account |
| accounttype | string | 50 | Type of the account. |
| currency | string | 3 | Denomination Type. |
| balance | decimal | N/A | Balance available in the account |
| uniqueidentifier | string | 12 | Unique identifier for the transaction. |
| code | string | 7 | The Status of the requested transaction. |
| description | string | 500 | The Status description of the requested transaction. |

Table 14A illustrates the request parameters used to load a value token into the sub-wallet.

TABLE 14A

| | | | |
|---|---|---|---|
| | | Request Parameters | |
| Element | Data Type | Suggested Length | Description |
| accountid | string | 100 | Unique identifier for a account |
| amount | decimal | N/A | Amount to load on the account |
| amountcurrency | string | 3 | Amount Type. |
| txn-istimeoutreversal | bool | N/A | 0, if it is not a reversal of any transaction type 1, if it is a reversal transaction. |
| txn-uniqueidentifier | string | 12 | Unique transaction id. |

Table 14B illustrates the response parameters used to load a value token into the sub-wallet.

TABLE 14B

| | | | |
|---|---|---|---|
| | | Response Parameters | |
| Element | Data Type | Suggested Length | Description |
| accountid | string | 100 | Unique identifier for a account |
| accounttype | string | 50 | Type of the account. |
| balance | decimal | N/A | Balance available in the account |
| uniqueidentifier | string (numeric values [0-9] only) | 12 | Unique identifier for the transaction. |

TABLE 14B-continued

| | | | |
|---|---|---|---|
| | | Response Parameters | |
| Element | Data Type | Suggested Length | Description |
| code | string | 7 | The Status of the requested transaction. |
| description | string | 500 | The Status description of the requested transaction. |
| currency | string | 3 | Denomination Type. |

If the request is for electronic value token redemption, then in block 308, the electronic value token transaction computer 150 accesses the electronic sub-wallet previously associated with the authentication information and examines the rules associated with the electronic sub-wallet. In at least one embodiment, examining the rules comprises examining priorities of value tokens configurable by the user. For example, the user may prefer to use any closed loop value tokens corresponding to the retailer originating the purchase request. If none is found or if the token will not cover the purchase, then the user may prefer to use an open loop value token for the remainder. As a result of these preferences, the closed loop value tokens may all have higher priority than the open loop value tokens. Among the open loop value tokens, one may have priority over another. For example, the user prefers to pay for any remainder with a credit card rather than a debit card. In at least one embodiment, the user may configure these rules via the Internet or mobile application and save the priorities as default preferences. In an alternative embodiment, the user selects the electronic value tokens to apply to the electronic wallet request in at the POS device, for example at a vendor or retailer location such as a check-out lane, customer service counter, or kiosk. As such, selecting the electronic value tokens comprises selecting value tokens with the highest priority that, when used together, will cover the purchase amount. As can be seen in the example, one purchase transaction has been split into two redemptions without compromising efficiency of the purchase. Similarly, one or more electronic wallet transactions can be split into two or more transactions without compromising efficiency.

In at least one embodiment, examining the rules comprises examining percentages of the electronic sub-wallet request to which different electronic value tokens should be applied and wherein applying the electronic value tokens comprises applying the electronic value tokens to the electronic sub-wallet request in according to the percentages. In block 310, the electronic value token transaction computer 150 then selects, based on the rules, value tokens in the electronic sub-wallet that, when used together, will cover the electronic sub-wallet request. For example, the user may configure the rules such that each purchase is split evenly between two credit cards. As such, selecting the electronic value tokens comprises selecting two open loop tokens between which to split the purchase amount. Similar to the above example, efficiency is preserved because where a single authorization token (e.g., only the proxy card or a mobile device) was used at the point of sale, not the two credit cards corresponding to the electronic value tokens. Other rules can be implemented, and the rules can be used in various combinations and permutations with each other. The electronic value token computer 150 can also implement "if-then" rules based on the information transmitted in the electronic sub-wallet request. For example, a purchase at a gas station can result in a gas credit card value token selection, and the like. In such am embodiment, the electronic value token computer 150 may query the rule(s) 802, 817, 818, and 819 of the subject e-wallet 10 and/or sub-wallets 807 (e.g., for credit card-type electronic value tokens), 808 (e.g., for debit card-type electronic value tokens), and 809 (e.g., for stored value-type electronic value tokens) and determine, based on transaction request information which includes a transaction type, e.g., purchase at a gas station, that rule(s) established for the subject e-wallet 10 and/or sub-wallets 807, 808, and 809 require that the transaction type request be first satisfied with a first electronic value token type, e.g. a gas card-related electronic value token 829, and upon the occasion that the subject e-wallet 10 and/or sub-wallet(s) 807, 808, and 809 do not comprise a sufficient amount of the first value token type to satisfy the entire transaction request, the electronic value token computer 150 may satisfy the remainder of the transaction request with a second electronic value token type, e.g., a debit card-related electronic value token 828.

The electronic value token transaction computer 150 also applies the electronic value tokens to the electronic sub-wallet request. In applying the electronic value tokens to the request, the electronic value token transaction computer 150 can generate and send debit and credit messages to be performed on the accounts administered by the retailers and financial institutions using the appropriate account numbers, or the electronic value token transaction computer 150 can credit or debit the accounts directly if the electronic value token transaction computer has such administrative authority.

In at least one embodiment, the electronic value token transaction computer 150 modifies the request and forwards the modified request to the appropriate one of the issuers' authorization systems 160, which receives the modified request and acts upon same, for example authorizing and/or processing the request to redeem the electronic value token and updating a datastore accordingly. The authorization system 160 is not at the same location from where the electronic sub-wallet request was received in at least one embodiment. For example, if the electronic sub-wallet request was received from a retail store, the authorization system may be owned and operated by the retailer, but will not be at the retail store. Rather, the authorization system may be located at a data center for example. As such, neither the retail store nor the retailer in general need be aware of some or all the contents of the sub-wallet. In at least one embodiment, the retail store is unaware of even the presence of the electronic wallet, as it merely recognizes that some transaction authorizing action has been communicated to its point of sale (e.g., swipe of a proxy card, digital personal assistant interaction with point of sale device, entry of a PIN at a keypad at point of sale, or other authorizing activity). The issuers' authorization systems 160 sends a response message back to the electronic value token transaction computer 150. In an alternative embodiment where the electronic value token transaction computer 150 performs the functions of the issuers' authorization systems 160, the method may proceed directly from block 306 or 310 to block 314.

The electronic value token transaction computer 150 receives the confirmation message from the appropriate one of the issuers' authorization systems 160 in block 312. At block 314, the electronic value token transaction computer 150 updates electronic sub-wallet in the electronic wallet unit 199 and datastore 180 to reflect that the electronic sub-wallet is activated and to reflect any debit, credit, addition, or deletion to/of the electronic value token(s). FIGS. 6A-D illustrate a series of user interface screens and prompts in at least one embodiment. For example, the user may see the illustrated prompts when managing the user's electronic wallet via a computer connected to the Internet, and/or kiosk 189.

A transaction log 170 may be updated by the electronic value token transaction computer 150 in block 316 to record the details about the transaction. The details recorded in the transaction log may include (a) the time and date of the transaction, (b) whether the electronic sub-wallet was activated, (c) the reason electronic sub-wallet was not activated if the request was denied, (d) the credit, debit, addition, or deletion to/of the electronic value token(s), (e) a change in rules associated with the electronic value token(s), (f) the identity of the vendor, (g) the identity of the issuer, (h) the location of the vendor, (i) the identity of the terminal adding the electronic value token, (j) the identity of the entity granting the electronic value token, (k) identity of the E-Wallet Aggregator System 1000 from which the sub-wallet request was received, (l) communications between the electronic value token transaction computer 150 and the E-Wallet Aggregator System 1000, and (m) any combination thereof. The transaction log may include other information in addition to or in place of the items enumerated above.

The electronic value token transaction computer 150, in block 319, then forwards the sub-wallet transaction results and associated information in the form of a confirmation message to the E-Wallet Aggregator System 1000. The electronic value token transaction computer 150, prior to forwarding the confirmation message to the E-Wallet Aggregator System 1000, may modify the confirmation message as necessary to include information that may be printed on a receipt for the customer and/or presented on a display to the store clerk operating the point of sale device 111. At block 320, the electronic value token transaction computer 150 reconciles the accounts of the various vendors, merchants, issuers, the electronic value token transaction processing system administrator, and other entities involved with issuing, selling, and marketing the electronic value tokens involved in the sub-wallet request to debit and credit appropriate accounts and, in some embodiments, initiates funds transfers between appropriate bank accounts belonging to the various entities. Alternatively, reconciliation of accounts may be performed periodically (e.g., daily, weekly, monthly, etc.) rather than after each transaction. In such an embodiment, the information from the transaction log 170 may be utilized to reconcile the various entities involved with the sale or redemption of various value tokens thus requiring fewer funds transfers to be initiated. In various embodiments, the sequence of events depicted in may be varied, and thus may be carried out in any desired order, sequentially or simultaneously.

Figure 3D:
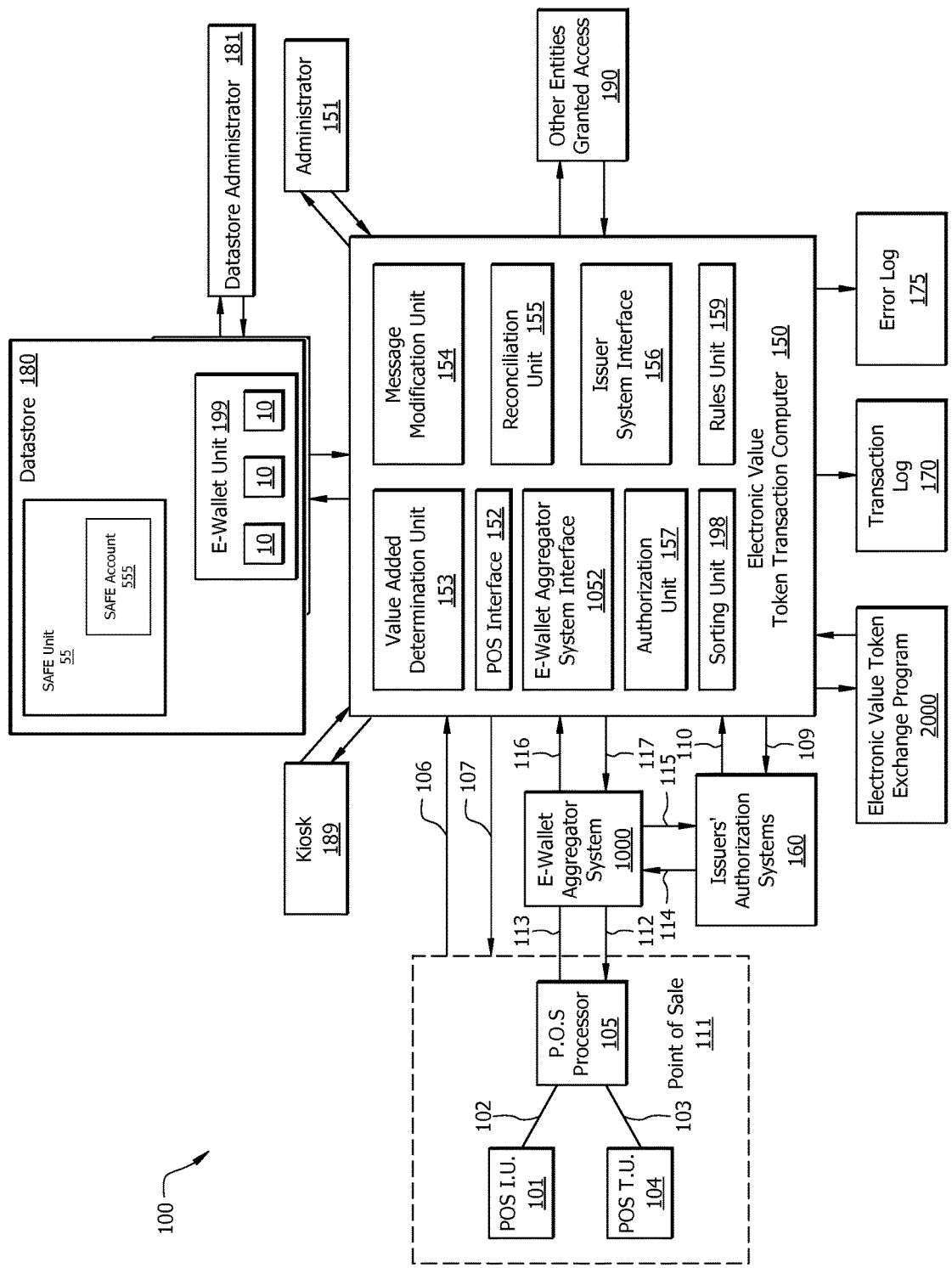

In FIG. 3D, the electronic value token transaction computer 150 communicates with both the point of sale 111 and the E-Wallet Aggregator System 1000. Thus, the electronic value token transaction computer 150 may function as both a primary electronic wallet transaction processor and an electronic sub-wallet transaction processor as described in detail above with respect to FIGS. 2A and 2B.

Electronic wallet management may be carried out via a variety of user interfaces such as smart phone application, personal computer applications, website based applications, point of sale terminals, dedicated terminals at stores or other locations, such as kiosks.

In at least one embodiment, a user can perform numerous functions via the World Wide Web from a computer or mobile phone such as electronic wallet management functions (e.g., balance inquiry, managing loyalty and/or other bonus-type programs); exchange of value tokens such as (i) replace value token in e-wallet with value token not currently present in e-wallet, (ii) exchange between different wallets (such as placing an electronic value token from a sub-wallet configured to allow redemption activities into a sub-wallet configured for savings activities with limited redemption possibilities), and (iii) exchange with another user; purchase electronic value tokens to be placed in e-wallet; opt in or opt out of receiving targeted promotional offers and materials; and payment functions such as splitting the tender of payment between available electronic value tokens in the e-wallet.

Regarding possible exchange possibilities, a user may exchange a value token associated with a retailer that the user is unlikely to frequent with a value token associated with a retailer that the user is likely to frequent. Similarly, users may swap, sell, gift, or re-gift value tokens or bundles of value tokens to each other.

Via e-wallet management functionalities, a user can: (i) determine the amount of value associated with each value token such as reward points, dollar amounts, etc.; (ii) check expiration dates on value tokens, purchase value tokens for others as gifts, and receive notifications from specific retailers; (iii) create, register, and delete their electronic wallet or specific value tokens in their electronic wallet; (iv) request that the e-wallet provide or make available a physical representation of an electronic value token in the user's electronic wallet (e.g., in an embodiment, a print-on-demand service is provided to allow the user to print out a chit, coupon, check, or other physical representation of an electronic value token at a kiosk 189 or other accessible printer); and (v) allow the e-wallet to send the user specific value tokens, e.g., by using a GPS service in the user's mobile phone, or via integration with the user's SMS services.

In at least one embodiment, the user's electronic wallet is integrated with the user's social network services such as Facebook and Twitter. Accordingly, the user can perform management functions via social network platforms or receive value tokens via social network platforms. Full or partial information about the user's electronic wallet can be made available to the user's social network contacts as well.

Figure 6B:
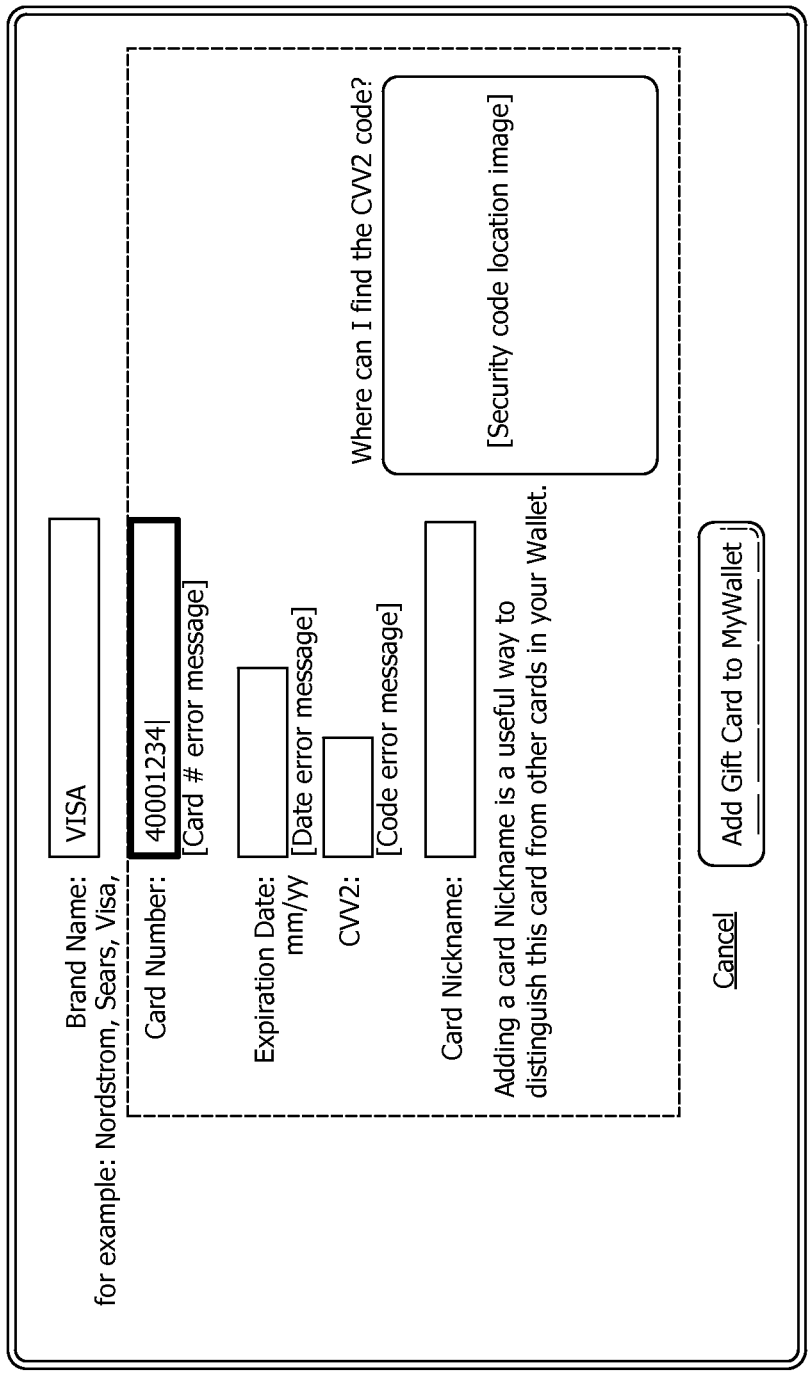

As depicted in FIG. 6A, a user may access the e-wallet system, e.g., electronic value token transaction processing system 100 or E-Wallet Aggregator System 1000, via such systems' interactive display pages/screens (wherein the interactive display pages/screens are accessed via a user's computer, a user's personal digital assistant or smart phone, point of sale terminal, kiosk 189, or other device. As FIG. 6A depicts, a user may create and/or register an e-wallet or sub-wallet by providing certain requested information and agreeing to certain terms and conditions. As depicted in FIG. 6B, a user may manage its e-wallet by inputting certain card specific information into the e-wallet systems interactive display page/screen. In an embodiment, a user may register a gift card by inputting the gift card's brand, card number, expiration date, CVV2 code, and card nickname and selecting the "Add Gift Card to MyWallet" button on the screen.

Figure 6C:

As shown in FIG. 6C, a user is provided many options for managing an e-wallet and its contents. For example, as shown, a user may review the specific details associated with the electronic value tokens (depicted as gift cards in FIG. 6C) present in the e-wallet and/or sub-wallet. Moreover, the user could request that the electronic value tokens be presented as: (i) "Last added" (as shown in FIG. 6C); (ii) as contained in various "Sub-wallets" (sub-wallets could be categorized or nicknamed, such as "Dining," "Home Improvement," "Debit," "Credit," "Loyalty," etc.); (iii) as in highest to lowest remaining value; or (iv) as ranked in regards to preference for use.

As is also shown in FIG. 6C, the user has the ability to "Add a Gift Card," "Redeem Card," "Sell Card," manage "My Rewards," and "Add Value."

The "Add a Gift Card" functionality enables a user to place an electronic value token into the e-wallet. The "Add a Gift Card" selection provides at least two different methods for the user to add an electronic value token to the e-wallet. First, an electronic value token representing a physical card possessed by the user may be added to the e-wallet. As described in reference to FIG. 6B, by selecting "Add a Gift Card" and the subsequent manner of such addition, the screen display of FIG. 6B may be presented to the user. Accordingly, the user may add a "gift card" to the e-wallet by inputting the gift card's brand, card number, expiration date, CVV2 code, and card nickname and selecting the "Add Gift Card to MyWallet" button on the screen. Alternatively, the user may have access to a card reader (e.g., mag stripe reader and/or bar code reader), such as a device attached to a user's computer, personal digital assistant or smart phone, and utilize such device to read information from a physical card, in conjunction with the user's computer, personal digital assistant or smart phone, to enter the card's information into the e-wallet system for conversion into an electronic value token. Second, an electronic value token representing a physical card not already possessed by the user may be added to the e-wallet. In such an embodiment, when the user selects this option, the user may be presented a display screen informing the user of all the different types and value amounts of electronic value tokens that are available for purchase. The availability of electronic value tokens for purchase can be ascribed to the e-wallet system's (e.g., the electronic value token transaction processing system's 100) relationships with card issuers, merchants, vendors, and/or processors (e.g., a GiftCard Mall web-based application as provided by Blackhawk Network which provides users with the ability to select from a variety of different types of gift cards (and varying denominations) and have the cards selected delivered to the user (or to a user's identified recipient) in either tangible form (via mail or other courier) or delivered electronically (e.g., via the electronic value token transaction processing system)) or may be ascribed to the e-wallet system's (e.g., the electronic value token transaction processing system's 100) ability to access an electronic value token exchange program 2000, as will be described more fully below.

The "Redeem Card" functionality enables a user to select an electronic value token and use that token to satisfy a purchase, or other transaction. In the "Redeem Card" scenario, if the whole value of the electronic value token is not used in the redemption transaction, the system will modify/reduce the remaining value of the token and cause the display to inform the user of the "new" reduced value of the token, while also informing all interested parties as to the redemption transaction and recording and adjusting any pertinent logs accordingly. Alternatively, when an e-wallet is used in a point of sale-type of transaction context, rather than the above described e-wallet management context, the "Redeem Card" functionality may be automatically invoked via transactional information conveyed from a point of sale and thus, the can be based on predetermined rules.

The "Sell Card" functionality enables a user to select an electronic value token to monetize via offering the card for sale to (i) another e-wallet user, (ii) the e-wallet (or sub-wallet) system provider, or (iii) an electronic value token exchange program 2000 (as more fully described herein). In the "Sell Card" scenario, a user will inform the e-wallet system as to the electronic value token it desires to sell, select the forum for such sale from a list of available forums, instruct the system as to how the proceeds from the sale should be remitted to the e-wallet (e.g., in the form of e-wallet system branded electronic value token, value added to other selected electronic value token(s), and/or delivery of a hard/tangible form of receipt that the user may present for tender, (e.g., chit, coupon, check, or combination thereof)) and, if applicable, instruct the system as to a threshold value for the sale of the electronic value token that the user is not willing to go below e.g., set a reserve price. The system will execute the desired sale transaction, and cause the display to inform the user of the results of the sale of the electronic value token, while also informing all interested parties as to the sale transaction and recording and adjusting any pertinent logs accordingly.

As is further shown in FIG. 6C, a user may choose to manage "My Rewards" which would bring up a screen showing the user options available due to the user's receipt of loyalty or other types of rewards for using the e-wallet and/or electronic value tokens. The user may also select "Special Offers" which would bring up a screen showing the user any promotional-type offerings available to the user via the e-wallet. The user may also select "Exchange" which would bring up a screen showing the user options available for electronic value token exchange via the e-wallet.

The "Add Value" functionality enables a user to select an electronic value token and increase the value of said token. Such "reloading," "topping off," or "recharging" of an electronic value token may be performed as is described in International Application Serial No. PCT/US11/40055, which is incorporated by reference in its entirety. For example, when the e-wallet user desires to reload/recharge/top off an electronic value token residing in the e-wallet, the user can select "Add Value" on the display screen which will prompt the system to transmit the reload/recharge/top-up request to the electronic value token computer 150.

A first embodiment of the reload/recharge/top-up scenario, the electronic value token computer 150 approves the request if the telecom-related electronic value token is activated and associated with a phone number. The electronic value token computer 150 determines the telecom account associated with the phone number and adds the requested reload/recharge/top-up amount to the account. The electronic value token computer 150 sends a response to the request (e.g., indicating that the reload/recharge/top-up amount has been added to the associated account). The electronic value token computer 150 transmits a reload/recharge/top-up transaction request to the phone number's associated telecom carrier. Upon receiving approval of the reload/recharge/top-up transaction request from the telecom carrier, the electronic value token computer 150 modifies the value of the telecom-related electronic value token to reflect the reload/recharge/top-up amount. The electronic value token computer 150 will cause the display accessed by the user to reflect the modification of the electronic value token's value, or if the reload/recharge/top-up transaction request was not approved, the electronic value token computer 150 will cause the display to inform the user as to that result. While the "Add Value" functionality has been described in relation to telecom-related electronic value tokens, the "Add Value" functionality is equally applicable and functionable for reloading/recharging/topping-up electronic value tokens associated with debit cards, prepaid services cards, gift cards, etc.

For example, in an embodiment involving a SAFE account, a user may access its SAFE account via a web-based portal (or mobile device, e-wallet, etc.) and select the reload card(s) associated with the SAFE account to complete the desired transaction, e.g., pay a bill, reload an associated GPR card, and schedule a GPR card reload). The user may also access the SAFE account to associate additional reload cards with SAFE account, associate a device with the SAFE account, associate GPR cards with the SAFE account, and combinations thereof.

In similar fashion as described in reference to the above available e-wallet management abilities and functionalities, a kiosk 189 may be coupled to the electronic value token transaction computer 150 in at least one embodiment and function as a user's interface with an e-wallet transaction system to allow the user to access e-wallet management functionalities.

The kiosk 189 may be placed in a high-traffic area such as a shopping mall, and may perform any electronic wallet management function. For example, users may create, delete, and alter their electronic wallets or sub-wallets. Users may also check the balances of electronic value tokens residing in the e-wallet, add, remove, reload, recharge, print, and exchange value tokens in their electronic wallets or sub-wallets. The kiosk 189 may mirror transactions available through an electronic wallet management website in at least one embodiment, or the functionality of an e-wallet enabled personal digital assistant and/or smart phone. Users may employ a print-on-demand function with their value tokens if a particular retailer does not accept electronic wallet transactions. For example, a user may select a value token to print, and a printer connected to the kiosk 189 will print a physical representation of the selected value token, for example a receipt having a scannable bar code linked to the electronic value token. The physical representation may be a gift card with a magnetic stripe, a paper receipt or coupon with a barcode or matrix code (e.g., QR code), and the like. In an embodiment, kiosk 189 may print a physical card, for example for an additional printing fee. The user may also provision and/or partition (e.g., create sub-wallets) an electronic wallet using the kiosk 189. For example, after authentication of the user and identification of the electronic wallet associated with the user, the user may insert the user's physical stored value cards into the kiosk 189, for example a machine operated kiosk similar to an automatic teller machine or alternatively a manned kiosk having appropriate card readers and the like. The kiosk 189 may convert the physical stored value cards into electronic value tokens in the user's electronic wallet. Afterwards, the physical stored value card may be retained or destroyed by the kiosk 189 or returned to the user. In one embodiment, the physical stored value card is not usable by the user after the conversion. In another embodiment, the user may have the option to use the electronic value token or the physical stored value card. In other words, both will be "active" and available for use. The user may also purchase value tokens to provision a wallet directly from the kiosk 189.

In at least one embodiment, a user is associated with multiple electronic wallets. In order to identify one wallet out of multiple wallets associated with a user, each of the multiple wallets is associated with a unique wallet identification ("ID"). A database or lookup table, for example, may be used to access wallet identifications. In at least one embodiment, the wallet ID is customizable by the user.

As referenced with respect to both the primary e-wallet and sub-wallet embodiments described above, the disclosed e-wallet and sub-wallet methods and systems provide users with the ability to add value to electronic value tokens residing in an e-wallet and/or sub-wallet. In an embodiment, similar value-added capabilities and functionalities of the instantly described electronic value token transaction processing system 100 are detailed and described in International Application Serial No. PCT/US11/20570, which is incorporated by reference in its entirety, such similar value-added capabilities and functionalities may be adapted from the context described in International Application Serial No. PCT/US11/20570 to be applied in the instant e-wallet/electronic value token context.

Customers may be offered incentives to purchase and/or redeem a value token(s) via value differentiation between the purchase and redemption values of said value token(s).

In an embodiment, a value token with a face value of $25 may be purchased by a customer for $25, but the electronic value token may be added to the electronic wallet in the amount of $30—the $25 purchase price plus an additional $5 added as an incentive to purchase the electronic value token. Alternatively, rather than adding cash value to the electronic value token, the electronic value token may be encoded with a redemption coupon code for a specific product or service. For example, a $15 value token to a coffee house may have an electronic redemption coupon code for a free shot of the customer's syrup of choice to be added to any coffee purchased at the coffee house. The free shot of syrup may be redeemed in connection with redeeming a portion, or all, of the electronic value token amount or the free shot of syrup may be redeemed separately.

In another embodiment, a value token vendor is able to offer customers incentives to redeem a value token by adding value in addition to the value of the electronic value token at the time the customer redeems the electronic value token. For example, a merchant could run a promotion in which it offers customers an additional $5 credit when the customer uses a value token for a purchase at one of the merchant's retail stores during a specified period of time.

As noted above, the electronic value token transaction computer 150 communicates with the datastore 180 and/or the issuers' authorization systems 160. The electronic value token transaction computer 150 may compare one or more of the card identification, the terminal identification, vendor identification, and the time and date of the activation request contained within the transaction request to data contained in the datastore 180 to determine whether the electronic value token to be added/redeemed is eligible for a value added award. For example, a vendor may run a promotion to encourage customers to purchase a value token, wherein value tokens purchased within a specified period of time may be purchased for a price less than the value designated by the electronic value tokens description or metadata. Thus, a customer could purchase a $25 value token for some amount less than $25, e.g., $20. In either of the above examples, the value differentiators, e.g., bonus added to a redemption value of a value token and reduction of purchase price for a designated value of a value token, may be applicable to bundled value token packages and the value differentiators distributed amongst and/or across the electronic value tokens, either equally or disproportionately. Similarly, retailers can collaborate for cross-promotions by honoring other retailer's value tokens in full, in part, or for specific products or promotions. By selecting to use an electronic wallet at the point of sale, the user may even receive the benefits of promotions of which the user was unaware. Furthermore, by configuring the rules, the user can be assured of getting the best promotions at various retailers without comparison shopping. As such, retailers can implement and change promotions at a rapid pace and cross-promote with other retailers on a daily or even hourly basis without spending advertising resources to make sure that the user is aware of the promotion and without requiring the user to perform the legwork involved in traditional redemption models such as cutting coupons, inputting various promotional codes, and the like. Moreover, retailers can finely tune promotions to various market segments in order to strengthen relationships by providing for the segment's particular needs.

The message modification unit 154 modifies the messages 106 and 110 to add value added information into the messages. For example, if it is determined by the value added determination unit 153 that a value token to be added is eligible for a value added bonus, the message 106 received from the point of sale device 111 is modified by the message modification unit 154 to include the determined value added bonus and is then forwarded as message 109 to the appropriate issuers' authorization system 160 for authorizing the request for the amount specified in the activation request plus the value added bonus. As another example, if it is determined that the electronic value token is eligible to be purchased at a discount, the message 106 received from the point of sale device 111 is modified by the message modification unit 154 (and forwarded as message 109) to indicate to the appropriate issuers' authorization system 160 that the electronic value token will be added to the electronic wallet for one amount, but that the customer will be charged a lesser amount reflecting the discount associated with the electronic value token. In an embodiment, the message modification unit 154 also modifies messages 110 from the issuers' authorization systems 160 intended for the point of sale device 111 to include any information regarding value added to the electronic value token that may be printed on the receipt generated for the customer as well as information that may be presented to a cashier on a terminal 101 or 104 that the cashier may communicate to the customer, and such modified messages are forwarded as messages 107 to the point of sale device 111.

As described above, consumers have realized that prepaid financial service products (e.g., stored-value cards) offer value, convenience and flexibility. Stored-value cards, e.g., open-loop cards, closed-loop cards, GPR cards, reload cards, etc. (collectively, "value products"), can be provided with desirable features such as direct deposit and online or phone bill pay.

For example, GPR cards provide consumers with a convenient alternative to paying with cash while also avoiding the typical fees associated with using bank-issued credit/debit cards. Unlike typical gift cards which may only be debited, GPR cards allow consumers manage the funds available on the GPR card by allowing the consumer to "reload" the GPR card with additional funds when so desired. In an embodiment, a GPR card may be reloaded with value by the swiping of a GPR card's magnetic stripe at a point of sale and the subsequent information transmitted pursuant to the swiping of the magnetic stripe initiating a reload transaction at the point of sale. In an alternative embodiment, the GPR card consumer may purchase a reload card (e.g., a value pack or a Reloadit pack) in a particular predefined amount, e.g., in the amount of $50. At the time of purchase, the $50 reload card is activated for redemption at the point of sale so that the $50 may be subsequently added to a GPR card. In an embodiment, a GPR card may be reloaded via a Quick Load option, which can allow the consumer to determine the reload amount associated with a value pack (instead of a predefined amount).

Using the Quick Load option, consumers can purchase a reload card (e.g., a value pack, such as the Reloadit pack) at a retail location to load value, for example from $1 to $1000, onto a GPR card. After purchasing the value pack, the consumer reloads the GPR card by going online or calling a toll-free number to provide a 10-digit PIN number found on the back of the value pack, for example, a scratch-off PIN.

Figure 4E:
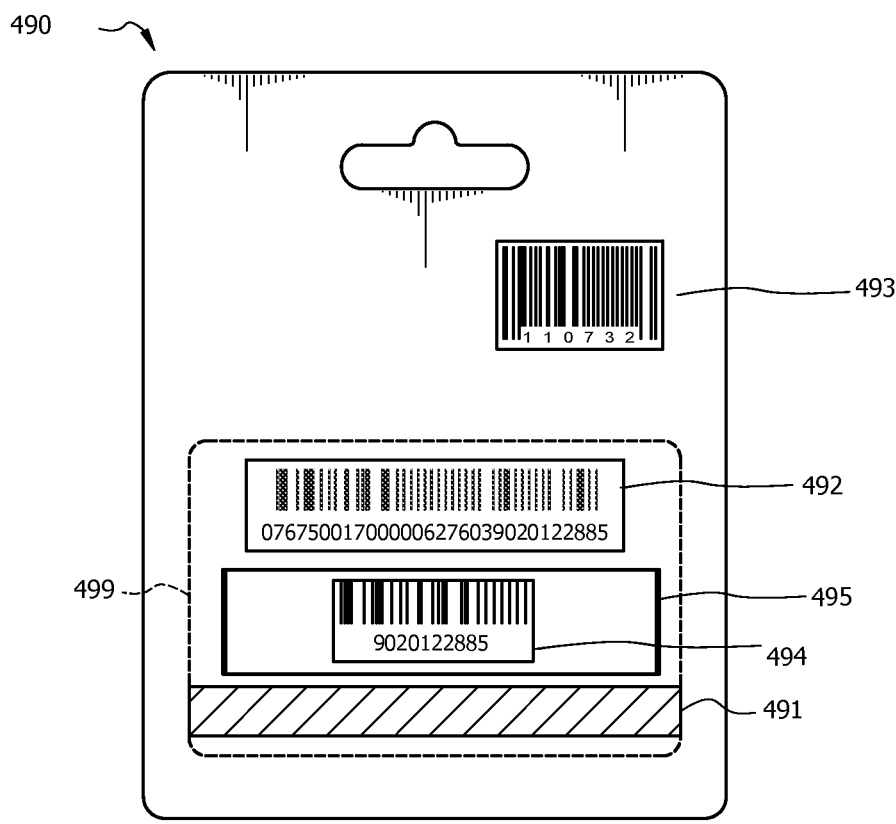
FIGS. 4E and 4F are perspective views of embodiments of value packs described herein.

As shown in FIG. 4E, an embodiment of a physical value pack 490 for the reloading of a GPR card, e.g., via the Quick Load option, comprises stored-value card 499 comprising magnetic stripe 491, an activation identifier 492, a product identifier 493, a redemption identifier 494, and a redemption identifier concealer 495 (which in this embodiment the redemption identifier concealer 495 comprises a "scratch-off" component and is depicted as a rectangle defining the outermost portion/perimeter of the redemption identifier concealer 495, the rectangle's lines depicting the intact scratch-off component, wherein the remainder of the area within the perimeter of the rectangle's lines depicts the scratch-off component being removed to reveal the redemption identifier 494).

In an embodiment, the activation identifier comprises encoded activation information. In an embodiment, the encoded activation information is interpretable by a point of sale device. In an embodiment, the encoded activation information is interpretable by a point of sale clerk. In an embodiment, the activation information is encoded in a barcode; a magnetic stripe; a matrix code; a QR code; a series of numbers, letters, and/or symbols; an RFID component; a microchip; or combinations thereof.

In an embodiment, the product identifier comprises encoded product information. In an embodiment, the encoded product information is interpretable by a point of sale device. In an embodiment, the encoded product information is interpretable by a point of sale clerk. In an embodiment, the product information is encoded in a barcode; a magnetic stripe; a matrix code; a QR code; a series of numbers, letters, and/or symbols; an RFID component; a microchip; or combinations thereof.

In an embodiment, the redemption identifier comprises encoded redemption information. In an embodiment, the encoded redemption information is interpretable by a point of sale device. In an embodiment, the encoded redemption information is interpretable by a point of sale clerk. In an embodiment, the encoded redemption information is interpretable by a person in possession of the value pack comprising the redemption information. In an embodiment, the redemption information is encoded in a barcode; a magnetic stripe; a matrix code; a QR code; a series of numbers, letters, and/or symbols; an RFID component; a microchip; or combinations thereof.

Referring again to FIG. 4E, in an embodiment, the magnetic stripe 491 is encoded with activation information, e.g., the same information as is encoded in activation identifier 492, and the redemption identifier 494 comprises redemption information in the form of a 10-digit identification number and barcode.

Figure 4F:
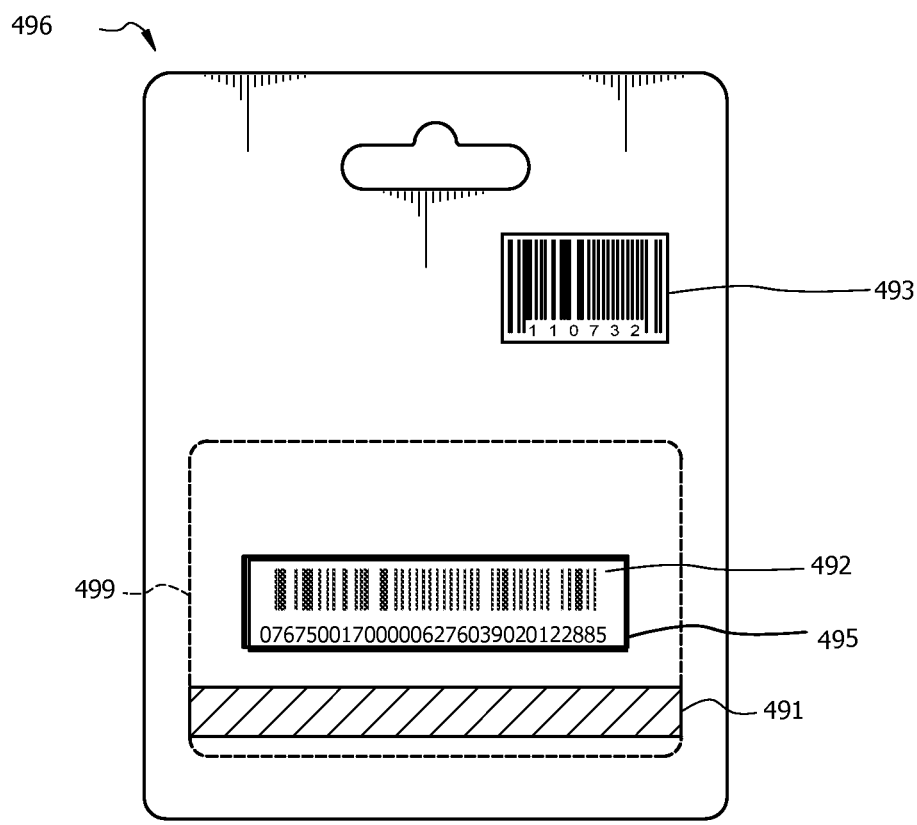

In a new and novel embodiment of a Quick Load value pack, as shown in FIG. 4F, value pack 496 comprises a stored-value card 499 comprising an activation identifier 492 (comprising a barcode and series of numbers) which is located on the redemption identifier concealer 495. In this embodiment, the activation identifier 492 is interpretable via a point of sale device and for the subsequent redemption of the value pack 496, the consumer would scratch off the redemption identifier concealer 495 (i.e., scratch off at least a portion the activation identifier 492, too) to reveal the redemption identifier 494 (redemption identifier is concealed, so not shown in FIG. 4F). In an alternative embodiment, only a portion of the activation identifier 492 is located on the identification identifier concealer 495.

Figure 3E:
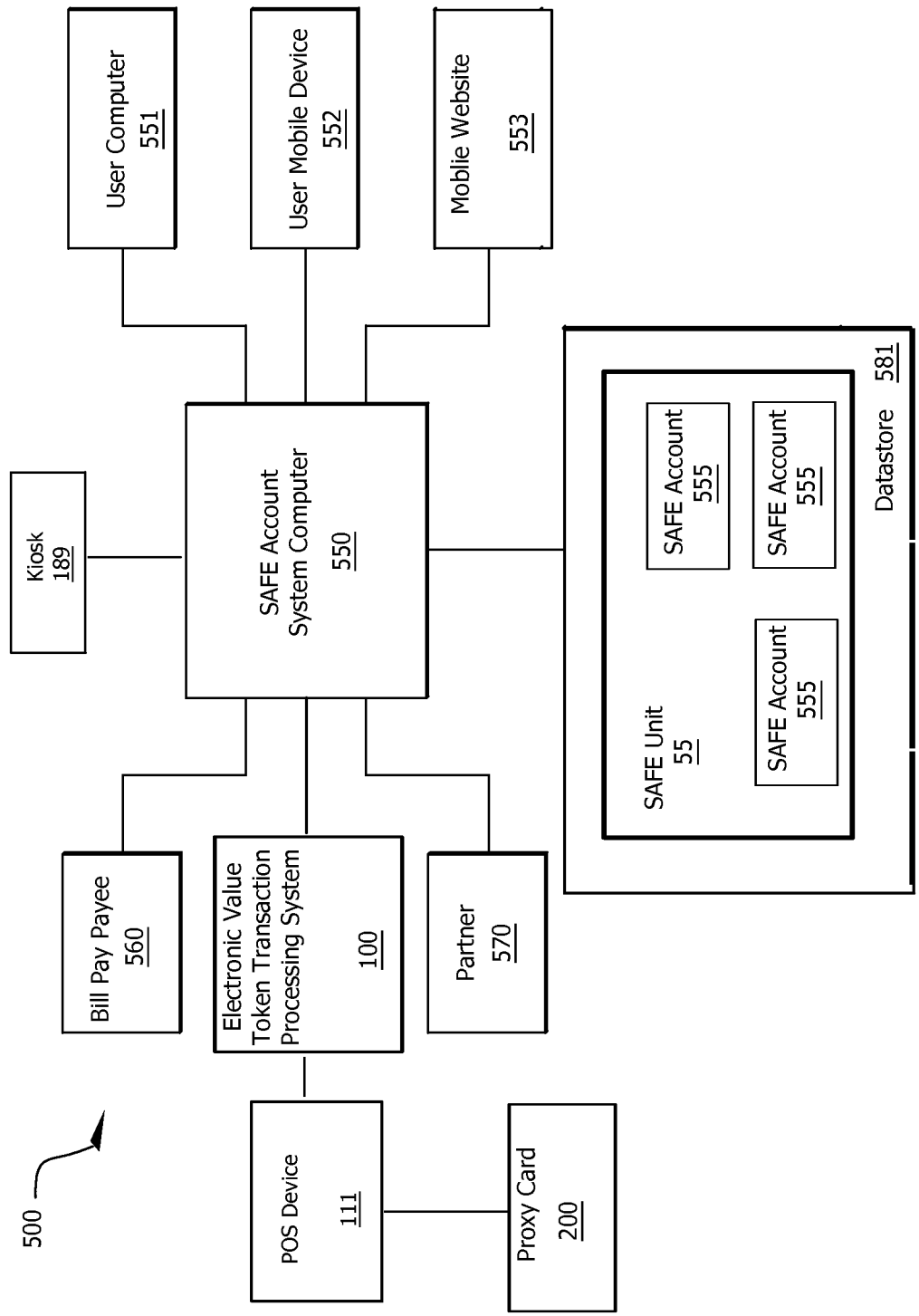
FIG. 3E is schematic illustration of an embodiment of a SAFE account processing system

Referring to FIG. 3E, a SAFE account 555 is a secure storage vehicle for reload cards (a/k/a value packs, packs, and Reloadit packs). The SAFE account is a web-based account which is accessible via any suitable computing device, e.g., a personal or professional computer, a smart phone, a tablet PC, kiosk, website, or the like. The SAFE account 555, by itself, cannot transact. However, by adding reload cards (a/k/a/ packs) which comprise digital funds to the SAFE account 555, the end user is able to access added services that they otherwise couldn't access through a use of a reload card/pack. These services include: (1) partial reload card redemption; (2) one load transaction across multiple reload cards; (3) scheduled redemption for reload cards; (4) proxy card loading; (5) virtual reload card/pack creation, purchase, and storage; and (6) bill pay.

Prior to SAFE account functionality, a consumer was generally restricted to loading its GPR card with a value pack via a Quick Load-type process. Now, as a result of SAFE account functionality a consumer can now securely add value pack funds to its GPR card by three different load methods: (1) Quick Load; (2) SAFE account; and (3) swipe at point-of-sale.

Using a SAFE account, consumers can store their funds and decide when they want to load funds to their GPR cards and how much. The SAFE account also enables mitigation of fraud through a variety of tools. Unlike the quick load option, the SAFE requires users to provide an email address and/or other identifying information (e.g., name, address, Social Security number and date of birth) upon set-up, as well as a self-assigned PIN—different than a scratch-off PIN associated with the physical reload card/pack. The user's self-assigned PIN must be used at time of reload (not the scratch-off PIN). The SAFE account may also the user to enter the full GPR card number into a SAFE account request prior to transferring funds. In an embodiment, a user with the SAFE account, but who does not have physical possession of the GPR card they want to load funds onto (such as when a child or grandchild has the GPR card at college), can safely load funds to that GPR card remotely.

Using the "swipe at a point-of-sale" functionality of a SAFE account, a user may fund its SAFE account or GPR card accounts via swipe or scan of a proxy card (e.g., proxy card 200, 201, and 203) or other unique SAFE account identifier interpretable by a POS device, at retail locations, rather than through the scratch-off PIN. Scanning, for example, would allow closed loop network transaction paths, avoiding open loop interchange fees. This innovation allows for the elimination of loads using scratch-off PINS and allows the reload cards (or value packs) to be swipe, scan, or otherwise loaded into a SAFE account, which allows the user to later transfer the funds for use.

SAFE account users can access the SAFE account system 500 via a computer website 519 (e.g., via user computer 551), kiosk 189, mobile application 520 (e.g., user mobile device 552), or mobile website 553. Upon SAFE account system access, the user may: (1) view the SAFE account balance; (2) view the reload cards present in the SAFE; (3) view recent transactions; (4) schedule reload transactions; (5) schedule bill pay transactions; (6) cancel scheduled transactions; (7) allocate funds from reload cards present in the SAFE to be loaded onto GPR cards associated with the SAFE; (8) associate reload cards with the SAFE; (9) associate GPR cards with the SAFE; (10) associate and/or authorize user devices with the SAFE; and (11) modify user identification and/or authorization information.

As described above, the electronic value token computer 150 can serve in the SAFE account processing system as can the datastore 180. In an alternative embodiment, as shown in FIG. 3E, the SAFE account processing system 500 can include independent, dedicated computers and/or servers (e.g., SAFE account system computer 550), processors, and datastores (e.g., datastore 581), i.e., not the electronic value token computer 150 and datastore 180, yet retain the SAFE account system functionalities described herein. In an embodiment, the SAFE account system processor 550 can connect to multiple POS devices 111 via an electronic stored-value card processing system (e.g., electronic value token transaction processing system 100), SAFE account user devices (e.g., user home computer 551 and user mobile device 552 (e.g, via a mobile app), mobile website 553, and other third party entities authorized for access (e.g., Bill Pay Payee 560 and SAFE account system partner 570). In any embodiment of the SAFE account processing system 500, the SAFE account system computer 550 is a special purpose machine enabled by source code and which executes specific programming instructions that cause the SAFE account processing computer 550 to perform the specific SAFE account-related tasks described herein. For the purposes of further disclosure, the electronic value token computer 150 and datastore 180 may be used as exemplary components of the SAFE account system 500.

A user can set up a SAFE account 555 by providing the SAFE account processing computer 550 an email address and password. The email address will be used by the SAFE account processing computer 550 to associate one or more reload cards, value packs, or packs with the user's SAFE account 555. It is contemplated that the SAFE account 555 will need to be validated by the user by the user responding to a confirmation email sent to the email address provided by the user for the SAFE account 555. If no confirmation response is received by the SAFE account processing computer 550, the user will be prohibited from adding reload cards to the user's SAFE account 555. In another embodiment, a SAFE account 555 can be created via the user's submission of an alternative unique user identifier (e.g., address, phone number, Social Security Number, user generated user name, or combinations thereof), authorization validator (e.g., password, biometric ID, security question answer, or combinations thereof), and the submission of user contact information (e.g., mobile number, social media account, Skype number, or combinations thereof). After creation of the SAFE account 555, the user can access the account by logging onto a SAFE account website 519 (or accessing the SAFE account via a SAFE account mobile app 520 or mobile website 553) and providing the requisite unique user identification and authorization validator (e.g., email address and password, respectively). In an embodiment, a SAFE account will remain active indefinitely, regardless of the balance maintained in the SAFE, e.g., regardless if there is $0 in the SAFE.

In an embodiment, the user's device for accessing its SAFE account will be authenticated during the creation of the SAFE account. For example, a confirmation email will contain a link that the user must click on resulting in the user being directed to a SAFE account system website 519. At the website 519, the creation of the SAFE account will be confirmed and the user will be asked to create a PIN (i.e., "Safe Code"). Once completed, the SAFE account will be created and the Device ID of the user's device (e.g., host id, MAC address, IP address, mobile number, etc.) will be associated with the user's SAFE account file 517.

In an embodiment, each time the user logs on to access its the SAFE account 555, the user's device will be authenticated. Such authentication will comprise a determination by the SAFE account system computer 550 that the device from which the unique user identification (e.g., email address) and the authorization validator (e.g., password) was received is a device whose Device ID is associated with the user's SAFE account file 517. In an embodiment, limits may be placed on the number of devices that may be associated with a user's SAFE account. In an embodiment, limits may be placed on the number of SAFE accounts for which a particular device may be associated. In an embodiment, limits may be placed on the number of devices that can access a particular SAFE account.

In a scenario in which a SAFE account user attempts to access its SAFE account via an unauthorized device, the SAFE account system will send a communication (e.g., email) to the user asking the user to respond to a SAFE account system computer's generated message and provide the "Safe Code" to validate both the user's request to access the SAFE account via the unauthorized device and to have the unauthorized device's id associated with the SAFE account file 517 so that future SAFE account access requests made from the device will be pre-authorized since the device id will be associated with the SAFE account file 517.

In additional embodiments, the "Safe Code" can be used to authorize SAFE account activities and transactions such as GPR card load, bill pay, reload card intake to the SAFE account at a point of sale, and SAFE account transaction reporting.

Reload cards, value packs, packs and any other unit of stored-value funds which can be transferred to a GPR card to "top off," "replenish," or "reload" a GPR card can be associated with (e.g., placed in) a SAFE account 555. In an embodiment, the association of packs to a SAFE account 555 can made via a website 519, mobile application 520, mobile website 553, or other access of the SAFE account system 500.

In an embodiment, when a SAFE account is created, the user can be given an option of redeeming reload cards maintained in the SAFE account in a first-in-first-out manner, i.e., the value amount of the reload cards associated with the SAFE account will be automatically used in the order in which the reload cards were added to the SAFE account. In an embodiment, when a SAFE account is created, the user can be given an option of redeeming reload cards maintained in the SAFE account in a last-in-first-out manner, i.e., the value amount of the reload cards associated with the SAFE account will be automatically used in the reverse order from which the reload cards were added to the SAFE account. In an embodiment, when a SAFE account is created, the user can be given an option of manually designating which reload card (and how much of said card) is to be redeemed for each individual transaction. In an embodiment, the user can establish specific rules for redemption for each particular reload card and/or for each particular type of SAFE account activity. For example, if a user enables the "bill pay" functionality of the SAFE account, the user may designate that the last-in-first out method of redemption be utilized to ensure that the requested bill pay amount will be remitted using the fewest number of reload cards in the SAFE.

When a reload card/pack is added to a SAFE account, the unique identifier of the reload card/pack will be validated by the SAFE account system computer 550. In an embodiment, the value associated with a reload card associated with, placed and/or maintained in a SAFE account will remain associated with the reload card. In an embodiment, the SAFE account system computer 550 can prohibit the use of a reload card associated with SAFE account, e.g., when a reload card is associated with a SAFE account, that reload card's own unique identifier and PIN (which would normally be used in a Quick Load scenario) will be ineffective for conducting activities with that reload card, e.g., activities via an interactive voice response system ("IVR") or a logged-out state of the SAFE account system website 519.

In an embodiment, a SAFE account can allow for the partial redemption of a reload card/pack. This unique functionality actually transforms a reload card/pack from a single use unit into a multiple use unit. Such a transformation improves the overall functioning of the SAFE account system's components by reducing the data storage capacity of the system by limiting the number of reload cards/packs required to be maintained within the system's database. For example, historically, a reload card, when redeemed, would be required to load all of the funds associated with the reload card onto a single GPR card, i.e., redemption of a reload card with a value of $500 would require that the reload card's $500 be entirely loaded onto single GPR card. As part of the present invention, via use of a SAFE account, the same $500 reload card may be used to "top off" or "replenish" multiple GPR cards, e.g., a single reload card/pack with a value of $500 can be used to reload one GPR card with $100 and another GPR card with $400. In another embodiment of the partial redemption functionality of the SAFE account 555, a reload card with a value of $500 can be used to reload a single GPR card with $200—the remainder of the $300 on the reload card is retained by the reload card in the SAFE account. As can be seen, the transformation of the reload cards from single use units into multiple use units reduces the amount a data storage necessary for the SAFE account processing system 500 by allowing the system to maintain fewer reload cards in the database. For example, instead of a person who wants to load $50 on each of his five sons' GPR cards having to buy multiple $50 reload cards/packs, the same person can buy a single $250 reload pack and via his SAFE account, distribute that $250 across his sons' five separate GPR cards—this alone reduces the data storage requirement by 500%.

In an embodiment wherein a partial reload card redemption has been requested, a user can be required to provide the "Safe Code" and also confirm the requested transaction details by providing the particular reload card to be redeemed and the monetary amount of the requested partial redemption. The user can provide the required information via the SAFE account system website 519, mobile application 520 on a user's mobile device 552, or mobile website 553.

In an embodiment, the SAFE account allows for a one load transaction across multiple packs—the SAFE account tracks the dynamic value of all of the reload cards (or packs) stored in the SAFE account. For example, if a user has four $100 reload cards in the SAFE account and the user desires to do a $400 load to a single GPR card, the SAFE account allows the user make just one load request. The SAFE account processing system will handle the redemption of the packs stored within the SAFE account on behalf of the user and load the GPR accordingly.

In an embodiment, the SAFE account allows for a scheduled redemption of a reload card. Such a scheduled redemption allows a user to designate a specific date and time to transfer funds from reload card maintained in a SAFE account to a GPR card associated with the SAFE account. For example, a SAFE account scheduled load can designate the load of a specific GPR card within a 30 day calendar period, a 60 day calendar period, a 120 day calendar period, or any other designated calendar period.

In an embodiment, when a user schedules a load to one or more GPR cards, the user must provide its "Safe Code" at the time of scheduling.

In an embodiment, the SAFE account system can notify a user in the instance when a scheduled load appears to exceed the value of the SAFE account. The user can then add sufficient reload cards to the SAFE to satisfy the scheduled load or the user can cancel the scheduled load.

In an embodiment, regarding a scheduled load, the user's SAFE account must be designated to apply reload card funds in a last-in-first-out manner. In an embodiment, regarding a scheduled load, the user's SAFE account must be designated to select the fewest reload cards necessary to satisfy the scheduled load amount, regardless of when the reload cards were associated with the SAFE account. In an embodiment, regarding a scheduled load, the user's SAFE account must be designated to select the most reload cards necessary to satisfy the scheduled load amount, regardless of when the reload cards were associated with the SAFE account.

In an embodiment, the SAFE account is assigned a unique identifier that will be recognized by the SAFE account processing system for, at least, integration with existing POS systems as well as other financial networks.

In an embodiment, the SAFE account's unique identifier is contained within a scannable barcode. The barcode could be printed online via website or could be supplied along with a pack sold in store for a user to create a SAFE account. In said embodiment, when a user visits a retail location and scans the unique barcode at the time of check out, the request will be routed to the SAFE account processing system 500 (e.g., or the electronic value token transaction computer 150) which will confirm that the SAFE account exists. Upon confirmation of the SAFE account, the recognition of the SAFE account unique identifier at the point of sale allows for the creation of a virtual reload card (a/k/a virtual value product) to be created and placed in the SAFE account. For example, the user could have its SAFE account unique identifier (e.g., barcode) scanned at a POS and also ask the clerk at the POS to have $50 placed in the SAFE account. The clerk could then notify the SAFE account processing system that an amount sufficient to satisfy the $50 SAFE account load request has been remitted (e.g., in some instances there may be a fee for such a transaction so the clerk may actually collect $55) in association with the unique SAFE account identifier which would cause the SAFE account processing system to create a virtual reload card in the amount of $50 and place that $50 reload card in the SAFE account. This is the equivalent of a virtual product being purchased in store.

In other embodiments, the SAFE account unique identifier may be contained within a proxy card (wherein proxy card may be in the form of proxy card 200, 201, 203, and combinations thereof), user device (e.g., smart phone, tablet, PC), near field communication technology, a radio frequency identification (RFID) tag, a microprocessor, a microchip, a, matrix code, a QR code, a magnetic stripe, other information conveying component, or combinations thereof.

As indicated above, the SAFE account system can create virtual reload cards. These virtual reload cards can comprise any denomination. In an embodiment, a SAFE account authorized partner 570 (e.g., a merchant, manufacturer, retailer, bank, etc.) may request the creation of a virtual reload card/pack and the placement of said virtual reload card into a user's SAFE account. For example, authorized party 1, a check cashing service, is interested in allowing a user to load money on to its GPR card within the authorized party 1's check cashing application. Because the SAFE account can access multiple GPR cards and allow for loads to those resulting cards, authorized party 1 is seeking to let users log in with their credentials within their application. The funds obtained by the check cashing transaction would be utilized to create a virtual reload card populated within the SAFE account. The end result is that the user could utilize the funds to load to any of its GPR cards whereas authorized party 1 can only allow for one load to one GPR card.

In an embodiment, the SAFE account allows bill payment. A SAFE account user can authorize funds associated with a reload card in the SAFE account to be redeemed to pay a bill received from an authorized SAFE account bill payee 560.

In an embodiment, a SAFE account user informs the SAFE account system processor 550 that the user is authorizing Business A to submit to the SAFE account system processor 550 certain bills for payment via the user's SAFE account 555. Upon receipt of the Business A bill by SAFE account system processor 550, the user's SAFE account 555 (e.g., reload cards contained in the SAFE) will be debited the amount of the bill received. If there is insufficient funds in the SAFE account, the parties will be notified that the bill pay transaction cannot be completed. In an embodiment, the user's SAFE account must be designated to apply reload card funds in a first-in-first-out manner. In an embodiment, the user's SAFE account must be designated to apply reload card funds in a last-in-first-out manner. In an embodiment, the user's SAFE account must be designated to select the fewest reload cards necessary to satisfy the bill amount, regardless of when the reload cards were associated with the SAFE account. In an embodiment, the user's SAFE account must be designated to select the most reload cards necessary to satisfy the bill amount, regardless of when the reload cards were associated with the SAFE account.

In an embodiment, the SAFE account user can schedule bill pay activities. For example, the SAFE account user can schedule SAFE account to transfer $500 from the user's SAFE account to the user's landlord's bank account on the last day of the month, every month, in order to ensure the user's rent is paid on time (i.e., the SAFE account user's landlord would be a SAFE account system partner 570). In an embodiment, the user's SAFE account must be designated to apply reload card funds in a first-in-first-out manner. In an embodiment, the user's SAFE account must be designated to apply reload card funds in a last-in-first-out manner. In an embodiment, the user's SAFE account must be designated to select the fewest reload cards necessary to satisfy the bill amount, regardless of when the reload cards were associated with the SAFE account. In an embodiment, the user's SAFE account must be designated to select the most reload cards necessary to satisfy the bill amount, regardless of when the reload cards were associated with the SAFE account.

In an embodiment, as described above, when a SAFE account is created, an email may be sent to the user/creator's provided email address. The user/creator of the SAFE account will have to activate the link received in the email to enable the use of the SAFE account before the user may login to the SAFE account.

Table 15A illustrates request header attributes for the creation of a SAFE account in at least one embodiment. Table 15B illustrates request parameters for the creation of a SAFE account in at least one embodiment. Table 15C illustrates response parameters for the creation of a SAFE account in at least one embodiment.

TABLE 15A

Request Header Attributes

| Name | Type | Required | Description |
| --- | --- | --- | --- |
| requestorId | string | Yes | The internal identifier for the person making the request |

TABLE 15B

Request Elements

| Name | Type | Required | Description |
| --- | --- | --- | --- |
| requestorId | string | Yes | The internal identifier for the person making the request |
| emailAddress | string | Yes | Email address of the person for whom the SAFE account is created |
| password | string | Yes | Password for the SAFE account |
| pin | string | Yes | Pin for the SAFE account |
| deviceSignature | string | Yes | Identifier that uniquely identifies the device |
| deviceName | string | No | Device name from which SAFE account is created |

TABLE 15C

Response Elements

| Name | Type | Description |
| --- | --- | --- |
| safeId | Guid | The internal identifier of the SAFE account |
| personId | Guid | The internal identifier of the person who owns the SAFE account |
| loginAccountId | Guid | The internal identifier of the login account creates for the SAFE account |
| deviceId | Guid | The internal identifier of the device from which the SAFE account is created |

In an embodiment, SAFE account processing APIs enable a user to create a SAFE account and perform transactions on the SAFE account.

Tables 16A-16E describe SAFE account processing API resources that allow for the creation of a SAFE account and the performance of transactions thereon in at least one embodiment.

TABLE 16A

PackAccountInformation

| Name | Type | Required | Description |
| --- | --- | --- | --- |
| productId | Guid | Yes | The product identifier |

TABLE 16B

SAFETransaction

| Name | Type | Max Length | Required | Description |
|---|---|---|---|---|
| transactioniId | Guid | — | Yes | The identification of the SAFE transaction |
| summary | SafeTransactionSummary | — | Yes | The account number of the SAFE account |
| detail | SafeTransactiondetails | — | Yes | The SAFE transaction details |

TABLE 16C

SafeTransactionSummary

| Name | Type | Max Length | Required | Description |
|---|---|---|---|---|
| transactionId | Guid | — | Yes | The identification of the SAFE transaction |
| safeAccountNumber | string | — | Yes | The account number of the SAFE account |
| postedTimeStamp | Date | — | Yes | The timestamp when the transaction is posted |
| approvedAmou | BigDecimal | — | Yes | The approved amount of the tranaction |

TABLE 16D

SafeTransactionDetails

| Name | Type | Max Length | Required | Description |
|---|---|---|---|---|
| packTransactions | List of AccountTransaction | — | No | List of pack level transactions associated with a SAFE account transaction |
| billPaymentTransaction | BillPaynmentSummary | | No | billPaymentSummary if the SAFE account transaction is related to bill pay |

TABLE 16E

SafeSummary

| Name | Type | Max Length | Required | Description |
|---|---|---|---|---|
| emailAddress | string | — | Yes | Email address associated to the SAFE account |
| personId | string | — | Yes | PersonId associated to the SAFE account |
| status | string | — | Yes | The status of the SAFE account |
| createdTimeStamp | TimeStamp | — | Yes | Time stamp of when the SAFE account was created |
| safeAccountNumber | string | — | Yes | The SAFE account number |
| totalNumberOfPacks | Integer | — | Tes | Number of packs associated to the SAFE acocunt |

In an embodiment, a user can access its SAFE account upon validation of the user's email address, password, and device. For example, the SAFE account login validation method provides first level authentication via determining whether the loginAccount status is enabled, the password is valid, and the device from which the access request emanates has been associated with the SAFE account.

Table 17A describes the SAFE account login request validation header attributes in at least one embodiment. Table 17B describes the SAFE account login request validation elements in least one embodiment. Table 17C describes the SAFE account login validation response elements in least one embodiment.

TABLE 17A

Request Header Attributes

| Name | Type | Required | Description |
| --- | --- | --- | --- |
| requestorId | string | Yes | The internal identifier for the person making the request |

TABLE 17B

Request Elements

| Name | Type | Required | Description |
| --- | --- | --- | --- |
| emailAddress | string | Yes | Email address of the person for whom the SAFE account is created |
| password | string | Yes | Password for the SAFE account |
| deviceSignature | string | Yes | Identifier that uniquely identifies the device |

TABLE 17C

Response Elements

| Name | Type | Description |
| --- | --- | --- |
| loginAccountId | Guid | The internal identifier of the login account created form the SAFE account |
| safeId | Guid | The internal identifier of the SAFE account (bag entityId) |

TABLE 17C-continued

Response Elements

| Name | Type | Description |
| --- | --- | --- |
| deviceId | Guid | If the deviceSignature is already associated with the SAFE account, the device is returned |
| deviceSignature | | If the device Signature is not associated with the SAFE account, the deviceId is null - second level authentication such as PIN validation is required |

In an embodiment, a user can access its SAFE account to redeem a specified amount across the reload cards in a SAFE account.

Table 18A describes the SAFE account redemption request header attributes in at least one embodiment. Table 18B describes the SAFE account redemption request elements in least one embodiment. Table 18C describes the SAFE account redemption request response elements in least one embodiment.

TABLE 18A

Request Header Attributes

| Name | Type | Required | Description |
| --- | --- | --- | --- |
| requestorId | string | Yes | The internal identifier for the person making the request |

TABLE 18B

Request Elements

| Name | Type | Required | Description |
| --- | --- | --- | --- |
| safeId | Guid | C | The internal identifier of the SAFE account whose reload cards are to be redeemed. This is not required id safeAccountNumber is present in the request |
| safeAccountNumber | String | C | Account Number of the Proxy card in the e-wallet whose reload cards are to be redeemed. This is not present if the e-wallet element (i.e., bagId) is present in the request. |
| pin | String | No | The pin associated with the Login Account of the person who owns the e-wallet. The pin will not be validated if it is present in the request. |
| transactionAmount | BigDecimal | Yes | Amount that needs to be redeemed form the reload cards |
| transactionCurrency | Currency | Yes | Currency of the transaction amount |
| transactionFeeAmount | BigDecimal | Yes | Fee amount associated with the redemption transaction. This fee amount is also redeemed from the reload cards. |
| retrievalReferenceNumber | String | No | Retrieval Reference Number |
| storeNumber | String | No | Store Number |
| terminalNumber | String | No | Terminal Number |
| merchantName | String | No | Merchant Name |
| merchanttransactionId | String | No | Merchant provided Transaction Identifier |
| correlationId | Guid | No | Correlated Transaction Identifier |
| packAccountIds | List of Guids | No | Optional reload card account IDs from which user can choose to redeem |

TABLE 18C

Response Elements

| Name | Type | Description |
| --- | --- | --- |
| safetransaction | SafeTransaction | Transaction created as part of redemption transaction |

In an embodiment, a user or other authorized entity can access its SAFE account to look up and request reports concerning SAFE account transactions.

Table 19A describes the SAFE account transaction report request header attributes in at least one embodiment. Table 18B describes the SAFE account transaction report request elements in least one embodiment. Table 18C describes the SAFE account transaction report request response elements in least one embodiment.

TABLE 19A

Request Header Attributes

| Name | Type | Required | Description |
| --- | --- | --- | --- |
| requestorId | string | Yes | The internal identifier for the person making the request |

TABLE 19B

Request Elements

| Name | Type | Required | Description |
| --- | --- | --- | --- |
| safeId | Guid | C | The internal identifier of the SAFE account whose reload cards are to be redeemed. This is not required id safeAccountNumber is present in the request |
| safeAccountNumber | String | C | Account Number of the Proxy card in the e-wallet whose reload cards are to be redeemed. This is not present if the e-wallet element (i.e., bagId) is present in the request. |
| startDate | String | No | The start date of the transactions to be retrieved |
| endDate | String | No | The end date of the transactions to be retrieved |

TABLE 19C

Response Elements

| Name | Type | Description |
| --- | --- | --- |
| safeId | Guid | The internal identifier of the SAFE account |
| safeTransactions | List of SafeTransactionSummary | A list of SafeTransactionSummary |
| responseCount | Integer | Number of SAFE account transactions |

As indicated above, a SAFE account also enables mitigation of fraud through a variety of tools. The key anti-fraud tools include: (1) monitoring GPR card and reload card/pack activations and transaction monitoring using data and sophisticated anti-money laundering and fraud detection software; (2) 24-hour risk management resources and risk-based funding delays; (3) educating and training interested parties about victim-assisted fraud; (4) ensuring consumer awareness of fraud threats; and (5) coordinating with law enforcement and regulatory agencies.

In an embodiment, proactive analysis of GPR card registrations and their associated attributes can be performed. A point of sale monitoring system may provide alters where potential fraud is detected based on suspicious activity, such as an unusual number of sales of reload cards/value packs in a specific store or region or atypical amounts of funds to be loaded. If such cases are observed, risk management personnel have the ability to block the purchase of reload cards/value packs from a particular store or stores and to delay funding for a cash transfer of money to a GPR card from an individual reload card/value pack.

Further fraud mitigation techniques include, in an embodiment, for a GPR user to open a SAFE account or to use swipe at the register technology, the user purchases a reload card/pack at a store, and then will have to first associate the reload card/pack to a SAFE account rather than using Quick Load to directly fund a GPR account. The SAFE will require the user to add a complete 16-digit GPR card number to the SAFE. The SAFE account system computer 550 (or in alternative embodiments electronic value token transaction computer 150) will verify that the GPR account entered is registered and has passed the user identification process prior to transferring funds.

Further, the SAFE account system allows monitoring of SAFE account-related activations and activity based on the device the user uses to link to its account (e.g., smartphone, tablet, or computer). In practice, this means that the user will be identified by the device from which the user is accessing the SAFE and loading a GPR card. In some embodiments, a user will only be able to create one SAFE account per device. Once the device is used to create a SAFE account, that device will not be able to create another SAFE account. In other embodiments, a user will be able to create multiple SAFE accounts with a single device. These tools, along with an enhanced ability to monitor SAFE account funding and transaction activity, will allow intervention into possible fraud scenarios prior to funds being transferred from a reload card/pack, such as a Reloadit Pack, or withdrawal.

Beyond this updated experience for the user, a variety of new security technologies may be implemented to monitor suspicious activity related to reloading of GPR card accounts, such as identifying a SAFE account with a zip code at time of its creation and monitor zip codes of the locations where associated value packs are purchased. "Geographic Reasonability" thresholds (based on mileage between account zip code and pack purchase zip code) will alert when SAFE accounts are funded with reload cards or value packs activated from various parts of the country. Advanced fraud monitoring systems can track the device fingerprint in real-time and will analyze velocity load limits based on user behavior. SAFE account transaction activity can be monitored based on the history of the user's use of the SAFE account. This data will help allow tracking of usage patterns and allow the identification of suspicious activity and mitigate fraud (through contacting the retail store selling the reload card/pack or by preventing loads and transfers). Blacklist accounts and users who appear to have engaged in excessive transfers or misused the product may also be used. The SAFE account system computer 550 can monitor the SAFE account and suspend and/or block a SAFE account's use and/or functionalities. In an embodiment, a SAFE account which has been suspended may remain viewable by a user but the user will not be able to add/remove or otherwise affect the reload cards in the SAFE.

In an embodiment, the SAFE account may have daily transaction limits. For example, limits may be set for daily, weekly, monthly, yearly, and total amounts that may be loaded into a SAFE account via reload card association with the SAFE account. Additionally, in an embodiment, limits may be set for the maximum fund amounts that may be maintained in the SAFE account at any time. In an embodiment, enhanced SAFE account features will allow imposition of lower limits on new users, new devices, and new SAFE accounts which are opened.

As described above, e.g., FIG. 3A, a SAFE account 555 and e-wallet 10 may be maintained, processed, and transacted by the same enterprise infrastructure, e.g., electronic value token transaction processing system 100. Moreover, in an embodiment, all of the above described functions of the SAFE account may be accessed, initiated, managed, and/or controlled by a user via the same smart phone, tablet, or computer that accesses, manages, and/or controls the user's e-wallet. In an embodiment, the e-wallet may treat the SAFE account 555 as if the SAFE account 555 is a sub-wallet, as detailed more fully herein.

As referenced with respect to both the primary e-wallet and sub-wallet embodiments described above, the disclosed e-wallet and sub-wallet methods and systems provide users with the ability to exchange an electronic value token residing in the user's e-wallet or sub-wallet with/for an electronic value token not presently residing in the user's e-wallet or sub-wallet, but made available via the e-wallet's or sub-wallet's transaction system(s).

The electronic value token computer's 150 owner and/or operator may earn revenue via arbitrage-type activities. That is, electronic value token computer's 150 owner and/or operator may keep the difference in going rates between two electronic value tokens, e.g., a first electronic value token being traded/exchanged and a second electronic value token being desired/obtained. In at least one embodiment, the electronic value token transaction computer 150 may charge the user transaction fee for the exchange instead. The transaction fee may be flat or based on the size of the exchange.

The electronic value token transaction computer 150 may also charge either or both of the issuers and/or retailers associated with the exchange a flat transaction fee or one based on the amount of the exchange. These fees may be minimal but generated in high volume. All parties may benefit because the user is receiving value tokens the user will use in exchange for value tokens the user would not use. Moreover, one issuer and/or retailer is eliminating the debt or inventory liability associated with the exchanged value token, thus freeing up capital for other uses. Also, the other issuer and/or retailer may be gaining a customer, retaining a loyal customer, or increasing revenue if the customer spends more than the amount of the electronic value token.

As referenced with respect to both the primary e-wallet and sub-wallet embodiments described above, the disclosed e-wallet and sub-wallet methods and systems provide users with the ability to exchange electronic value tokens located in e-wallets and/or sub-wallets for other electronic value tokens not located in said e-wallets or sub-wallets. Such value token exchange may be initiated (1) by an e-wallet user (i) at a point of sale, (ii) at a kiosk, (iii) via a user's personal digital assistant or smart phone, (iv) via web access to the user's e-wallet, (v) or any other method of accessing the user's e-wallet; or (2) by an application of an e-wallet rule by an e-wallet processing system, wherein the rule is established by (i) the e-wallet user, (ii) the e-wallet provider, (iii) or a combination thereof.

In at least one embodiment, exchanging a first value token associated with a first retailer located in the e-wallet for a second value token associated with a second retailer not located in the e-wallet requires an exchange rate be applied. This exchange rate may be applied against the value of the second value token being sought in the exchange, thus reducing the face value of the second value token is relation to the value of the first value token for which it is exchanged or the exchange rate may be applied against some other valued asset located in the e-wallet (as prescribed by any pertinent rules or directives). The exchange rate may be realized by the e-wallet processing system and/or shared with designated vendors, merchants, and issuers.

The exchange rate may established via an ongoing valuation program operated by the e-wallet processing system or affiliated entity comprising the tracking of the use of and interest in electronic value tokens, gift cards (or other similar instruments), the acquisition of such electronic value tokens, gift cards (or other similar instruments) from other e-wallet users or other sources, and the establishment of dynamically varying values for all such electronic value tokens and gift card-type instruments available to the e-wallet processing system for incorporation into an electronic value token exchange program.

Figure 6D:
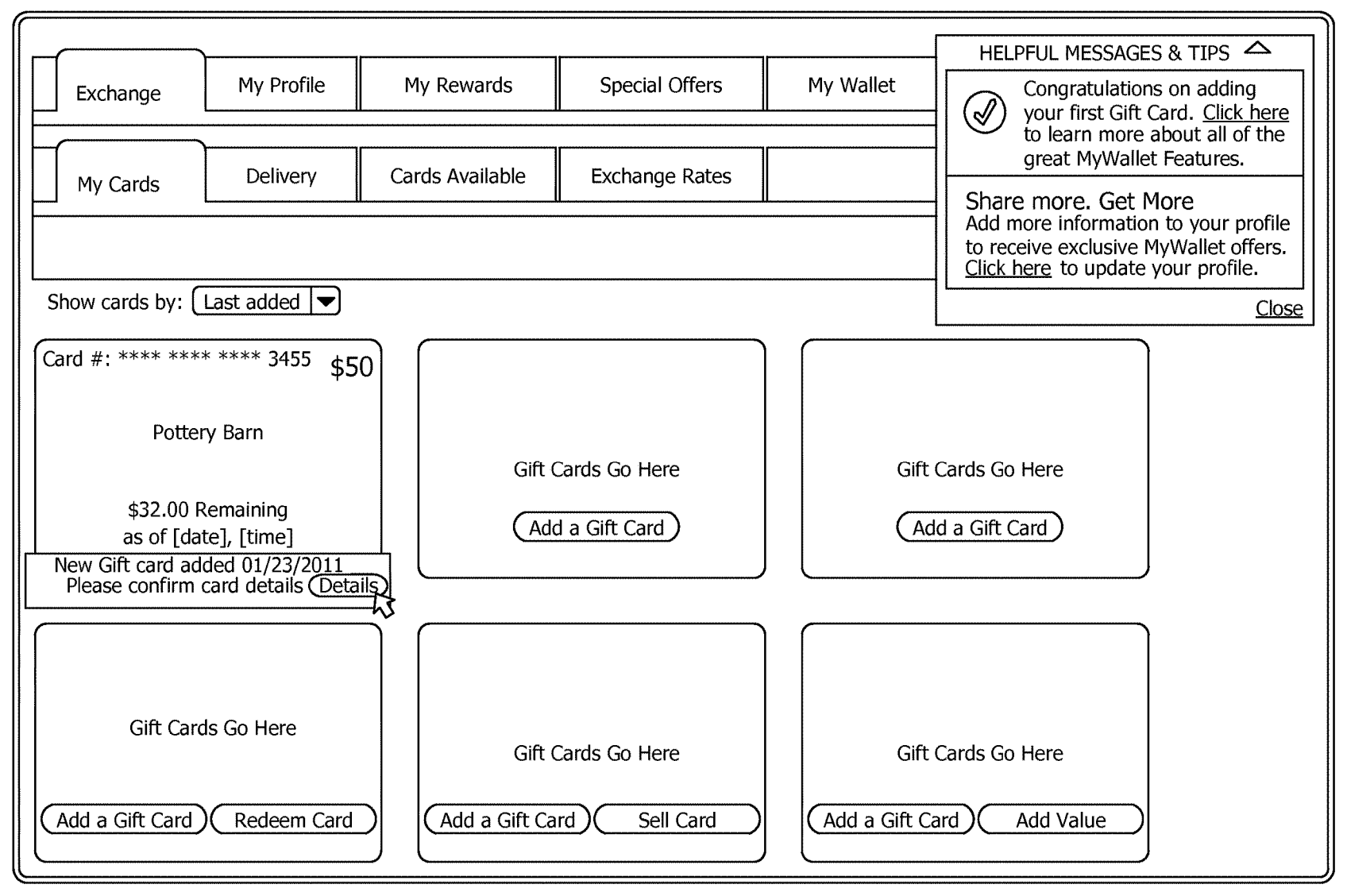

The above-described electronic value token exchange program may be exemplified by the following discussion. An e-wallet user can approach an e-wallet associated kiosk 189 at Retailer A's establishment. The e-wallet user interfaces with the kiosk 189 and provides the kiosk with e-wallet identifying information (e.g., as described in Table 1 herein "accountid"). The provision of identifying information may be made via manual input by the kiosk's user or may be made automatically via communication between the e-wallet user's personal digital assistant (or proxy card 200) and the kiosk 189. The e-wallet user may then use the kiosk 189 to access the e-wallet's electronic value token exchange program and the kiosk 189 may be further used to facilitate and complete any requested electronic value token exchange. In an embodiment, the e-wallet user may wish to exchange an electronic value token issued and/or accepted by Retailer B contained in the user's e-wallet (or a sub-wallet thereof) for an electronic value token issued and/or accepted by Retailer A. The e-wallet user interfacing with kiosk 189 can result in the e-wallet user being presented with a screen display such as is depicted in FIG. 6C. Besides providing the e-wallet user with the ability to review the contents of the e-wallet, the display allows the e-wallet user to select an "Exchange" tab from the available functionalities. The "Exchange" tab will then present the e-wallet user with the options available for electronic value token exchange. As depicted in FIG. 6D, such options can comprise: (1) view a selection of electronic value token(s) available for acquisition; (2) view the selection of electronic value token(s) presently residing in e-wallet; (3) view the various exchange rates for the identified electronic value token(s) for acquisition as calculated in view of the electronic value tokens selected for removal (exchange) from the e-wallet (exchange rates may vary based on types/retailers of electronic value tokens selected for exchange); (4) view options for satisfying exchange rate (e.g., (i) reduction in value of electronic value token selected for acquisition to meet the exchange rate or (ii) application of the amount of the exchange rate to some other asset residing in the e-wallet such as a credit card value token or a debit card value token); (5) view a selection of options for delivery of the electronic value token selected for acquisition such as (i) delivery into the e-wallet (or sub-wallet), (ii) delivery via email, SMS, social media, or other electronic method to a personal digital assistant or computer, (iii) print out of a tangible version of the electronic value token (e.g., via print on receipt-type capability as described in U.S. patent application Ser. No. 12/719,741 which is incorporated by reference in its entirety) at the kiosk or other user-selected print device. The user may make its desired selections in response to the information provided in each of the above-describe screens, as each of the described screen view options include functionality allowing for selection of the displayed options. In this example, the user selects that the Retailer B $25.00 electronic value token residing in the e-wallet is to be exchanged for a Retailer A electronic value token. As a result, the electronic value token exchange program prompts the kiosk 189 to display that the requested exchange will result in the user acquiring a Retailer A electronic value token in the amount of $24.75 if the user selects that the exchange rate be applied against the value of the Retailer A electronic value token (the exchange rate will vary from transaction to transaction, the exchange rate could be any value, e.g., $0.001 to $10.00, or any values below, within, or above this range). The user makes such selection. The electronic value token exchange program prompts the kiosk 189 to display the available delivery methods and the user selects delivery into the e-wallet. The electronic value token exchange program prompts the kiosk 189 to display another screen similar to FIG. 6C, but indicating that the e-wallet now contains a Retailer A electronic value token in the amount of $24.75.

As a result of the above "Exchange" transaction, the e-wallet user received its desired Retailer A electronic value token and the electronic value token exchange program received a Retailer B $25.00 electronic value token. As part of the above-described transaction, the electronic value token exchange program contacted the electronic value token issuing entity of Retailer A electronic value tokens (e.g., in an embodiment issuing entity of Retailer A electronic value tokens could be the electronic value token exchange program 2000) and requested a Retailer A $24.75 electronic value token be provided to meet the e-wallet user's request; alternatively, the electronic value token exchange program modified a Retailer A electronic value token it already controlled, e.g., modified a Retailer A $25.00 electronic value token to only be worth $24.75 and informed the issuing entity of Retailer A electronic value tokens that it could reduce its liability associated with said card by $0.25. Further, the electronic value token exchange program 2000 will contact the Retailer B electronic value token issuer and provide the issuer with the appropriate Retailer B $25.00 electronic value token identification so that the issuer can remove that Retailer B $25.00 electronic value token from its list of liabilities. Thus, as an end result, the electronic value token exchange program's activities have resulted in a $0.25 value (the exchange rate, i.e., difference in value of electronic value token acquired by requesting user and electronic value token surrendered by requesting user as part of the exchange) that may be allocated to interested parties per established contractual obligations.

In an alternative scenario, if the e-wallet requesting user selects the exchange rate to be satisfied by another asset residing in the e-wallet or sub-wallet, such as a credit card electronic value token or a debit card electronic value token, the e-wallet user would be provided with a $25.00 Retailer A electronic value token matching the $25.00 Retailer A electronic value token surrendered in the transaction and the exchange rate of $0.25 would be realized from charging against the credit card electronic value token or debiting against the debit card electronic value token. Such actions would be transacted with communications between the electronic value token exchange program and the credit card electronic value token or the debit card electronic value token requesting that the $0.25 exchange rate value be paid to the electronic value token exchange program. Thus, again as an end result, the electronic value token exchange program's activities would have resulted in a $0.25 value (the exchange rate) that may be allocated to interested parties per established contractual obligations.

The above-described electronic value token exchange transaction (or any described variation thereof), although described in the kiosk 189 context, could also be performed at point of sale, via a personal digital assistant with e-wallet functionality, or via a computer with access the user's e-wallet.

In an alternative electronic value token exchange embodiment, as discussed previously, the e-wallet may automatically direct electronic value token exchange activities. For example, the e-wallet user may manage the e-wallet so that upon the occasion when the user presents the e-wallet to satisfy a transaction at retail establishment, e.g., Retailer Q, and the e-wallet contains no Retailer Q branded electronic value tokens, the e-wallet will automatically, and in real time, initiate an electronic value token exchange process wherein the e-wallet communicates a request for electronic value token exchange to the electronic value token transaction computer 150. In this example, the e-wallet user has managed the e-wallet so that all electronic value tokens associated with prepaid services (gift card-type electronic value tokens) are located in a designated sub-wallet and each of said electronic value tokens were placed/ordered/designated in the sub-wallet via a preferential ranking system, e.g., most preferred electronic value token or token type (e.g., #1) to least preferred electronic value token or token type (e.g., #22, if there are 22 types of electronic value tokens in the sub-wallet. For example, Retailer M branded electronic value tokens may be designated as most preferred and Retailer L branded electronic value tokens may be designated as least preferred. Further in the example, the e-wallet also has been provided with rules by the user that directs the e-wallet, in circumstances wherein the e-wallet has been presented to facilitate a transaction at a retailer in which the e-wallet contains none of said retailer's electronic value tokens (the e-wallet will recognize the retailer based on information exchanged between the e-wallet and the retailer's communication devices at the onset of the original transaction), such as the Retailer Q scenario described above, the e-wallet rules direct the e-wallet to initiate an electronic value token exchange request and to include in said request the exchange of the least preferred electronic value token residing in the e-wallet, i.e., the Retailer L branded electronic value token (#22) and if necessary preferred electronic value token #21, #20, etc., for a Retailer Q electronic value token in an amount sufficient to meet the original transaction's amount. The electronic value token transaction computer 150, upon receipt of the electronic value token exchange request, communicates with an electronic value token exchange program 2000, e.g., an electronic value token distributor, (which is part of the overall electronic value token transaction processing system 100) to effectuate the requested electronic value token exchange. The requested electronic value token exchange is performed, the e-wallet receives the requested Retailer Q branded electronic value token, which is coincidentally used in conducting the original transaction, and the e-wallet surrenders (or makes unavailable for use and only available for modification) the Retailer L branded electronic value token to the electronic value token transaction computer 150, which in this case was actually valued in excess of the requested Retailer Q branded electronic value token. As such, the electronic value token transaction computer 150, modifies the value of the Retailer L branded electronic value token (either internally or via communication with the Retailer L branded electronic value token's issuing system) to reflect the value reduction based on the provided Retailer Q branded electronic value token, extracts the exchange rate for the exchange of the Retailer Q branded electronic value token for the Retailer L branded electronic value token (as will be discussed more fully herein), communicates the transactional information to all interested parties, and returns (or makes available again) the value-modified Retailer L branded value token to the user's e-wallet.

In an alternate embodiment, the e-wallet's electronic value token exchange rules could have provided that the e-wallet query the electronic value token transaction computer 150 regarding the best available exchange rate for the electronic value tokens residing in the e-wallet and make the exchange based on the best exchange rate rather than the ranking of the electronic value tokens. Further the e-wallet user may subjectively determine which electronic token(s) should be exchanged to satisfy a transaction.

In an embodiment, the electronic token exchange program 2000 may survey a user's e-wallets and sub-wallets maintained by the electronic value token transaction computer 150 and make the e-wallet user an offer(s) for electronic value token exchange(s). For example, the electronic token exchange program 2000, as part of the survey may determine, based on (i) the history of the e-wallet's use; (ii) the length of time an unused electronic value token has resided in an e-wallet; (iii) the demand for certain electronic value tokens in the marketplace; (iv) dates for spoilage of electronic value tokens; (v) promotional offers for acquiring electronic value tokens; and (vi) combinations thereof, to offer an e-wallet user to exchange an electronic value token(s) presently residing in the user's e-wallet/sub-wallet for an electronic value token(s) not presently residing in the user's e-wallet/sub-wallet. In an embodiment, the electronic token exchange program 2000 may supplement the offer for exchange with a value added/bonus incentive as described previously herein. In another embodiment, the offer may include an option for the user to place a portion of the exchange value amount into a savings wallet, as will be more fully below.

As referenced with respect to both the primary e-wallet and sub-wallet embodiments described above, the disclosed e-wallet and sub-wallet methods and systems provide users with the ability to designate the locations of value tokens residing in an e-wallet or sub-wallet, as well as rules prescribing the use and/or availability of said e-wallet and/or sub-wallet. As also described herein, electronic value token(s) may be removed from a sub-wallet configured to allow redemption activities (hereinafter "fully-redeemable" designated e-wallet or sub-wallet) and placed into a sub-wallet configured for savings activities with limited redemption possibilities (hereinafter "savings" designated e-wallet or sub-wallet). In fact, the instant system provides for electronic value token(s) to be placed into a "savings" designated e-wallet or sub-wallet at the time the electronic value token is made available to the e-wallet or sub-wallet.

In an embodiment, electronic value tokens may be designated for and/or placed in certain e-wallets and/or sub-wallets which have rules providing that the e-wallets or sub-wallets are to be used for savings activities and thus are not readily available for general access or for redemption/exchange activities. In an embodiment, similar savings capabilities, functionalities, requirements, and limitations of the instantly described electronic value token transaction processing system 100 are detailed and described in International Application Serial No. PCT/US11/49338 which is incorporated by reference in its entirety, such similar savings capabilities, functionalities, requirements, and limitations may be adapted from the context described in International Application Serial No. PCT/US11/49338 to be applied in the instant e-wallet/electronic value token context.

At least in some embodiments, allows a user to easily redistribute electronic value tokens (e.g., debit card-related electronic value tokens) from a "fully-redeemable" designated e-wallet or sub-wallet to a "savings" designated e-wallet or sub-wallet, and vice versa. The user may be limited by law to a given number of, e.g., six, transfers out of the "savings" designated e-wallet or sub-wallet to the "fully-redeemable" designated e-wallet or sub-wallet per calendar month. The user may designate one-time transfers through the e-wallet system's website, IVR, personal digital assistant or smart phone, or with a customer service representative. The user may also establish and automated transfers between the "fully-redeemable" designated e-wallet or sub-wallet and the "savings" designated e-wallet or sub-wallet. To encourage savings, users may be presented with option to automatically fund the "savings" designated e-wallet or sub-wallet from the "fully-redeemable" designated e-wallet or sub-wallet that may be triggered by various transaction events, including: (a) upon receiving a direct deposit, (b) when a reload/recharge/topping up transaction occurs, and/or (c) at a designated time interval (e.g., recurring weekly or monthly). The user can elect all, some, or none of the options available. Moreover, the above events may be transacted regardless of the "fully-redeemable" designated or "savings" designated e-wallet or sub-wallet's current balance. The user may have the ability to select an amount or percent of electronic value tokens loaded onto "fully-redeemable" designated e-wallet or sub-wallet. Where the user chooses a time interval for automatic transfers, the user may be able to select a preferred date. The user would have the flexibility to update, edit, or otherwise change the automatic funding option at any time. Any negative "fully-redeemable" designated e-wallet or sub-wallet may need to be cured prior to initiating any automatic or one-time transfers to "savings" designated e-wallet or sub-wallet. If an automatic transfer cannot be fully funded or cannot be funded at all, any amounts available will be taken from the "fully-redeemable" designated e-wallet or sub-wallet to the "savings" designated e-wallet or sub-wallet and a notification will be provided to the e-wallet user describing the transaction. Automatic transfers will continue thereafter for the designated transfer option and amount.

FIG. 1 is a schematic illustration of an embodiment of the disclosed system 1 for tracking the use of an electronic stored-value card. The system 1 may comprise a user device 22, a wallet environment 20, a transaction point 24, a merchant 26, a processor or issuer 28, or combinations thereof. The components of the system 1 may be operably connected via a network (e.g., broadband, optical, Wi-Fi, Bluetooth, NFC, cellular, satellite, cloud, card processing network, banking network, a local area network, the World Wide Web for Internet, non-cellular mobile phone network, a land-line network, other networks for transferring electronic information, or combinations thereof).

Particularly, the user device 22 may be operably connected to the wallet environment 20, the processor 28, the issuer 28, or combinations thereof, via the network; the transaction point 24 may be operably connected to the user device 22, the merchant 26, the processor 28, the issuer 28, or combinations thereof, via the network; the merchant 26 may be operably connected to the transaction point 24, the processor 28, the issuer 28, or combinations thereof, via the network; the wallet environment 20 may be operably connected to the user device 22, the processor 28, the issuer 28, or combinations thereof; or combinations thereof.

The wallet environment 20 may comprise any number of electronic wallets. In embodiments, the wallet environment 20 is a digital environment which may be accessed via the user device 22, a transaction point 24, a merchant 26, or combinations thereof.

One or more electronic wallets (e.g., electronic wallet 10) may be associated with the electronic wallet environment 20. For example, FIG. 1 shows an embodiment of the system 1 comprising one electronic wallet 10. In alternative embodiments, the system 1 may comprise a first electronic wallet and a second electronic wallet. In additional or alternative embodiments, the electronic wallet 10 may comprise any number of sub-wallets as described herein below. Electronic wallets (e.g., electronic wallet 10) may offer a variety of services, including storing, managing, and facilitating the redemption of value (e.g., monetary, discount, promotional, value tokens, rewards, etc.) of eSVCs. One or more electronic stored-value cards (hereinafter "eSVC" or "eSVCs") (e.g., eSVC 12 and eSVC 14) may be associated (e.g., registered) with the one or more electronic wallets. For example, both eSVC 12 and eSVC 14 may be registered in electronic wallet 10. Alternatively, eSVC 12 may be registered in a first electronic wallet and eSVC 14 may be registered in a second electronic wallet. In additional or alternative embodiments, the eSVCs may be associated (e.g., registered) in a sub-wallet of an electronic wallet (registration techniques, methods, and processes are discussed hereinbelow).

One or more digital stickers (e.g., digital stickers 16 and 18) may be associated with an eSVC. For example, digital sticker 16 may be associated with eSVC 12 or eSVC 14. In additional or alternative embodiments, a second digital sticker 18 may be associated with a second eSVC 14, and a first digital sticker 16 may be associated with a first eSVC 12. In embodiments, the eSVC 12 may comprise the digital sticker 16 or the eSVC 12 may comprise the digital sticker 18. In additional embodiments, eSVC 14 may comprise the digital sticker 18.

In the embodiment of FIG. 1, eSVCs 12 and 14 and digital stickers 16 and 18 are shown associated with electronic wallet 10; however, eSVC 14 and digital sticker 18 may be associated with a second electronic wallet while eSVC 12 and digital sticker 16 may be associated with the electronic wallet 10. One or more eSVCs and digital stickers may be associated with a sub-wallet of the electronic wallet 10 (sub-wallet configurations are described in detail below).

The digital sticker 16 of the system 1 may be configured to convey transaction information of the eSVC 12 or eSVC 14 to a processor 28 or an issuer 28 of the eSVC 12 or eSVC 14, for example, via a network of the types described above. The digital sticker 18 of the system 1 may be configured to convey transaction information of the eSVC 14 to a processor 28 or an issuer 28 of the eSVC 14. In an embodiment, the transaction information may be conveyed upon the occurrence of an event, such as an association of the digital sticker 16 with the eSVC 12, a transaction with the eSVC 12, a disassociation of the digital sticker 16 from the eSVC 12, an association of the digital sticker 16 with a second eSVC 14, an association of a second digital sticker 18 with the second eSVC 14, a transaction with the second eSVC 14, or combinations thereof.

The second digital sticker 18 may be configured to convey transaction information of the second eSVC 14 to a processor 28 or an issuer 28 of the second eSVC 14, for example, via a network of the types described above.

In embodiments, the associated digital sticker 16 or 18 may be presented and/or displayed via various communication means, including SMS, email, video (e.g., YouTube, Vimeo, Skype, video message, or combinations thereof), instant message, a website, an online storage medium, a cloud storage system, other means for electronically obtaining the digital sticker, or combinations thereof.

In embodiments, the digital sticker 16 or 18 cannot be altered, may be unalterable, or may be incapable of alteration (e.g., by a user, merchant, deviant, competitor, or combinations thereof). In embodiments, the digital sticker 16 or 18 may be substantially incapable of alteration. As defined herein, "substantially incapable of alteration" means that a mechanism for altering the digital sticker would not be apparent to an intended user of the eSVC during intended uses of the eSVC. For example, the digital sticker 16 associated with eSVC 12 cannot be altered, may be unalterable, may be incapable of alteration, or may be substantially incapable of alteration when all or portions of the digital sticker 16 and/or eSVC 12 are transferred over the network. As an additional or alternative example, the digital sticker 16 cannot be altered, may be unalterable, may be incapable of alteration, or may be substantially incapable when all or portions of the digital sticker 16 and/or eSVC 12 are transferred from a memory of one type of device (e.g., user device 22) to a memory of another type of device (e.g., transaction point 24).

In additional or alternative embodiments, the digital sticker 16 or 18 may be inseparable or incapable of separation from the eSVC 12 or 14 to which the digital sticker 16 or 18 is associated. In embodiments, the digital sticker 16 or 18 may be substantially inseparable from the eSVC 12 or 14 to which the digital sticker 16 or 18 is associated. As used herein, "substantially inseparable" means that a mechanism for removing the digital sticker (e.g., digital sticker 16) from the eSVC (e.g., eSVC 12) or altering the digital sticker (e.g., digital sticker 16) would not be apparent to an intended user of the eSVC (e.g., eSVC 12) under intended use of the eSVC. For example, the digital sticker 16 associated with eSVC 12 may be inseparable, substantially inseparable, or incapable of separation when all or portions of the digital sticker 16 and/or eSVC 12 are transferred over the network. As an additional or alternative example, the digital sticker 16 may be inseparable, substantially inseparable, or incapable of separation when all or portions of the digital sticker 16 and/or eSVC 12 are transferred from a memory of one type of device (e.g., user device 22) to a memory of another type of device (e.g., transaction point 24).

In embodiments, the digital sticker (e.g., digital sticker 16 and/or 18) may be configured to initiate an activation of the eSVC (e.g., eSVC 12 and/or eSVC 14). For example, once digital sticker 16 is associated with eSVC 12, the digital sticker 16 may be configured to initiate an activation of the eSVC 12 for use in transactions. Additionally or alternatively, once digital sticker 16 is associated with second eSVC 14, the digital sticker 16 may be configured to initiate an activation of the second eSVC 14. Additionally or alternatively, once second digital sticker 18 is associated with second eSVC 14, the digital stocker 18 may be configured to initiate an activation of the second eSVC 14.

In embodiments, the digital sticker (e.g., digital sticker 16 and/or 18) may be configured to initiate a registration of the eSVC (e.g., eSVC 12 and/or eSVC 14). For example, once digital sticker 16 is associated with eSVC 12, the digital sticker 16 may be configured to initiate a registration of the eSVC 12 for use in transactions. Additionally or alternatively, once digital sticker 16 is associated with second eSVC 14, the digital sticker 16 may be configured to initiate a registration of the second eSVC 14. Additionally or alternatively, once second digital sticker 18 is associated with second eSVC 14, the digital sticker 18 may be configured to initiate a registration of the second eSVC 14.

In embodiments, a digital sticker (e.g., digital sticker 16 and/or 18) may be configured by the processor 28 and/or issuer 28 for preferences of use. For example, a digital sticker may be configured to accept or reject a particular (e.g., third-party) electronic wallet and/or sub-wallet. Additionally or alternatively, a digital sticker may be configured to support a particular (e.g., third-party) electronic wallet and/or sub-wallet. Additionally or alternatively, a digital sticker may be configured to display a particular color, text, font, size, or combinations thereof when being displayed.

In an embodiment, the system 1 may further comprise an interface (e.g., associated with the user device 22). The digital sticker may be configured to display information of an electronic wallet services provider via, for example, an interface of the user device 22. The electronic wallet services provider may be the processor 28 and/or the issuer 28 of the eSVC 12 and/or eSVC 14. A viewer (e.g., a user) of the interface (e.g., of the user device 22) may access an eSVC (e.g., eSVC 12 and/or 14), a digital sticker (e.g., digital sticker 16 and/or 18), or combinations thereof. In embodiments, the digital sticker (e.g., digital sticker 16 and/or 18) cannot be obscured, hidden, distorted, or combinations thereof. That is, the digital sticker (e.g., digital sticker 16 and/or 18) of the disclosed embodiments associates with the eSVC (e.g., eSVC 12 and/or 14), and the processor 28 and/or issuer 28 do not store the digital sticker and information associated therewith (e.g., transaction information). The digital sticker (e.g., digital sticker 16 and/or 18) and/or the associated eSVC (e.g., eSVC 12 or 14), or an electronic representations thereof, may be displayed, for example, on an interface of a user device 22, on an interface of the issuer 28 or a competitor of the issuer 28 of the eSVC, on an interface of the processor 28 or a competitor of the processor 28 of the eSVC, on an interface of a the electronic wallet services provider or a competitor thereof, or combinations thereof. The eSVC may be configured such that the interface cannot prevent the display of the digital sticker or electronic representation of the digital sticker. In alternative embodiments, the digital sticker (e.g., digital sticker 16 and/or 18) cannot be substantially obscured, hidden, distorted, or combinations thereof. As used herein, "substantially obscured, hidden, distorted, or combinations thereof" includes the presence of security measures which may obscure, hide, distort, or combinations thereof, the display of a digital sticker(s) (or electronic representations thereof). As described above, the eSVC may be obtained via various communication means. In embodiments, obtaining the eSVC may include saving the eSVC, for example, to an electronic wallet. For example, the eSVC may be saved via a "save" button which appears, for example, on an interface (e.g., associated with the user device 22, transaction point 24, or combination thereof) configured to display the "save" button via the communication means. In an embodiment where the eSVC is obtained via video, the video may display on the interface of, for example, the user device 22 or the transaction point 24, a "save" button which allows for saving of the eSVC into an electronic wallet directly from the communication means.

The user device 22 may comprise a personal computer, a tablet, a smartphone, a cloud computing system, a server, or combinations thereof. The user device 22 may be used to convey transaction information to the processor or issuer 28. In embodiments, a user may interact via the user device 22 with the electronic wallet environment 20, for example, to add or remove eSVCs, add value to an stored-value card or eSVC, manage value tokens, manage a SAFE account, register an eSVC, activate an eSVC, swap or exchange eSVCs between electronic wallets, transfer eSVCs to another user's electronic wallet and/or electronic wallet environment, direct funds associated with stored-value cards maintained in a SAFE account to be used to pay a bill or meet another obligation, or combinations thereof. The system 1 may further comprise an interface (e.g., associated with the user device 22) through which a viewer may access one or more eSVCs (e.g., eSVC 12 and eSVC 14), one or more digital stickers (e.g., digital stickers 16 and 18), or both eSVCs and digital stickers. In embodiments, the digital sticker (e.g., digital sticker 16 and/or 18) may be configured to convey the transaction information of the eSVC (e.g., eSVC 12 and/or eSVC 14) from the user device 22 to the processor 28 and/or the issuer 28.

The transaction point 24 may comprise a personal computer, a tablet, a smartphone, a point-of-sale device, a cloud computing system, a server, or combinations thereof. In embodiments, the digital sticker (e.g., digital sticker 16 and/or 18) may be configured to convey the transaction information of the eSVC (e.g., eSVC 12 and/or eSVC 14) from the transaction point 24 to the processor 28 and/or the issuer 28. The transaction point 24 may be integral with the merchant 26 (e.g., the transaction site and product are in the same location)); additionally or alternatively, the transaction point 24 may be separate from the merchant 26 (e.g., the transaction site and product are in different locations).

Use of an eSVC for a transaction (e.g., a purchase of goods) may involve the merchant 26, the processor 28, the issuer 28, or combinations thereof. In various embodiments, the merchant 26 and issuer 28 may be the same, different, or related entities. The merchant 26 may accept value contained in the eSVC for business transactions, for example, as tender for a purchase. In embodiments, the merchant 26 is referred to as a redeeming merchant. An entity that provides the financial backing accessed for use of the eSVC is referred to as the account issuer, or simply, issuer 28. The issuer 28 may be a direct issuer of eSVCs (e.g., as store-branded cards, e.g., Macy's, Target). The issuer 28 also may be a bank, financial institution, and a processor such as VISA, Mastercard, American Express, etc. eSVCs issued by such institutions may be readily accepted by the merchant 26 to conduct transactions such as purchases. The issuer 28 may be in various industries, such as the entertainment, health, medical, pharmaceutical industries. For example, the issuer 28 may be a pharmaceutical company utilizing promotional eSVCs for pharmaceutical products. The processor 28 may process transactions made with the eSVCs. Examples of processors include VISA, Mastercard, American Express, etc. In various embodiments, the processor 28 and the issuer 28 are the same or different entities.

The processor 28 and/or issuer 28 may supply digital stickers for use with eSVCs. The processor 28 and/or issuer 28 may receive transaction information associated with the use of an eSVC (which has an associated digital sticker supplied by the processor 28 and/or issuer 28) from the user device 22, the transaction point 24, the merchant 26, or combinations thereof. The processor 28 and/or issuer 28 may provide electronic wallets (e.g., the electronic wallet 10). The processor 28 and/or issuer 28 may also be the electronic wallet service provider which hosts and support eSVCs in the electronic wallet 10. The processor 28 and/or issuer 28 may provide for the registration of eSVCs into new and existing electronic wallets (e.g., electronic wallet 10).

The various components of the above-described system 1 may be utilized in embodiments of the methods disclosed herein. An embodiment of the disclosed method includes associating a digital sticker with an electronic stored-value card (hereinafter "eSVC"), and conveying a transaction information of the eSVC to a processor or an issuer of the eSVC.

In an embodiment, the method may further comprise removing the digital sticker from the eSVC, associating the digital sticker with a second eSVC, and conveying a transaction information of the second eSVC to a processor or an issuer of the second eSVC.

In an alternative embodiment, the method may further comprise duplicating the digital sticker, associating a duplicate of the digital sticker with a second eSVC, and conveying a transaction information of the second eSVC to a processor or an issuer of the second eSVC.

In an alternative embodiment, the method may further comprise associating the eSVC with an electronic wallet, associating a second eSVC with the electronic wallet, disassociating the digital sticker from the eSVC, and associating the digital sticker with the second eSVC.

In an alternative embodiment, the method may further comprise associating the eSVC with an electronic wallet, disassociating the eSVC from the electronic wallet, and continuing to associate the digital sticker with the eSVC after the eSVC is disassociated from the electronic wallet. Optionally, the method may comprise associating the eSVC with a second electronic wallet.

In an alternative embodiment, the method may further comprise providing the eSVC, inquiring whether the eSVC is authenticated or verified, and saving the electronic stored-value card to an electronic wallet. The step of saving may comprise automatically saving the electronic stored-value card if the electronic stored-value card is authenticated or verified.

In an additional or alternative embodiment, the method may further comprise presenting the electronic stored-value card via email, SMS, video, instant message, a website, an online storage medium, a cloud storage system, or combinations thereof; presenting the digital sticker via email, SMS, video, instant message, a website, an online storage medium, a cloud storage system, or combinations thereof; or both.

In the disclosed methods, the transaction information may comprise a transaction value, a transaction location, a transaction type, a merchant identifier, an issuer identifier, a processor identifier, an identifier for the eSVC, a phone number, an identification number, an expiration date, a billing address, or combinations thereof.

In the disclosed methods, the transaction information may be conveyed upon the occurrence of an event comprising an association of the digital sticker with the eSVC, a transaction with the eSVC, a disassociation of the digital sticker from the eSVC, an association of the digital sticker with a second eSVC, a transaction with the second electronic stored-value car, or combinations thereof. Other events such as those disclosed above for the system embodiments may also be suitable for use in the disclosed methods.

In the disclosed systems and methods, information (e.g., transaction information) obtained from a digital sticker (e.g., by a processor and/or issuer) may be managed, tracked, reported, or combinations thereof. In embodiments, a processor and/or issuer may manage transaction information relating to, for example, the transaction type of a series of transactions made with an eSVC. Managing the transaction information of an eSVC may allow the processor and/or issuer to determine needs of a user/customer and offer services and/or products which suit a changing behavior of a customer/user. In additional or alternative embodiments, transaction information may be tracked (e.g., stored, monitored, and evaluated, e.g., with a fraud or risk mitigation logic). For example, transaction information may be tracked for suspicious activity (e.g., multiple rapid transactions, an unusually high transaction value, an atypical transaction location, or combinations thereof) or for sudden changes in behavior as compared to previous information received for a digital sticker. In additional or alternative embodiments, information relating to transaction information, or the transaction information itself may be reported. For example, an observed behavior pattern or specific action (e.g., suspicious activity) may be reported to authorities, to an electronic wallet services provider, to the user, to a merchant, to an issuer/processor, or combinations thereof.

In embodiments having fraud and risk mitigation, the disclosed systems and methods may provide for evaluation of user actions in the alternative or additional to the information received from the digital sticker. For example, fraud and risk mitigation techniques may include the use of device fingerprints, all user action information available from any source (i.e., GPS technology, credit report information, etc.), network information, or combinations thereof.

In an embodiment, an electronic stored-value card having a digital sticker associated therewith is created by incorporating a digital sticker into an eSVC template of the eSVC. Incorporation of the digital sticker into the eSVC template may involve electronically copying or cutting the digital sticker and electronically pasting the digital sticker into an electronic stored eSVC template. Electronically cutting, copying, and pasting may be achieved, for example, by utilizing a computer, an electronic display, an operating system, software, a graphical user interface, and any electromechanical peripheral device capable of electronically cutting, copying, pasting, or any combination thereof, electronically stored information. A suitable computing device may include personal or professional computer, a smart phone, a tablet PC, or the like. A suitable operating system includes, for example, Microsoft Windows, OS X, iOS 6, Google Android, Linux, and the like. Suitable electronic displays include, but are not limited to, a computer display such as a flat screen LCD panels, a touchscreen of a tablet PC, a television monitor, or any combination thereof. Optionally, the electronic display may be touch-enabled and manipulated with a stylus, human touch, or a combination thereof. Suitable electromechanical peripheral devices include, but are not limited to, a mouse, a keyboard, an electromechanical tool for drafting graphic designs, or any combination thereof. Suitable software, may include any software capable of creating an eSVC.

In an embodiment, a first memory (e.g., of a particular machine of the configuration discussed for FIG. 7 or of a device such as user device 22 or transaction point 24) may store an eSVC and/or its associated digital sticker. One or more executable functions of the digital sticker may initiate a registration of the eSVC into an electronic wallet. Execution of the one or more executable functions of the digital sticker may be carried out by executing instructions using one or more processors. The digital sticker and the executable instructions may be stored on the same memory, or stored on different memories (e.g., a first memory and a second memory, wherein the first memory may be associated with a first device, e.g., user device 22, and the second memory may be associated with a second device, e.g., transaction point 24). Storing the digital sticker in devices beneficially allows the executable functions of the digital sticker to be executed by applications stored at a different location of a network. In an embodiment, a recipient of an eSVC may access the eSVC stored on a memory at a remote network location and executes on executable function of the digital sticker that initiates a registration of the eSVC into an electronic wallet using one or more processors and executable instructions stored on a memory at a second network location.

In an embodiment, electronic representation of the digital sticker may be displayed on an interface of a device, such as the display of a personal computer, tablet, smartphone, television, an LCD device, flat-panel device, or the like.

The electronic representation of a digital sticker may be part of an electronic display of an eSVC, a notification of the eSVC on a webpage of a retailer (e.g., an issuer) of eSVCs, on a webpage an electronic phone provider, an email, an SMS, a video, other communication means and/or part of other electronic representations that may be encountered as part of the sale, purchase, receipt, registration, redemption, or combinations thereof, of eSVCs.

In an embodiment, the electronic representation of a digital sticker may contain information indicating the identity of a third-party wallet service provider. Such information may include, for example, trademarks, logos, graphic designs, pins, delete slogans, and slogans associated with one or more electronic wallet service providers. In an embodiment, an executable function of the digital sticker provides information indicating the identity of a third-party electronic wallet services provider by providing the name of the service provider, sounds, tunes, or slogans associated with the third-party service provider, or combinations thereof. However, representations of the digital sticker are not limited to electronic formats. In an embodiment, a visual representation of the digital sticker is affixed to a physical or proxy card for an eSVC. In another embodiment, the duplicates of a digital sticker associated with an eSVC are presented during different steps of the registration of the eSVC into an electronic wallet of a first electronic wallet services provider. The digital sticker, and/or any duplicates of the digital sticker, may comprise executable functions which initiate registration of the electronic wallet with a second electronic wallet services provider. In this way, the second electronic wallet service provider and eSVCs promote registration of the eSVCs to electronic wallets of the second electronic wallet service provider without limiting a universal registration capability of the eSVC. The second electronic wallet service provider may provide attractively versatile eSVC (i.e., universal registerability of the eSVC into third-party electronic wallets) while still promoting their own electronic wallet services.

Embodiments of computer implemented methods for registering an eSVC into an electronic wallet are provided herein.

Prior to execution of the method(s), the eSVC may be obtained from an issuer (e.g., retailer) of the eSVC. The eSVC may be obtained via various channels, including SMS, email, video (e.g., YouTube, Vimeo, Skype, video message, or combinations thereof), instant message, a website, an online storage medium, a cloud storage system, other means for electronically obtaining the eSVC, or combinations thereof. Physical cards and proxy cards which are obtained prior to registration may be converted to eSVCs for use in the registration method. In an embodiment, the issuer of the eSVC, physical card, or proxy card is also the electronic wallet services provider. Also prior to (or alternatively, concurrently with) registration, a digital sticker may be associated with the eSVC, physical card, or proxy card. The association of the digital sticker may be automatic in that the digital sticker may be associated with the eSVC prior to issuance, after issuance and prior to registration in an e-wallet, or after issuance and during registration in an e-wallet. In embodiments where an eSVC originates from an entity different than the supplier of the digital sticker (e.g., via an issuer of a physical card, a proxy card, or an eSVC), the association of the digital sticker with the eSVC may be automatic or manual upon registration of the eSVC in an e-wallet provided by an electronic wallet services provider.

The computer implemented method may comprise providing a process to register the eSVC into an electronic wallet by activating an eSVC registration button. The method may include transmitting a notification to recipient, where the notification communicates information about the eSVC to the recipient (e.g., user). The notification may be, for example, an email, electronically displayed webpage, and instant message, a text message (e.g., SMS), or combinations thereof. The notification may contain a message instructing the recipient that the recipient has received a gift information pertaining to the nature of an e-Gift, information pertaining to a retailer (e.g., a merchant 26 of FIG. 1) from which value (e.g., value tokens, money, rewards, discounts, credits, or combinations thereof) of the eSVC may be obtained, information pertaining to an electronic wallet service provider hosting electronic wallets wherein an eSVC may be registered, information from an eSVC issuer, or a combination thereof. The notification may comprise the eSVC registration button, providing means through which the registration button may be accessed, or combination thereof.

The process to register the eSVC may comprise prompting a recipient to register the eSVC into one or more electronic wallets. An electronic wallet registration prompt may include, for example, an electronic display comprising electronic links to one or more electronic wallet service providers. The promptly further include trademarks, slogans, logos, and other graphical representations indicating the identity of the one or more electronic wallet service providers. Alternatively, the prompts may include information pertaining to a single electronic wallet provider.

The process to register the eSVCs may comprise creating one or more electronic wallets. The electronic wallet services providers of each of the created electronic wallets may be the same or different. The process to register eSVC may also include an option to create one or more electronic wallets without registering eastward-value card into the one or more electronic wallets. In an embodiment, the process to register the eSVC may allow a registrant to create a wallet without registering the eSVC into electronic wallet, to create an electronic wallet and register the eSVC therein, to register the eSVC into a wallet associated with a pre-existing user account, to create a new electronic wallet where the registrant already has an electronic wallet associated with a pre-existing user account and register the eSVC therein, to create an electronic wallet hosted by an electronic wallet services provider with whom the registrant has an electronic wallet associated with a pre-existing user account of the registrant without registering an electronic wallet therein, or combinations thereof.

One or more of the electronic wallet service providers presented during the process to register the eSVC in an electronic wallet may also be an entity related to another aspect of the electronic transaction systems and methods described herein. For example, one or more of the electronic wallet services providers may also be an issuer of the eSVC, a retailer (e.g., merchant) of the eSVC, an entity from which a value of the eSVC may be redeemed, a third-party wallet services provider, or combinations thereof. The process to register the eSVC may comprise registering the eSVC into one or more electronic wallets.

One or more of the electronic wallets may be associated with a pre-existing user account of a registrant of the eSVC, a new electronic wallet created by a registrant during the process to register the eSVC, or a combination thereof. The step of prompting a registrant to register the eSVC may include presenting options to register the eSVC into an existing electronic wallet, to create a new wallet, to create a new wallet and register the eSVC into the new wallet, or a combination thereof. The process to register the eSVC may result in the creation of one or more electronic wallets. The process to register the eSVC may also present the registrant with the option to bypass the registration process and redeem one or more value tokens of the eSVC without registering the eSVC into an electronic wallet. The process to register the eSVC may further present the registrant with an option to exit the registration process of the eSVC without registering or redeeming the eSVC. The process to register the eSVC may additionally present a registrant with the option to bypass or exit the registration process and register the eSVC at another time, the option to bypass or exit the registration process and send the registrant one or more subsequent notifications (e.g. an email) reminding the registrant to register the eSVC into the electronic wallet of at least one of the electronic wallet service providers of the process to register, or a combination thereof.

The electronic wallets disclosed herein may be hosted by a wallet services provider through electronic bought services platform. The electronic wallet services platform may, for example, provide the architecture, functionality, security, electronic storage, or any combination thereof necessary to provide electronic wallet and electronic wallet services to an end-user. An electronic wallet services platform may be implemented on a server, had a cloud storage facility, on an electronic device of the end-user via a software application utilizing the processors and memory of the end-user's electronic device, or any combination thereof. However, the preceding List is not exhaustive, and any implementations suitable for hosting electronic wallets and electronic wallet services may be used herein.

Figure 8:
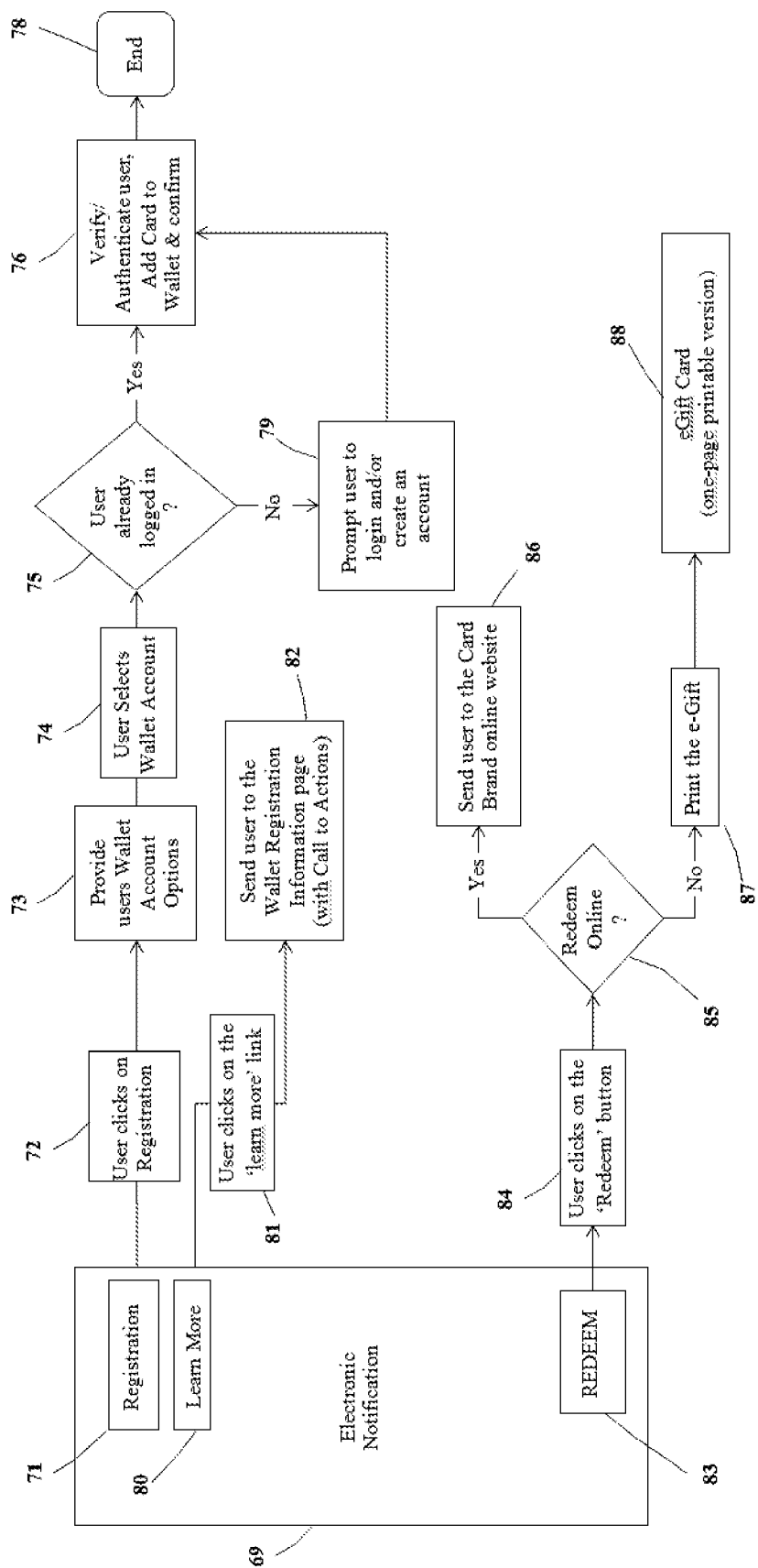
FIG. 8 illustrates a flow diagram of an embodiment of a method for registering an electronic stored-value card into an electronic wallet.

FIG. 8 illustrates a flow diagram of an embodiment of a method for registering an eSVC into an electronic wallet. The method may be implemented by one or more suitably programmed computers. The method begins at block 69. At block 69, an electronic notification may be generated, for example, that an eSVC and/or digital sticker is available (e.g., ready for registration and/or redemption).

In embodiments, the notification may comprise an eSVC, a digital sticker, or both. In embodiments, the notification may present and/or display the digital sticker and/or the eSVC, or the availability of the digital sticker and/or eSVC, via various communication means, including SMS, email, video (e.g., YouTube, Vimeo, Skype, video message, or combinations thereof), instant message, a website, an online storage medium, a cloud storage system, other means for electronically obtaining the digital sticker and/or eSVC, or combinations thereof.

The electronic notification may be transmitted and displayed to a user, for example, via a network of the type described hereinabove. The electronic notification, which may be an email, may comprise an electronic "Register" button 71, an electronic "Learn More" button 80, an electronic "Redeem" button 83, or combinations thereof. Each of electronic buttons 71, 80, and 83, when activated, may guide the user through a different sequence of steps.

First, at block 72, the user may activate (e.g., via a mouse-click) the electronic "Register" button 71. Flow then proceeds to block 73. At block 73, the user may be provided with one or more wallet account options. For example, the wallet account options may present the user with two or more electronic wallet service providers under which the eSVC may be registered. At block 74, the user then selects from among the two or more options (e.g., electronic wallet service providers), and flow proceeds to decision block 75. At decision block 75, an algorithm determines whether the user is already logged into a pre-existing account of the selected electronic wallet service provider. If the user is already logged in, flow proceeds to block 76. At block 76, the eSVC may be registered into the electronic wallet and a confirmation may be presented to the user. The registration process terminates at block 78 upon confirmation. If the user is not locked into a pre-existing account of the selected electronic wallet service provider, flow proceeds from decision block 75 to block 79. At block 79, and the user may be prompted to login to a pre-existing account of the selected electronic wallet services provider, to create a new account of an electronic wallet services provider, or a combination thereof. When the user has created a new account or provided the correct authentication information of a pre-existing account, flow proceeds to block 76. At block 76, the eSVC may be registered into the electronic wallet and a confirmation may be presented to the user. The registration process terminates at block 78 upon confirmation.

Second, at block 81, the user may activate (e.g., via a mouse-click) the electronic "Learn More" button 80. Flow then proceeds to block 82. At block 82, the user may be sent to a "Wallet Registration Information" page, with "Call to Actions." At the "Wallet Registration Information" page, the user may be presented with information regarding how to redeem the eSVC, how to register and/or activate the eSVC in a first electronic wallet (e.g., via a first electronic wallet service provider), how to register and/or activate the eSVC in a second electronic wallet (e.g., via a first or a second electronic wallet service provider), or combinations thereof. At the "Wallet Registration Information" page, a "Redeem" button and/or a "Digital Sticker" button may be included on the page. When the user clicks either button, flow proceeds according to the description hereinabove and hereinbelow for subsequent action after selecting the Registration button 71 or the Redeem button 83.

Third, at block 84, the user may activate the electronic "Redeem" button 83. Flow then proceeds to decision block 85. At decision block 85, the user may choose whether to redeem the eSVC online or print the eSVC for redemption elsewhere. If the user chooses to redeem the eSVC online, flow may proceed to block 86. At block 86, the user is presented with options to electronically redeem value (e.g., value tokens, currency, discounts, credits, rewards) of the eSVC at a branded website, for example, specified for the eSVC. For example, selection of the option to electronically redeem value tokens of the eSVC may direct the user to at least one vendor, retailer (e.g., merchant), wholesaler, or a combination thereof, through which the eSVC card may be redeemed. If the user chooses to redeem the eSVC by printout (i.e., not online redemption), flow may proceed to block 87. At block 87, the user may print out a paper copy of the eSVC. Selection of the option to print out a paper copy of the eSVC results in the printout of one or more physical copies of the eSVC. The one or more copies may be one-page paper copies of the eSVC. In an embodiment, the paper copies of the eSVC may be presented in-store to a cashier or a self-check-out machine as a means for redeeming value (e.g., value tokens) of the eSVC. The paper copies of the eSVC may comprise scannable barcodes or patterns, and in-store redemption of eSVCs may be implemented in part by scanning the scannable barcodes, patterns, or combination thereof and retrieving information useful for redeeming value on the eSVC by retrieving information from a database associated with the scannable barcodes, patterns, or combination thereof printed on the printed copies of the eSVC. In an embodiment, the eSVC is an e-Gift, a digital gift card, or the like and is redeemable for products sold by a specific retailer or for products of a particular brand. Flow may proceed to block 88, where the user redeems the printout (e.g., the e-Gift card), for example, at a merchant.

In various embodiments of the method, the registration process automatically registers the eSVC of the user into a wallet of a pre-selected electronic wallet service provider. The pre-selected electronic wallet service provider may be indicated by an electronic representation of an eSVC registration button incorporated into the eSVC or incorporated into one or more of the electronic displays viewed by the user during the registration process (e.g., an interface of the user device 22 or transaction point 24 of FIG. 1). In embodiments where the eSVC registration button comprises a digital sticker, the digital sticker may be inseparable, incapable of alteration, or a combination thereof, and will remain with the eSVC, even when the eSVC is registered into on electronic wallet hosted by a different electronic wallet services provider. The digital sticker may be made substantially inseparable, incapable of alteration, or combination thereof, by incorporating security features into the eSVC or by designing the eSVC, the digital sticker, or a combination thereof such that said characteristics are inherent to the eSVC. In some embodiments, an electronic representation of a digital sticker incorporated into an eSVC will be presented to the user when the user accesses the eSVC through an electronic wallet hosted by electronic wallet services provider other than the pre-selected electronic wallet services provider. In some embodiments, an eSVC may contain security features that prevent third-party electronic wallet services providers from substantially obscuring, hiding, altering, distorting, or any combination thereof an electronic representation of the eSVC displayed to a user when the user accesses the eSVC through a third-party electronic wallet. In some other embodiments, the eSVC and/or the digital sticker may not be substantially obscured, hidden, altered, distorted, or combinations thereof to a user when the user accesses the eSVC through a third-party electronic wallet despite security features of the third-party.

An embodiment for a method for registering eSVCs into an electronic wallet may include receiving an electronic notification containing an eSVC, an electronic representation of an eSVC, or a combination thereof. The notification may comprise information indicating the amount of value tokens associated with the eSVC (i.e. the quantity of value represented by particular currency, value tokens, discounts, rewards, any other value described herein, or combinations thereof), authentication information necessary to redeem value tokens of the card (e.g., a card pin number), redemption card number for identifying the card, instructions for redeeming the card, information about the eSVC vendor, an electronic registration button for initiating a process for registration of the eSVC into one or more electronic wallet hosted by one or more electronic wallet services providers, or combinations thereof.

Upon receipt of the electronic notification, the eSVC recipient may then click the registration button, and initiate registration of the eSVC into the one or more electronic wallets. The user is presented with options to select on electronic wallet from among several electronic wallet service providers, to create a new electronic wallet by creating an account with one of the electronic wallet service providers and register the eSVC to therein, and to cancel the registration process for the eSVC into an electronic wallet.

The user is brought to a registration screen of the selected electronic wallet service provider. The registration screen prompts the user for log-in for a pre-existing account with the electronic wallet service provider, presents a login button, prompts a user to create an account if the user does not already have an account with the electronic wallet services provider, And presents an option to cancel the registration process for the eSVC into on electronic wallet of the selected electronic wallet service provider.

In another embodiment, the registration method automatically creates an electronic wallet when a user having a pre-existing user account logs in using the appropriate login credentials for the user account. This may be useful, where an electronic wallet services provider also provides other services unrelated to electronic wallet or services where an electronic wallet is unnecessary because the electronic wallet services providers will have users that have a user account but do not also have an electronic wallet. By automatically creating an electronic wallet when such users log into a pre-existing account during the electronic registration process a user may benefit from integration of services offered by the selected electronic bought services provider, improved organization by reducing the number of online accounts, passwords, and username a user must manage, and faster simpler electronic wallet registration process. The electronic wallet service provider also benefits by avoiding duplicate accounts, which interfere with the data mining endeavors aimed at identifying growth trends, customer behaviors, customer preferences, and the popularity of particular services. After successful login a confirmation screen will be displayed to the user, confirming that the eSVC has been registered into the selected wallet. The confirmation screen also presents the user with the option of registering the eSVC into an electronic wallet of another electronic wallet services provider as well as an opportunity to cancel further registration of the eSVC.

In an alternative embodiment, the notification 69 may display electronic wallet service providers in addition to or in the alternative to presenting electronic wallet service providers at block 73. In such an embodiment, the electronic wallet service provider may be selected up front in the registration method.

In an alternative embodiment, at block 72, the user may activate (e.g., via a mouse-click) the electronic "Register" button 71. Flow then may proceed directly to decision block 75. For example, the user may have preset and/or saved preferences (e.g., in an electronic wallet) which directs the user to decision block 75 for login (e.g., to the preset electronic wallet). At decision block 75, flow proceeds either via block 79 or block 76 as described hereinabove. In embodiments where flow proceeds from block 72 directly to decision block 75, an inquiry may be made whether the user and/or eSVC is verified and/or authenticated prior to decision block 75, with flow proceeding to decision block 75 if the user and/or eSVC is not verified and/or authenticated.

In an alternative embodiment, at block 72, the user may activate (e.g., via a mouse-click) the electronic "Register" button 71. Flow then may proceed directly to block 76. At block 76, the eSVC and/or user may be verified and/or authenticated, the eSVC may be added to an electronic wallet, or both. In such an embodiment, there is no need for user login, for example, due to preset and/or saved preferences of a user. In embodiments where flow proceeds from block 72 directly to block 76, an inquiry may be made whether the user and/or eSVC is verified and/or authenticated prior to block 76, with flow proceeding to block 76 for addition of the eSVC to an electronic wallet if the user and/or eSVC is verified and/or authenticated.

In an alternative embodiment, the notification 69 may comprise an electronic "Save" button instead of an electronic "Register" button, a user may activate (e.g., via a mouse-click) the electronic "Save" button, and flow may then proceed directly to decision block 75. In embodiments where flow proceeds to decision block 75, the user may have preset and/or saved preferences (e.g., in an electronic wallet) which directs the user to decision block 75 for login (e.g., to the preset electronic wallet). At decision block 75, flow proceeds either via block 79 or block 76 as described hereinabove. In embodiments where flow proceeds directly to decision block 75 after activation of the "Save" button, an inquiry may be made whether the user and/or eSVC is verified and/or authenticated prior to decision block 75, with flow proceeding to decision block 75 if the user and/or eSVC is not verified and/or authenticated.

In an alternative embodiment, the notification 69 may comprise an electronic "Save" button instead of an electronic "Register" button, a user may activate (e.g., via a mouse-click) the electronic "Save" button, and flow may then proceed directly to block 76. In embodiments where flow proceeds to block 76, the eSVC and/or user may be verified and/or authenticated, the eSVC may be added to an electronic wallet, or both. In such an embodiment, there is no need for user login, for example, due to preset and/or saved preferences of a user. In embodiments where flow proceeds directly to block 76 after activation of the "Save" button, an inquiry may be made whether the user and/or eSVC is verified and/or authenticated prior to block 76, with flow proceeding to block 76 for addition of the eSVC to an electronic wallet if the user and/or eSVC is verified and/or authenticated.

In embodiments having a "Save" button, the eSVC may be saved via various communication means (described hereinabove). In embodiments, saving the eSVC may include saving the eSVC, for example, to an electronic wallet, for example, via an interface (e.g., associated with the user device 22, transaction point 24, or combination thereof shown in FIG. 1) configured to display the "Save" button via the communication means.

Figure 9:
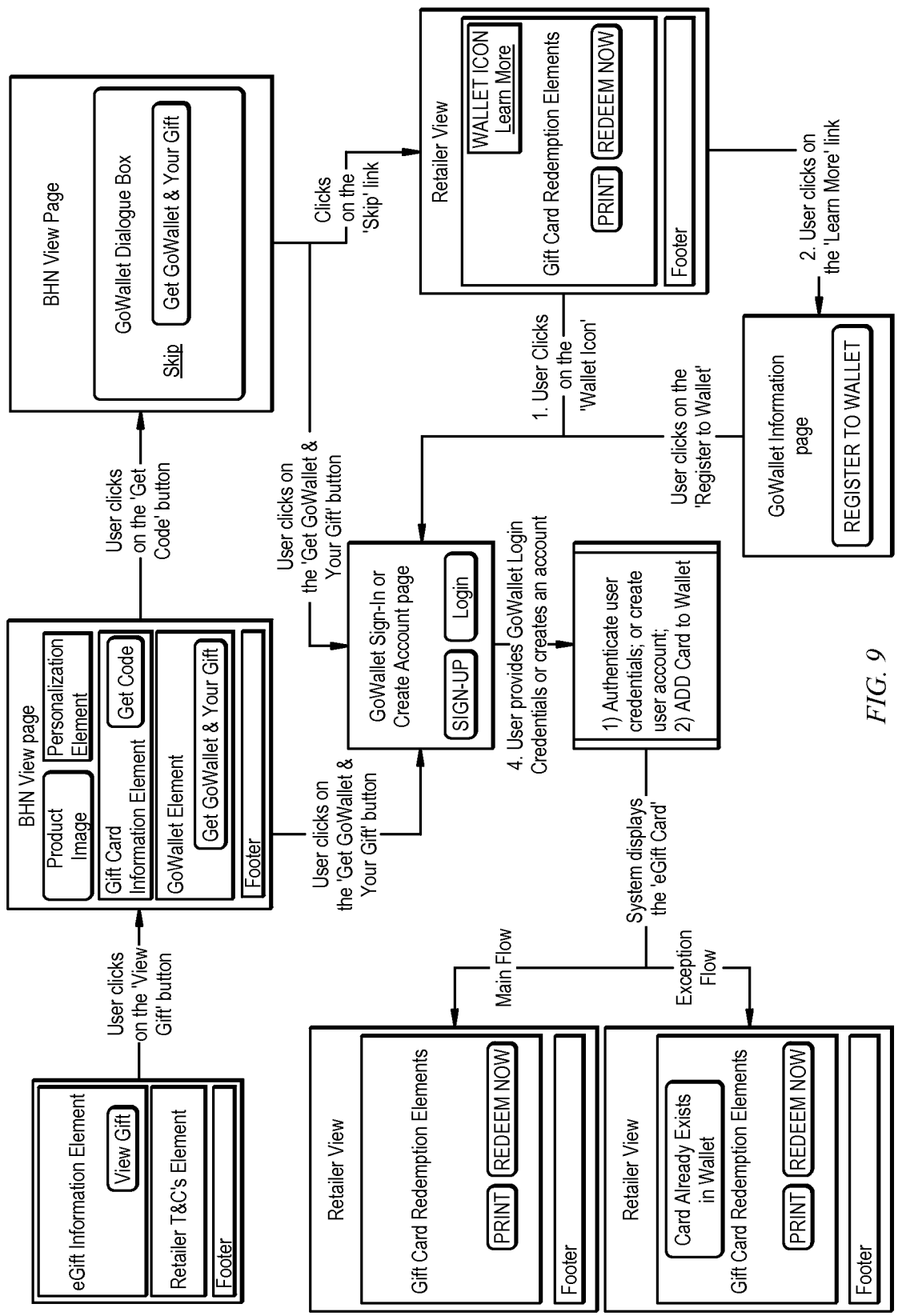
FIG. 9 is a schematic illustration of a user experience when using an embodiment of the registration method of the disclosure.

FIG. 9 is a schematic illustration of a user experience when using an embodiment of the method for registering an eSVC into an electronic wallet. In the embodiment illustrated by FIG. 9, various screens are presented to a user during the method for registering, for example, via the interface of a user device 22 or transaction point 24 (described in the discussion for FIG. 1), wherein the various screens have interactive "buttons" which the user may activate (e.g., via touchscreen or mouse-click) in order to proceed through the various registration steps for the methods presented herein. For example, the eSVC registration buttons labeled "Get GoWallet & Your Gift" and the eSVC registration button labeled "REGISTER TO WALLET" may direct the recipient of an e-Gift card to a wallet services registration display. Similarly a digital sticker may direct the recipient to the wallet services registration display. In some embodiments, digital stickers and additional eSVC registration buttons which are not digital stickers may be included in one or more electronic representations viewed by the recipient. These additional eSVC registration buttons may similarly direct a recipient to a single electronic wallet services provider.

In an embodiment, at least two selected from the group consisting of the maker of the e-Gift card, the electronic retailer (e.g., merchant 26 of FIG. 1), and the electronic services provider are the same entity, different entities sharing a mutually beneficial commercial relationship, or any combination thereof. In an embodiment, a method of registering an eSVC presents a recipient with an option to register the eSVC into the electronic wallet of a preselected electronic wallet services provider. By utilizing such a closed-loop electronic wallet registration process, these business relationships may enjoy greater integration of products and services and a chance to capture a greater share of the eSVC and electronic wallet services markets.

An embodiment of a method for registering eSVCs into an electronic wallet includes receiving an e-Gift notification email. The notification comprises information indicating that the recipient has received an e-Gift, information about the vendor of the e-Gift, customer service information, and a "VIEW GIFT" electronic button. In alternative embodiments, the notification screen may display one or more electronic wallet service providers and one or more buttons for the selection thereof. In such an embodiments, the electronic wallet service provider may be selected up front concurrently with (e.g., the "VIEW GIFT" and service provider button are the same button or before (e.g., the "VIEW GIFT" button and service provider button are separate button) activating the "VIEW GIFT" button.

Upon receipt of an e-Gift notification, the recipient may activate the "VIEW GIFT" button. Activation of the "VIEW GIFT" button displays an electronic display comprising a personalized message to the recipient regarding the e-Gift. The personalized message includes an electronic representation of the e-Gift card, information indicating an amount of value tokens associated with the e-gift card, an electronic redemption button (i.e. the "GET CODE" button), an eSVC registration button (i.e. the "Get GoWallet & Your Gift" button), and a digital sticker comprising information indicating the identification of an electronic wallet service provider. The eSVC registration button labeled "Get GoWallet & Your Gift" may direct the recipient of an e-Gift card to a wallet services registration display.

Activation of the electronic redemption button electronically displays a modal dialog box. The modal dialog box, which presents the user with a first option to bypass registration of the e-Gift card into an electronic wallet and instead directly access a means for redeeming the e-Gift card (i.e. the "No Thanks, Just get my e-Gift" link). The modal dialog box, also presents the user with a second option to register the e-Gift card into an electronic wallet and then acts as a means for redeeming e-Gift card (I.e. "Get GoWallet & Your Gift" button). The modal dialog box further presents the user with a digital sticker that is substantially similar in appearance to the digital sticker shown in the electronic notification.

Selection of the first option (i.e. by clicking the "No Thanks, Just get my e-Gift" link) accesses and displays an electronic representation of a webpage of an electronic retailer through which value tokens of an e-Gift card may be redeemed. The webpage of the electronic retailer may comprise an electronic representation of the e-Gift card, information indicating the amount of value tokens associated with the eSVC (i.e. the quantity of value represented by particular currency), authentication information necessary to redeem value tokens of the card (e.g., a card pin number), redemption card number for identifying the card, instructions for redeeming the card, advertisements for the purchase of other eSVCs, the logo or trademark of the e-Gift card retailer, and a digital sticker that is substantially similar in appearance to the digital sticker shown the electronic notification.

In an embodiment of a method of registering an eSVC into an electronic wallet, a user encounters a digital sticker in every screen presented to the user up to and including the webpage of the stored-value retailer. Activation of any one of the digital stickers will bring the recipient to a login page of the same electronic wallet service provider.

In the embodiment of the user experience shown in FIG. 9, a "Save" button may be incorporated into one or more of the screens shown in FIG. 9. The screens displayed (e.g., via an interface, as described above) may be configured to accomplish the methods utilizing the "Save" button as discussed for embodiments of FIG. 8.

The methods and systems of registering eSVCs may be useful in the e-Gift and e-Gift card industries. The eSVCs may be, for example, e-Gifts, digital gift cards, electronic coupons, or the like, and may be obtained from an e-Gift retailer. As an example, a purchaser purchases a digital gift card from giftcardmall.com, whereafter an electronic notification is sent to an intended recipient of e-Gift card. An electronic notification would be, for example, an email containing an electronic representation of the digital gift card, the digital gift card, or a combination thereof. The electronic notification would provide the intended recipient a means for registering the digital gift card into an electronic wallet. For example, would comprise an electronic representation of a digital sticker. The user would activate the digital sticker by hovering a mouse cursor over the electronic representation of the digital sticker and clicking a mouse of the mouse cursor, by touching a touch interactive surface with a finger or a stylus a mouse, or by utilizing other means for engaging activatable elements of a graphical user interface, thus initiating electronic registration of the digital gift card into an electronic wallet. In various embodiments, digital gift cards, e-gifts, or combinations thereof comprise redeemable value tokens, such as the redeemable value tokens described in connection with the electronic value token transfer system described elsewhere in the present disclosure.

Also disclosed herein is a system for registering electronic stored-value cards. In embodiments, the system may comprise one or more processors; a memory coupled to at least one of the one or more processors; the memory comprising executable instructions that, when executed, cause the one or more processors to display an electronic representation containing information about an eSVC, an electronic representation comprising eSVC registration button to initiate a process to register the eSVC into an electronic wallet by activating the eSVC registration button, or combinations thereof.

The ordering of steps in the various processes, data flows, and flowcharts presented are for illustration purposes and do not necessarily reflect the order that various steps must be performed. The steps may be rearranged in different orders in different embodiments to reflect the needs, desires and preferences of the entity implementing the systems. Furthermore, many steps may be performed simultaneously with other steps in some embodiments.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed.

The electronic value token transaction computer 150 above may be implemented on any particular machine with sufficient processing power, memory resources, and network throughput capability to handle the necessary workload placed upon it.

Figure 7:
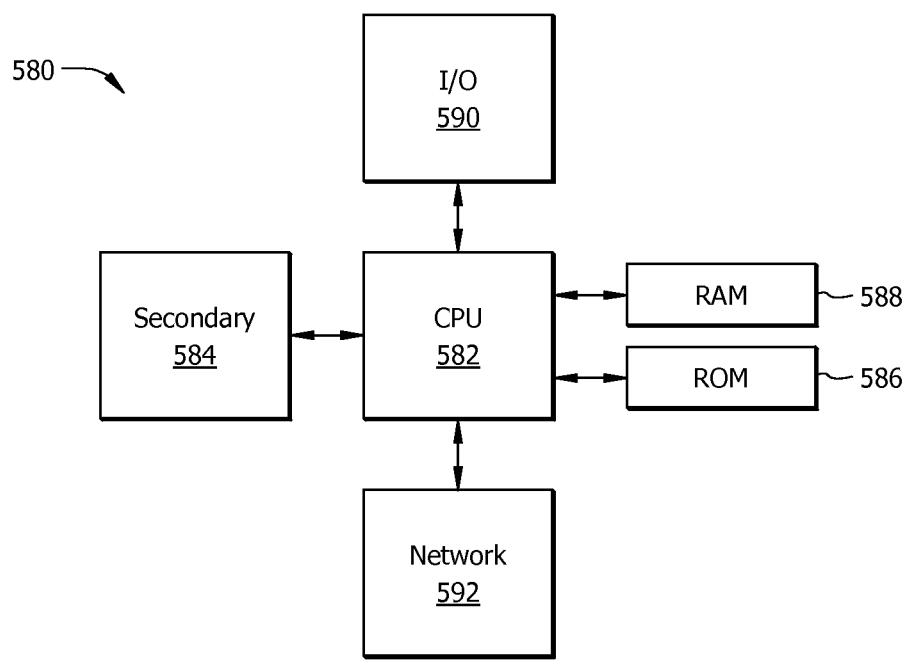
FIG. 7 is a schematic illustration of a particular machine suitable for implementing the several embodiments of the disclosure.

All of, or a portion of, the system described above may be implemented on any particular machine, or machines, with sufficient processing power, memory resources, and throughput capability to handle the necessary workload placed upon the computer, or computers. FIG. 7 illustrates a computer system 580 suitable for implementing all, or a portion of, one or more embodiments disclosed herein. The computer system 580 includes a processor 582 (which may be referred to as a central processor unit or CPU) that is in communication with memory devices including secondary storage 584, read only memory (ROM) 586, random access memory (RAM) 588, input/output (I/O) devices 590, and network connectivity devices 592. The processor 582 may be implemented as one or more CPU chips.

It is understood that by programming and/or loading executable instructions onto the computer system 580, at least one of the CPU 582, the RAM 588, and the ROM 586 are changed, transforming the computer system 580 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage 584. The RAM 588 is used to store volatile data and perhaps to store instructions. Access to both ROM 586 and RAM 588 is typically faster than to secondary storage 584. The secondary storage 584, the RAM 588, and/or the ROM 586 may be referred to in some contexts as computer readable storage media and/or non-transitory computer readable media.

I/O devices 590 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 592 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 592 may enable the processor 582 to communicate with the Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave.

Such information, which may include data or instructions to be executed using processor 582 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 582 executes instructions, codes, computer programs, scripts which it accesses from hard disk, floppy disk, optical disk (these various disk based systems may all be considered secondary storage 584), ROM 586, RAM 588, or the network connectivity devices 592. While only one processor 582 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 584, for example, hard drives, floppy disks, optical disks, and/or other device, the ROM 586, and/or the RAM 588 may be referred to in some contexts as non-transitory instructions and/or non-transitory information.

In an embodiment, the computer system 580 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 580 to provide the functionality of a number of servers that is not directly bound to the number of computers in the computer system 580. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 580, at least portions of the contents of the computer program product to the secondary storage 584, to the ROM 586, to the RAM 588, and/or to other non-volatile memory and volatile memory of the computer system 580. The processor 582 may process the executable instructions and/or data structures in part by directly accessing the computer program product, for example by reading from a CD-ROM disk inserted into a disk drive peripheral of the computer system 580. Alternatively, the processor 582 may process the executable instructions and/or data structures by remotely accessing the computer program product, for example by downloading the executable instructions and/or data structures from a remote server through the network connectivity devices 592. The computer program product may comprise instructions that promote the loading and/or copying of data, data structures, files, and/or executable instructions to the secondary storage 584, to the ROM 586, to the RAM 588, and/or to other non-volatile memory and volatile memory of the computer system 580.

In some contexts, the secondary storage 584, the ROM 586, and the RAM 588 may be referred to as a non-transitory computer readable medium or a computer readable storage media. A dynamic RAM embodiment of the RAM 588, likewise, may be referred to as a non-transitory computer readable medium in that while the dynamic RAM receives electrical power and is operated in accordance with its design, for example during a period of time during which the computer 580 is turned on and operational, the dynamic RAM stores information that is written to it. Similarly, the processor 582 may comprise an internal RAM, an internal ROM, a cache memory, and/or other internal non-transitory storage blocks, sections, or components that may be referred to in some contexts as non-transitory computer readable media or computer readable storage media.

The invention claimed is:

1. A computer-implemented method for the secure management of digital funds and a plurality of general purpose reloadable cards performed by computer system comprising a processor and a non-transitory computer readable memory storing executable instructions, the processor executing the executable instructions to cause the computer system to perform the method comprising:
   establishing, by the computer system, a user account in a database, for a user, wherein the user account is enabled by source code for the secure storage of value;
   providing a physical reload card;
   associating, by the computer system, the user account with a unique user account identifier;
   providing, by the computer system, the user with an ability to associate a value product and the plurality of general purpose reloadable cards with the user account, wherein the value product is the physical reload card associated with digital funds, and wherein the value product cannot, by itself, transact a general purpose reloadable card transaction;
   providing, by the computer system, the user with an ability to use a first portion of the value product's digital funds in a plurality of transactions, wherein the plurality of transactions comprise at least one general purpose reloadable card transaction utilizing funds transferred from the value product, and wherein the method improves the overall functioning of the computer system components by reducing data storage necessary required for the computer system; and
   providing, by the computer system, the user with an ability to use the value product's digital funds and a portion of one or more additional value product's digital funds in a single transaction.

2. The method of claim 1, wherein associating the value product with the user account comprises receiving, from a point of sale device, a digital funds request, wherein the digital funds request comprises the unique user account identifier and a digital funds amount, and wherein receipt of request directs the computer implemented sever to create a virtual value product comprising the requested digital funds amount.

3. The method of claim 2, wherein the computer system associates the virtual value product with the user account.

4. The method of claim 1, wherein associating the value product with the user account comprises receiving a value product unique identifier, wherein receipt of the value product unique identifier directs the computer implemented sever to associate the value product identified by the value product unique identifier with the user account.

5. The method of claim 1, wherein the unique user account identifier is present in a barcode, matrix code, magnetic strip, microchip, RFID tag, near field communication component, biometric component, or a combination thereof.

6. The method of claim 2, wherein the unique user account identifier is present in a barcode, matrix code, magnetic strip, microchip, RFID tag, near field communication component, biometric component, or a combination thereof.

7. The method of claim 1 further comprising providing, by the computer system, the user with an ability to use a second portion of the one or more additional value product's digital funds in the plurality of transactions.

8. The method of claim 1, wherein the plurality of transactions comprise a combination of at least two of the following: (i) adding value to a first designated value product; (ii) adding value to a second designated value product; and (iii) paying a bill.

9. The method of claim 7, wherein the plurality of transactions comprise a combination of at least two of the following: (i) adding value to a first designated value product; (ii) adding value to a second designated value product; and (iii) paying a bill.

10. The method of claim 1, wherein the single transaction consists essentially of adding value to a first designated value product or paying a bill.

11. The method of claim 1 further comprising providing, by the computer system, the user with the ability to schedule one or more specific transactions.

12. The method of claim 11 wherein the one or more specific transactions comprise adding value to a designated value product, paying a bill, or combinations thereof.

13. The method of claim 1 further comprising providing, by the computer system, a third party with the ability to add a value product to the user account.

* * * * *